United States Patent [19]

Weimer

[11] Patent Number: 4,874,917

[45] Date of Patent: Oct. 17, 1989

[54] MICROWAVE FOOD PRODUCT AND METHOD OF MANUFACTURE

[75] Inventor: John R. Weimer, Stacy, Minn.

[73] Assignee: The Pillsbury Company, Minneapolis, Minn.

[21] Appl. No.: 922,573

[22] Filed: Oct. 23, 1986

[51] Int. Cl.⁴ .............................................. H05B 6/80
[52] U.S. Cl. ..................... 219/10.55 M; 219/10.55 E; 219/10.55 F; 99/DIG. 14; 426/107; 426/241; 426/234
[58] Field of Search .................. 219/10.55 E, 10.55 F, 219/10.55 D, 10.55 M, 10.55 R; 99/451, DIG. 14; 426/241, 243, 234, 107, 108, 112–115, 232; 126/390

[56] References Cited

U.S. PATENT DOCUMENTS

| | | | |
|---|---|---|---|
| 2,485,659 | 10/1949 | Robertson | 219/10.55 E |
| 2,600,566 | 6/1952 | Moffett, Jr. | 99/221 |
| 2,714,070 | 7/1955 | Welch | 219/10.55 E |
| 2,856,497 | 10/1958 | Rudenberg | 219/10.55 E |
| 3,219,460 | 11/1965 | Brown | 219/10.55 E |
| 3,256,101 | 6/1966 | Arns | 99/221 |
| 3,865,301 | 2/1975 | Pothier et al. | 426/107 X |
| 3,983,256 | 9/1976 | Norris et al. | 426/115 |
| 3,985,990 | 10/1976 | Levinson | 219/10.55 E |
| 4,015,085 | 3/1977 | Woods | 219/10.55 E |
| 4,133,896 | 1/1979 | Standing et al. | 426/107 |
| 4,144,435 | 3/1979 | Clark et al. | 219/10.55 E |
| 4,233,325 | 11/1980 | Slangan et al. | 426/107 |
| 4,283,427 | 8/1981 | Winters et al. | 219/10.55 M |
| 4,390,554 | 6/1983 | Levinson | 426/107 |
| 4,789,552 | 12/1988 | Speakman et al. | |
| 4,794,008 | 12/1988 | Schmidt et al. | |

FOREIGN PATENT DOCUMENTS

| | | |
|---|---|---|
| 0155760 | 9/1985 | European Pat. Off. |
| WO86/05072 | 9/1986 | World Int. Prop. O. |

OTHER PUBLICATIONS

Wagter, "Computer Simulation Prodicting Temperature Distributions Generated by MW Absorption in Multilayered Media" Journal of Microwave Power, 19(2), 1984.

Roebuck et al., "Electric Properties of Carbohydrate Water Mixtures of Microwave Frequency," Journal of Food Science, pp. 199–204, Spring, 1972.

Decareau et al., "Microwaves in the Food Processing Industry", Academic Press, Inc., 1985.

R. Y. Otoli, "On the Thermal Modeling of Foods in Electromagnetic Fields," Publ. 4/8/88, Journal of Food Proc. & Preservation, pp. 219–241.

John P. O'Meara, "Using Science for Consumer Prods: An Ismi–CAS Connection", vol. 9, No. 6, 1988, Microwave World pp. 6–11.

H. A. Rubbright, "Microwave Technology & Food Science": Where are They In The Marketplace? vol. 9. No. 6, 1988–Microwave World pp. 12–16.

Microwave Formulation: A New Wave of Thinking, D. Best Prepared Foods pp. 70 et seq., 10/87.

Mathematical Modeling of Microwave Thawing by the Modified Isotherm Migration Method, P. Taoukis et al., Journal of Food Science, vol. 52, No. 2, pp. 455, et seq., 1987.

Heat and Mass Transfer in Water–Laden Sandstone: Microwave Heating, C. K. Wei et al. AICHE Journal vol. 31, No. 5 pp. 842, et seq. 5/85.

(List continued on next page.)

Primary Examiner—Philip H. Leung
Attorney, Agent, or Firm—Robert J. Lewis

[57] ABSTRACT

A method of making a food product for heating in a microwave oven by use of a waveguide containing one or more food products therein. By the proper control through selection and/or varying certain properties of the food product and the container, controlled disposition of microwave power within the food product can be accomplished so that the food product can follow a desired time/temperature relationship and achieve a final desired temperature after exposure to microwave radiation.

42 Claims, 19 Drawing Sheets

OTHER PUBLICATIONS

Microwave Properties and Heating Characteristics of Foods, R. E. Mudgett, Food Technology pp. 84 et seq., 6/86.

Industrial Microwave Heating, A. C. Metaxas, Published by Peter Peregrinus Ltd., pp. 78, et seq., 1983.

Electrical Properties of Foods in Microwave Processing, R. E. Mudgett, Food Technology pp. 109, et seq., 1982.

Microwave Heating of Laminated Materials, C. De Wagter et al., Digest Microwave Power Symposium pp. 225 et seq. 1981.

Microwave Absorption in Multilayered Media Due to Bilateral Illumination, C. De Wagter et al., Microwave Power Symposium Proceedings pp. 18 et seq., 7/83.

Modelling of Microwave Heating Processes, L. Krul, Digest Microwave Power Symposium pp. 77 et seq., 1978.

Aluminum Foil Containers for Microwave Oven Use, International Microwave Power Institute pp. 8 et seq., 9/84.

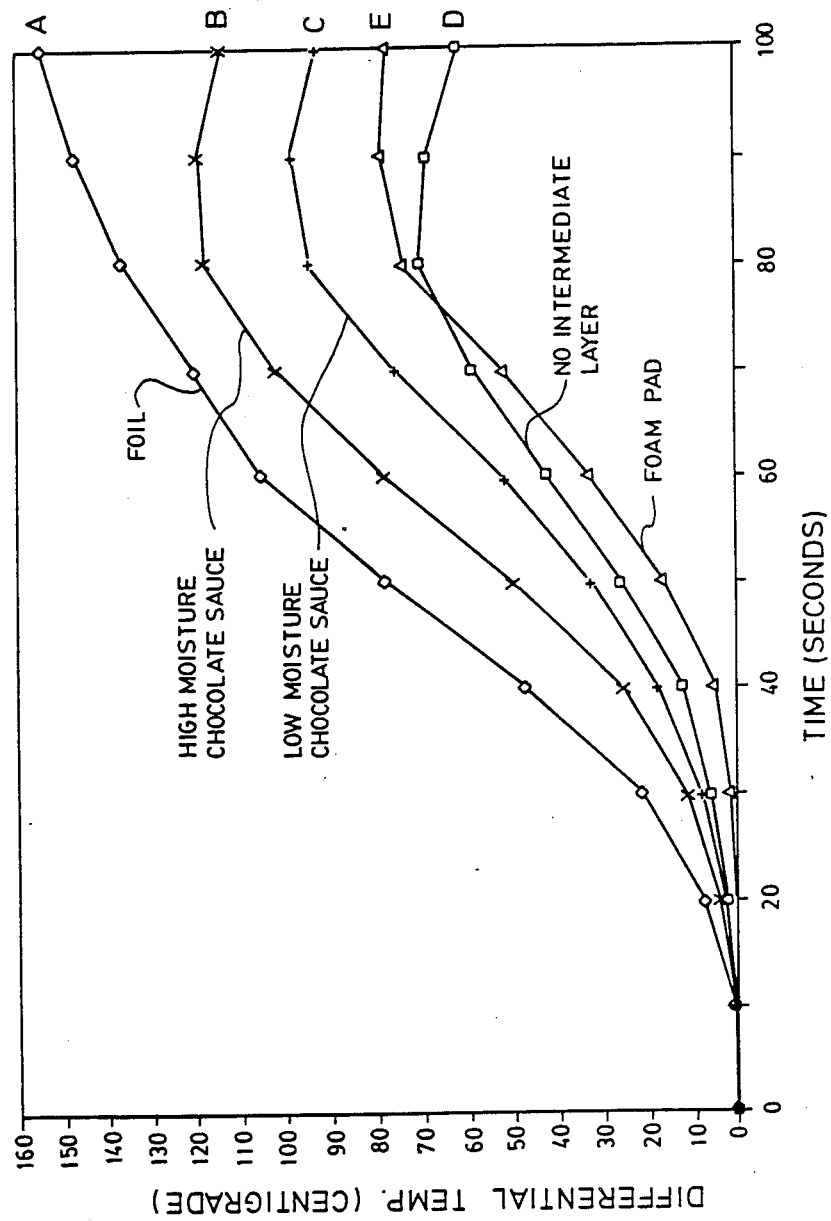

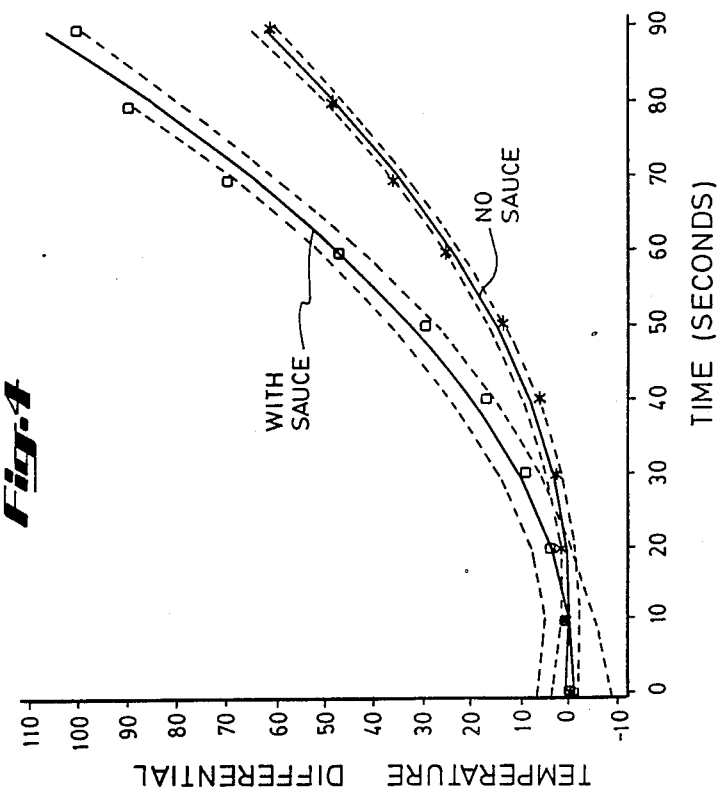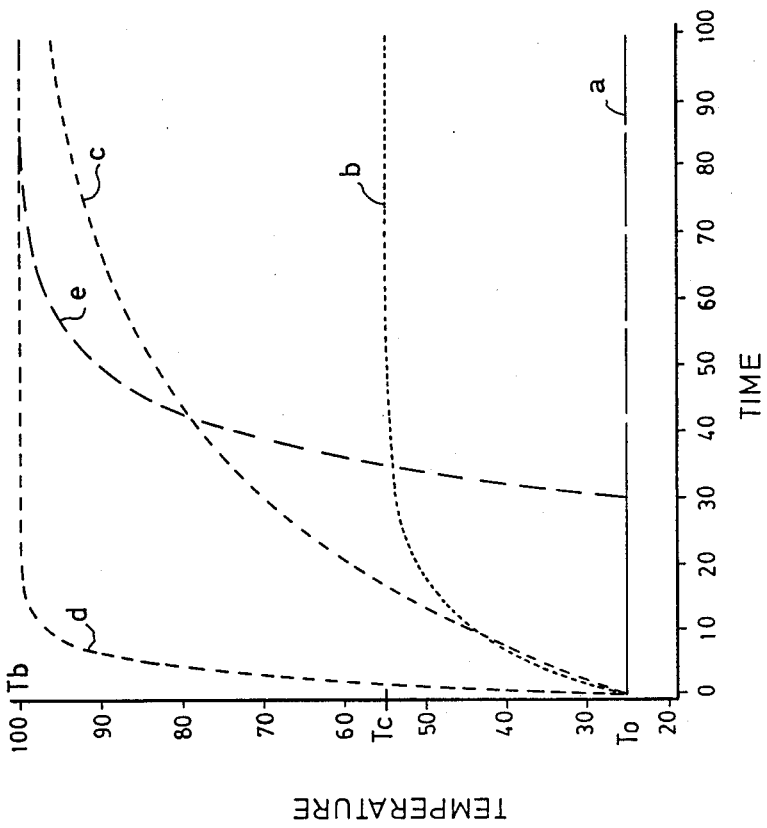

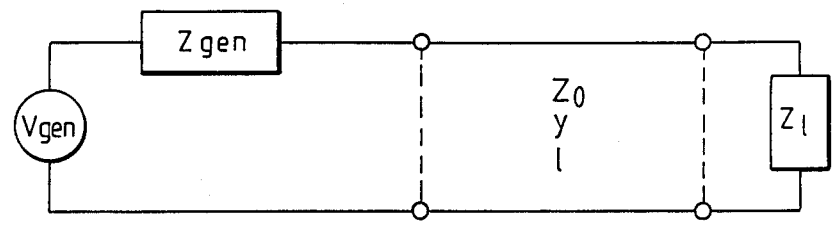
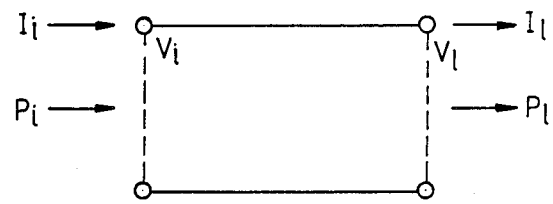
Fig. 5A
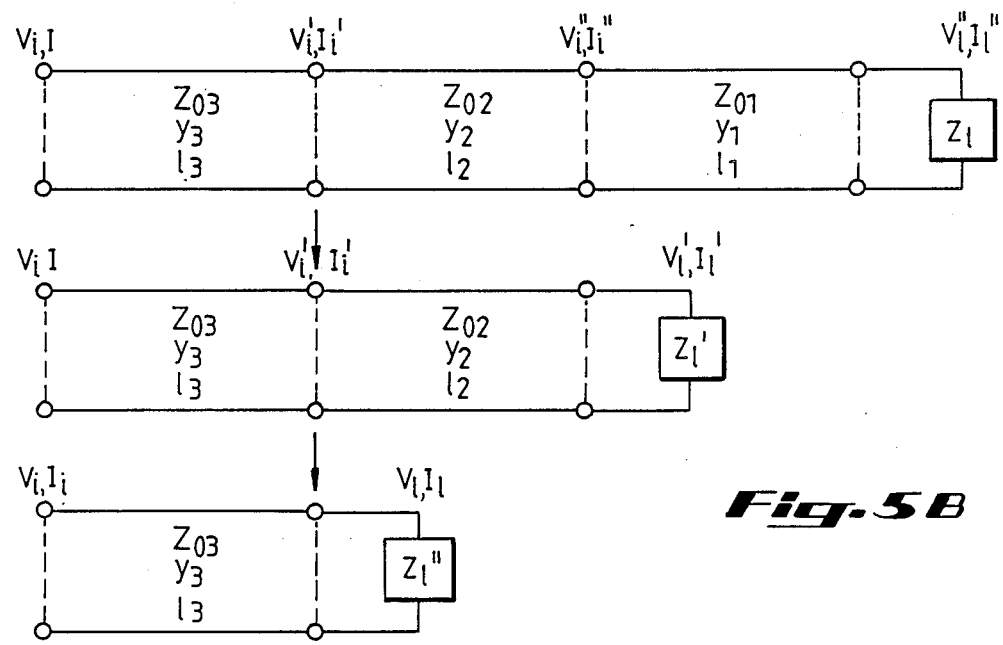
Fig. 5B

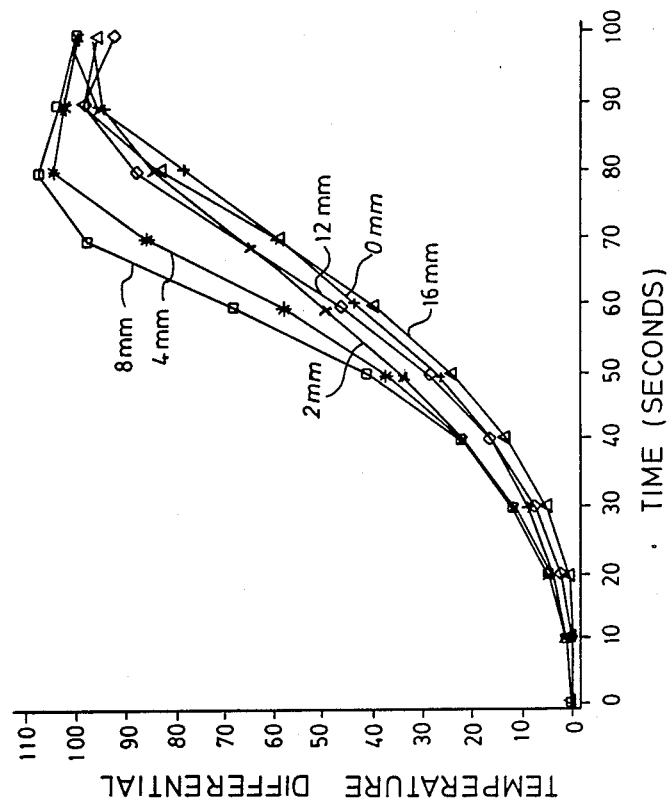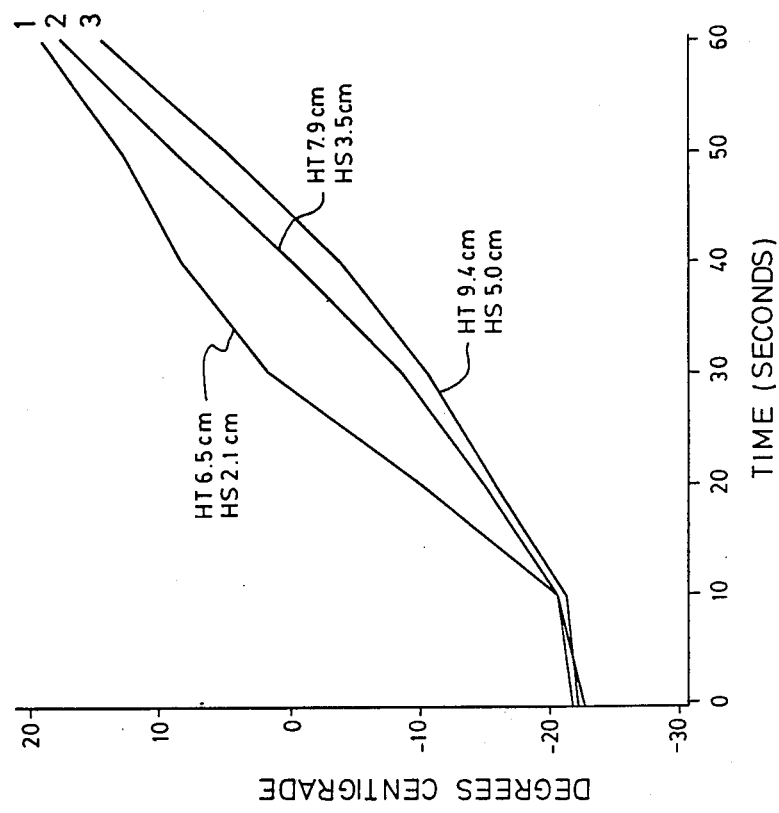

EFFECT OF SAUCE THICKNESS
AND MICROWAVE TIME ON
TEMPERATURE DIFFERENTIAL

PERCENT MICROWAVE POWER AND HEATING RATE VS. SAUCE THICKNESS
REFLECTED POWER, ABSORBED POWER, SHIELDED POWER
RELATIVE HEATING RATE
$E' = 13.0 \quad E'' = 3.5$ PERCENT MICROWAVE POWER AND HEATING RATE VS. SAUCE THICKNESS
REFLECTED POWER, ABSORBED POWER, SHIELDED POWER
RELATIVE HEATING RATE
$E' = 26.0 \quad E'' = 7.0$

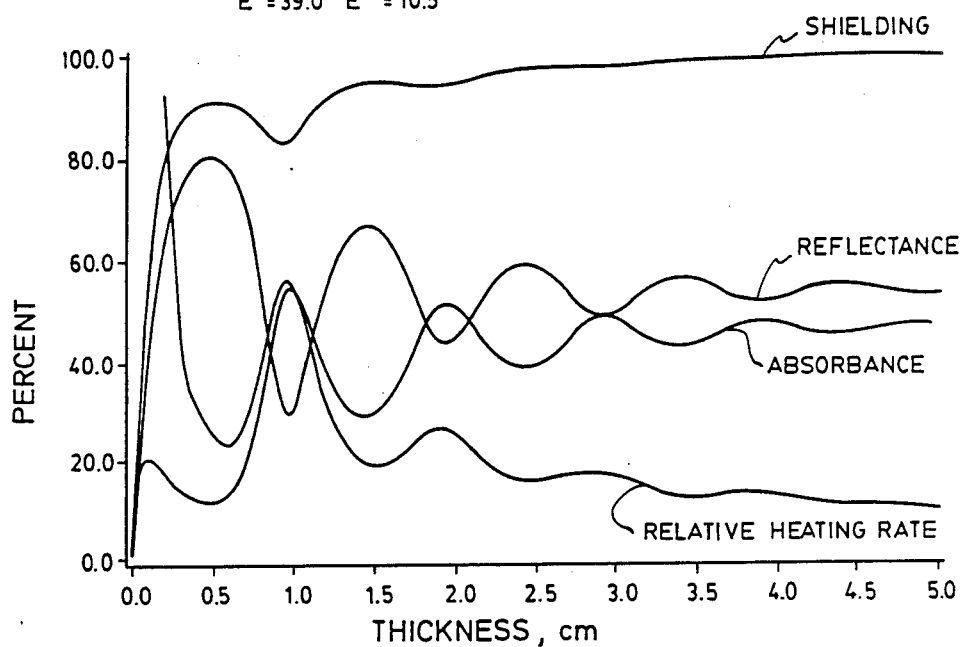
Fig. 9C PERCENT MICROWAVE POWER AND HEATING RATE VS. SAUCE THICKNESS
REFLECTED POWER, ABSORBED POWER, SHIELDED POWER RELATIVE HEATING RATE
$E' = 39.0$  $E'' = 10.5$
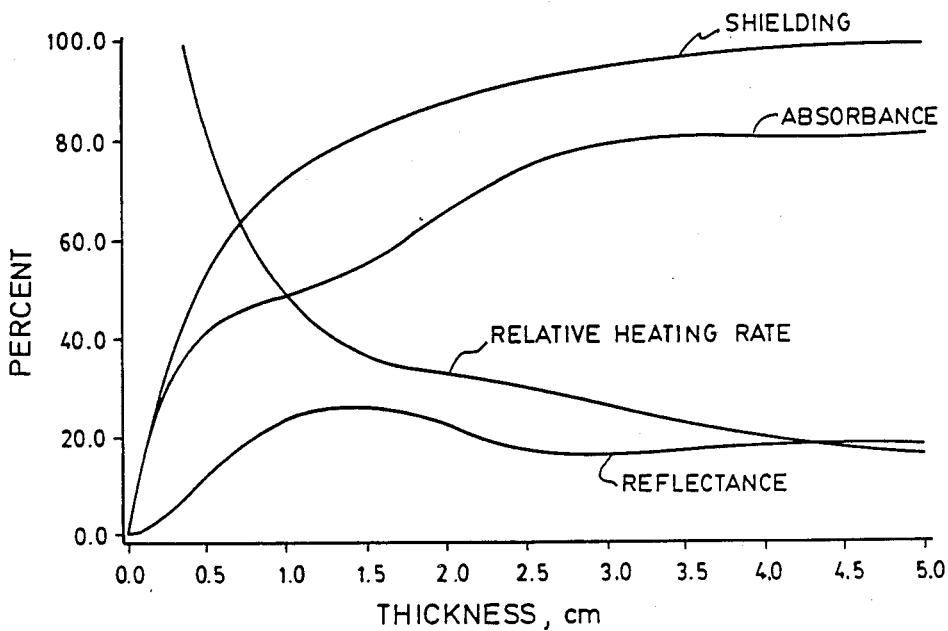
Fig. 9D PERCENT REFLECTED, TRANSMITTED AND ABSORBED POWER VS. THICKNESS
REFLECTED POWER, ABSORBED POWER, SHIELDED POWER RELATIVE HEATING RATE
$E' = 3.0$  $E'' = 3.5$

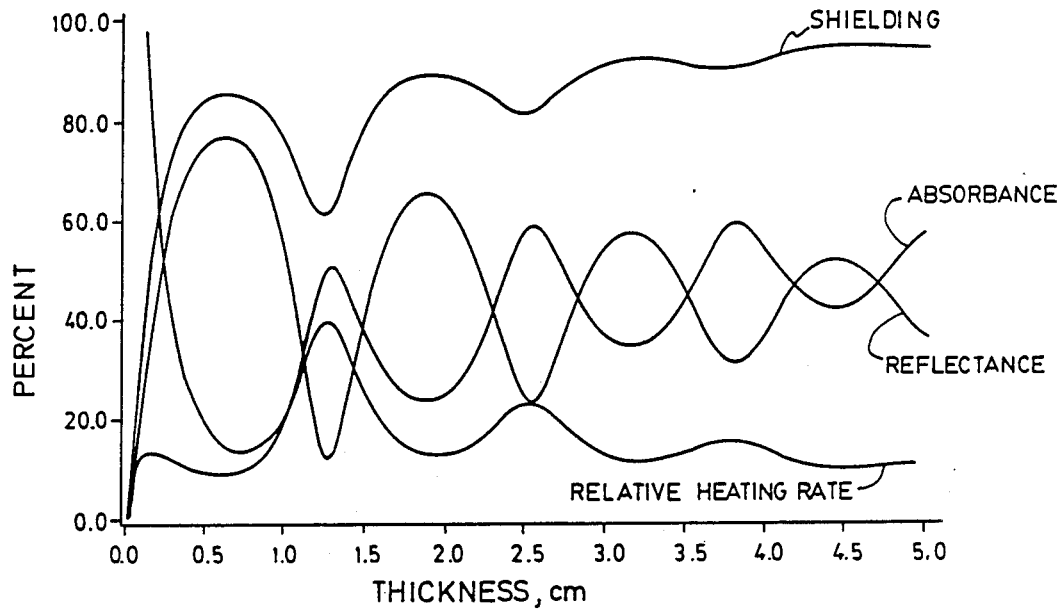
Fig. 9E PERCENT REFLECTED, TRANSMITTED AND ABSORBED POWER VS. THICKNESS
REFLECTED POWER, ABSORBED POWER, SHIELDED POWER RELATIVE HEATING RATE
$E' = 23.0$  $E'' = 3.5$
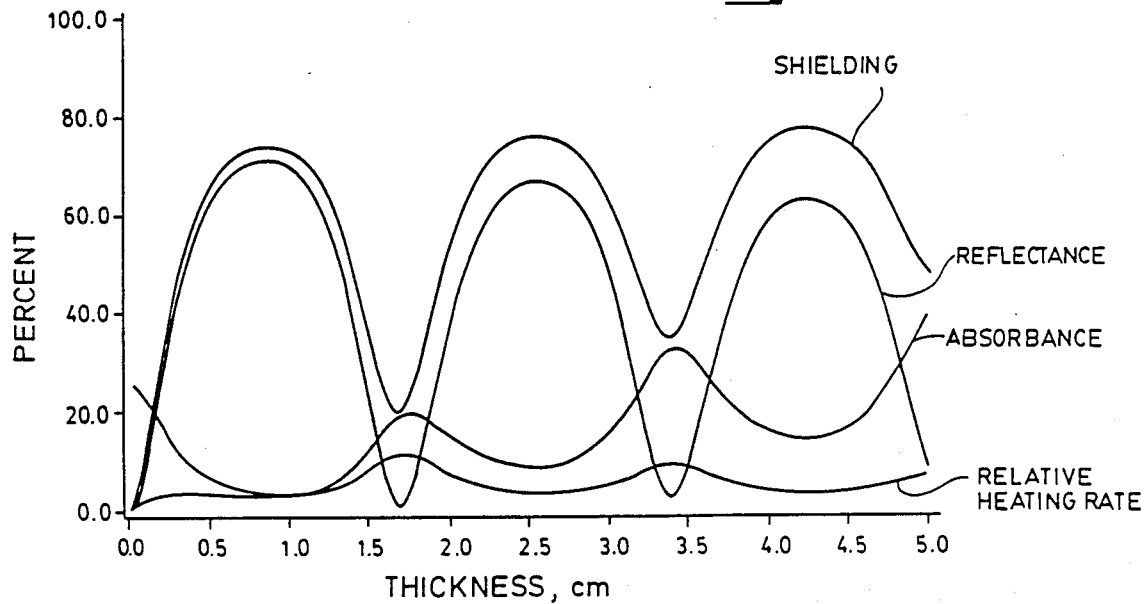
Fig. 9F PERCENT REFLECTED, TRANSMITTED AND ABSORBED POWER VS. THICKNESS
REFLECTED POWER, ABSORBED POWER, SHIELDED POWER RELATIVE HEATING RATE
$E' = 13.0$  $E'' = 0.5$

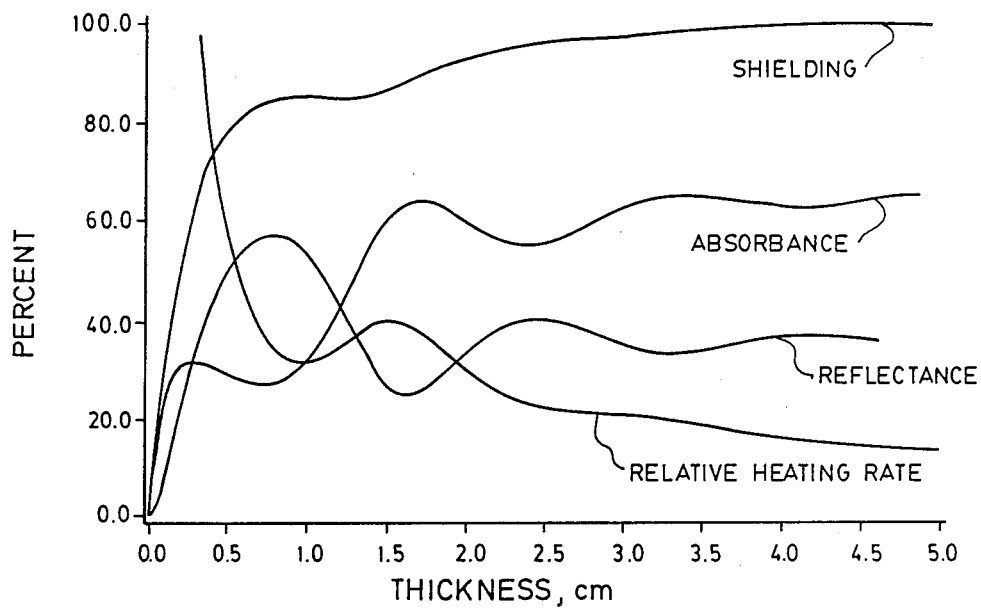
PERCENT REFLECTED, TRANSMITTED AND ABSORBED POWER VS. THICKNESS
REFLECTED POWER, ABSORBED POWER, SHIELDED POWER RELATIVE HEATING RATE
E' = 13.0   E" = 6.5
Fig. 9G
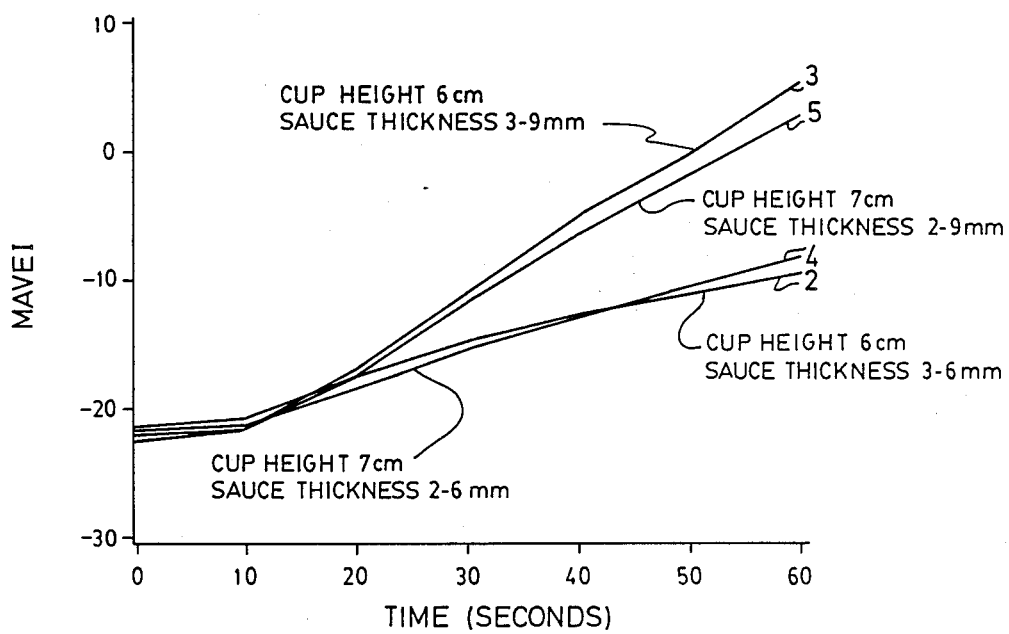
Fig. 10   6.3, 7.2 cm HEIGHTS WITH 6 AND 9mm SAUCES ICE CREAM TEMPERATURES, 7cm DIAMETER

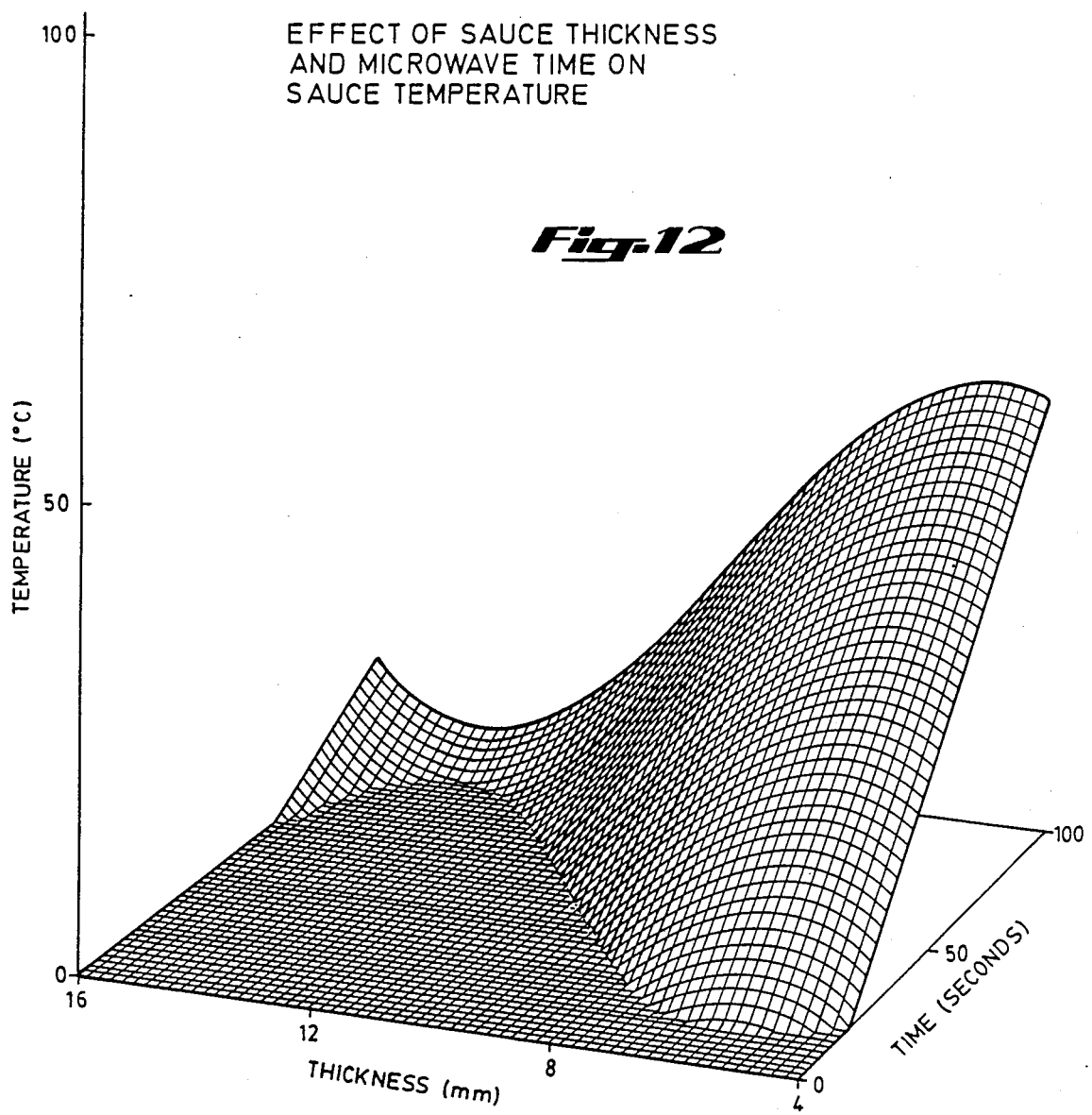

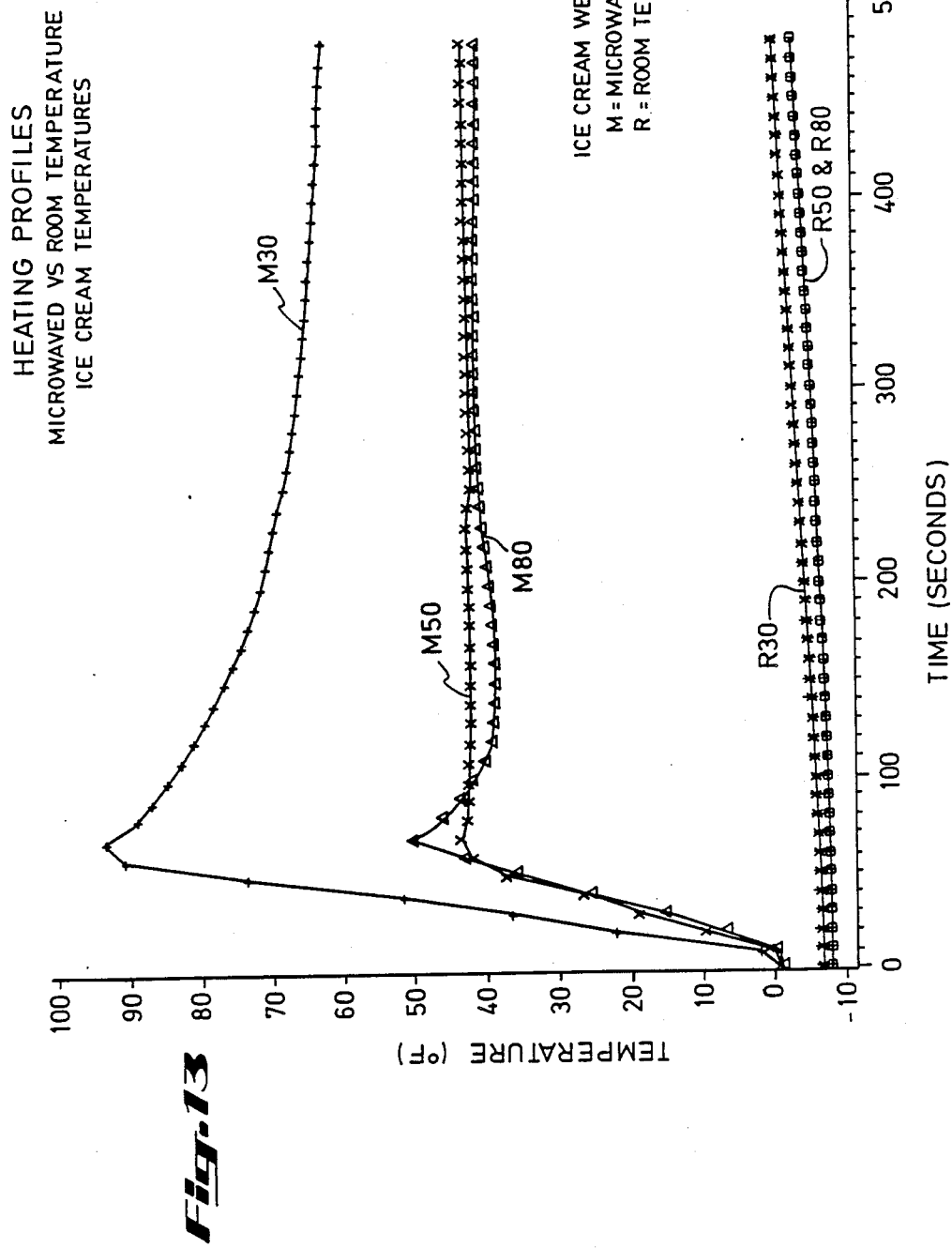

STRAIGHT-WALL CAN
6, 7 & 8 cm DIAMETER-AND-HEIGHT SERIES,
DIFFERENTIAL TEMPERATURES

STRAIGHT-WALL CAN
6,7 & 8 cm DIAMETER AND HEIGHT SERIES,
AVERAGE BROWNIE TEMPERATURE

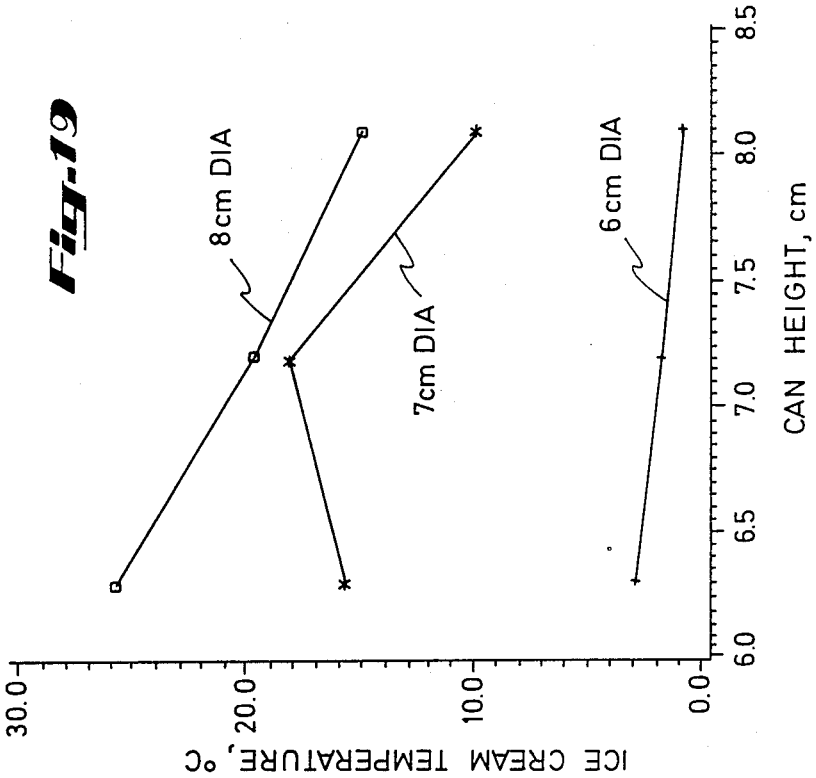
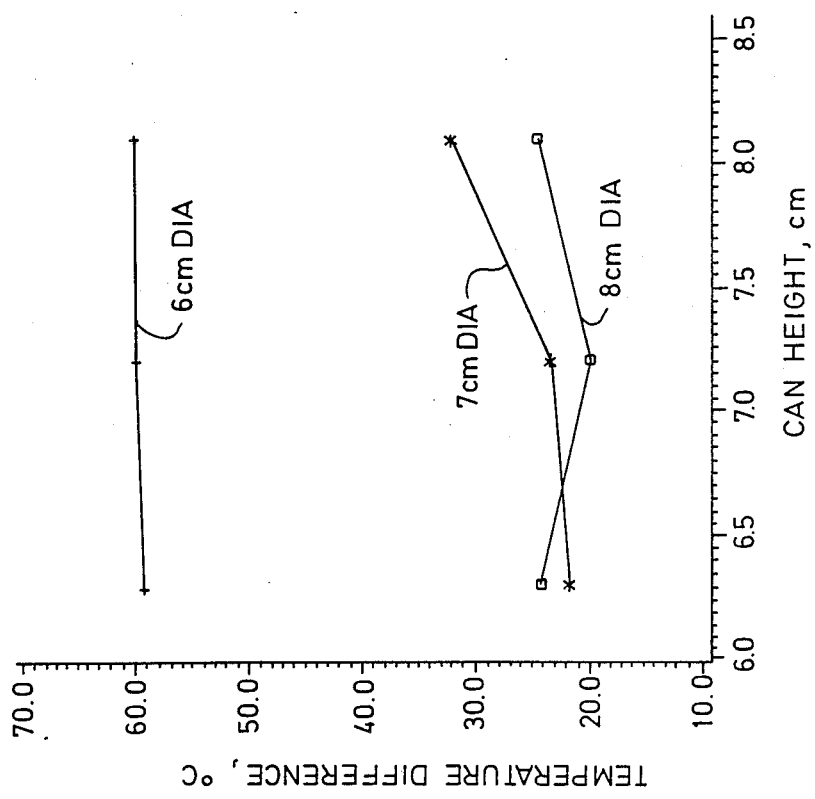

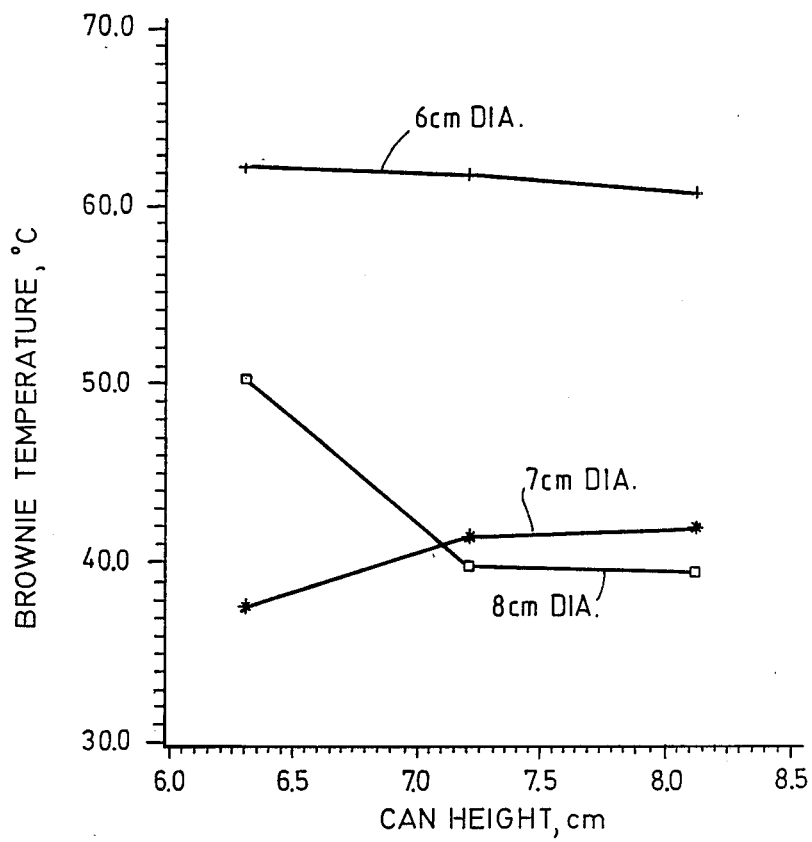

Fig.21A
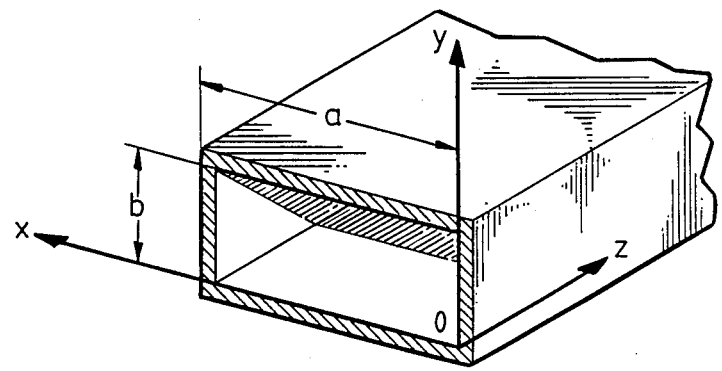
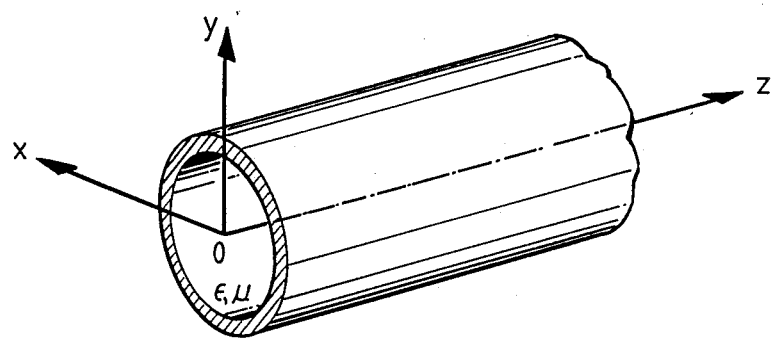
Fig.21B

MICROWAVE FOOD PRODUCT AND METHOD OF MANUFACTURE

BACKGROUND OF THE INVENTION

For many years it has been the goal of microwave food designers to consistently control the heating of foods in a microwave oven so that the food absorbs the appropriate amount of energy in a given time period to reach a predetermined temperature. This has been done empirically requiring many hours of effort with often undesirable and unpredictable results. Design is even further complicated when multiple foods are to be heated together with each food attaining its own final temperature following its own time/temperature relationship. An example of a multi-component product is an ice cream, brownie and sauce product, wherein, the brownie and sauce would heat and the ice cream would remain relatively cold to provide a hot sundae.

Consistent, predicable disposition of energy or power (power is energy dissipation per unit time) within targeted areas of edible materials heated by microwave radiation has been an important and unattained goal for many years. It has been found that by partially surrounding the material to be heated with electrically conductive elements (in the art, usually called "shielding") one can under certain conditions as hereinafter described, obtain an unprecedented degree of control of the heating process. Specifically, a product comprised of one or more layers is placed in a structure or container which has at least one electrically conductive wall and whose cross-sectional shape might be circular, rectangular, ellipitcal, triangular, square, spaced apart or parallel plates, or any other convenient shape. This structure or container, which functions essentially as a waveguide, might be closed at one end with an electrically conducting closure element or it might be open. Its cross-sectional dimensions might be constant or variable. Surprisingly it has been found that by manipulation of product layer dimensions, position of a food product relative to the conductive manner, dielectric properties, and the dimensions and electrical conductivity of the waveguide structure one can consistently and predictably control the relative heating rates of the several components comprising the product to be heated.

U.S. Pat. Nos. 2,600,566 to Moffett and 2,714,070 to Welch both address controlled exposure by use of metal cups to control heating of the ice cream therein while the sauce heated. Further work in this art are exemplified by U.S. Pat. No. 4,233,325 to Slangan et al in which there is a completely metallic container with two compartments with the ice cream containing compartment being completely shielded by metal while the sauce containing compartment has a microwave transparent lid which allows the sauce to heat. Thus, it can be seen that the progress in this art has been to go back to completely metal-shielded portions and partially metallic-shielded portions to obtain appropriate heating results. Also, selective heating of products has been done by using metal shields with various size apertures over various portions of the food products contained therein to affect the heating thereof. However, the design of these shields and foods has been largely empirical and the lack of such products on the market probably indicates that such attempts have probably not been very successful.

Even though household microwave oven penetration has grown significantly in the last five years, very few food products have been successfully designed for use in the microwave oven, probably due to the lack of predictable behavior. Thus, even though microwave ovens are popular, the users of microwave ovens still find them objectionable because of the lack of reliably performing food products usable therein.

Therefore, it would be desirable to provide better control for the heating of food products in a microwave oven such that predicatable and consistent results can be obtained. Further, it has been desired for many years in the food industry to know how to design products without large amounts of R & D efforts both by people and in terms of cost to predict the behavior of foods while being heated in a microwave oven. Both of these have been long desired goals, but to date have apparently not been very successfully fulfilled and are objects of this invention.

The present invention overcomes the above difficulties by providing means and method for making food products for microwave ovens which provide predictable and understandable behavior.

An object of the present invention is to provide a method for manufacturing and designing food products with predictable performance for use in a microwave oven.

Another object of the present invention is to provide food products that consistently perform and are tolerant to heating in a microwave oven.

Another object of the present invention is to provide a method for making food products to be used in combination with conductive shielding in a microwave oven.

BRIEF DESCRIPTION OF THE DRAWINGS

FIG. 2 is a graph showing the functional relationship between temperature differential, i.e., the temperature of the brownie minus the temperature of the ice cream, and microwave heating time for various multi-component food systems having different intermediate layers: a metal foil, chocolate sauce with 24% water, a silicone foam insert, chocolate sauce with 37% water, and no intermediate layer.

FIG. 3 is an illustration generally showing possible functional relationships between temperature and microwave heating times for the various cases described herein.

FIG. 4 is a graph showing a functional relationship between temperature differential and microwave heating time, for brownie-sauce-ice cream products as shown in FIG. 1A, with and without the sauce layer.

FIGS. 5A and 5B are transmission line analysis diagrams.

FIG. 6 is a graph showing the functional relationships between ice cream temperatures and microwave heating time for a brownie-sauce-ice cream product in an 8 cm. diameter straightwall container with various heights: 6.5 cm., 7.9 cm. and 9.4 cm.

FIG. 7 is a graph showing functional relationships between temperature differential and microwave heating time as a function of chocolate sauce layer thickness using a sauce with 24% moisture in a multi-component food system as shown in FIG. 1A.

FIG. 10 is a graph showing the functional relationship between ice cream temperatures and microwave heating time for a brownie-sauce-ice cream product in a 7 cm. diameter straight wall container with different heights (6.3 cm. and 7.2 cm.) and different chocolate sauce thicknesses (6 mm and 9 mm).

FIG. 12 is a three-dimensional representation of a mathematical model showing a functional relationship between chocolate sauce temperature, sauce thickness, and microwave heating time for a sauce having a 24% moisture in a multi-component food system as shown in FIG. 1A having ice cream and brownie on opposite sides of the sauce layer.

FIG. 13 is a graph showing functional relationships between ice cream temperatures and heating time for products similar to that in FIG. 1A that had different ice cream weights and heated in two different ways, in a microwave oven and sitting in a room at room temperature.

FIG. 18 is a graph showing the functional relationships between differential temperatures and container height for three different diameters (6 cm., 7 cm. and 8 cm.) at 50 seconds of microwave heating time.

FIG. 19 is a graph showing the functional relationships between ice cream temperatures and container height for three different diameters (6 cm., 7 cm. and 8 cm.) at 50 seconds of microwave heating time.

FIG. 20 is a graph showing the functional relationships between brownie temperatures and container height for three different diameters (6 cm., 7 cm. and 8 cm.) at 50 seconds of microwave heating time.

FIGS. 21A and 21B are illustrations of typical waveguides used to demonstrate principles of transmission line analysis described herein.

DETAILED DESCRIPTION

The physics of microwaves in a food system is extremely complicated and little is known about how microwave heating in foods is accomplished. The complication, in large part, could be due to the fact that food systems themselves are extremely complicated, presenting many looks to the microwave field. Such things as preferential heating, the differing chemical natures of foods, the large effect of temperature changes, nonhomogeneity, the varying locations that discreet food items with different microwave characteristics are positioned next to one another within a single food system, hot and cold spots in an oven, etc. effect microwave heating performance. Further, the lossiness of foods varies widely between foods. These all complicate the food scientist's and package designer's jobs in designing food products for heating in a microwave oven. Also, collection of reliable performance data has been difficult particularly when little is known about heating characteristics.

Figure 9A:
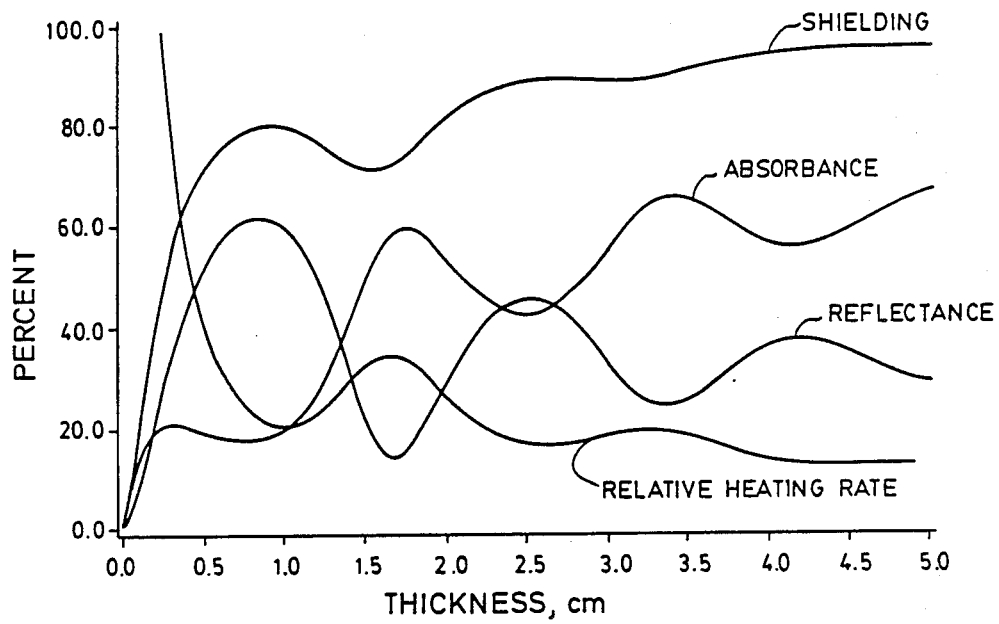
FIGS. 9A, B, and C are graphs showing functional relationships between four variables; reflected power, absorbed power, shielded power, and relative heating rate (absorbance/thickness) each as a function of shielding layer thickness for a shield layer having relative dielectric constant (E') (hereinafter dielectric constant) values of 13, 26, and 39 and relative dielectric loss factor (E'') (hereinafter dielectric loss factor) values of 3.5, 7.0 and 10.5, respectively. E' is the real part and E'' is the imaginary part of the complex permittivity as is well known to those skilled in the art. See, for example, A. Von Hippel, *Dielectric Materials and Applications*, MIT Press, 1954.

In developing the hereinafter described brownie-sauce-ice cream product, certain discoveries were made about the characteristics of the edible components of these systems and their interaction with electrically conductive materials which were a surprise. Interference analysis techniques, as hereinafter described, show that an increase in thickness in excess of a minimum does not necessarily substantially change the shielding value and a change in thickness above the minimum can simultaneously change absorbance and reflectance oppositely in cycles. Further, as can be seen in FIGS. 9A, B, and C, absorbance and reflectance cycles with increasing thickness in an opposing manner as thickness increases over small dimensional changes allowing great latitude in product design. The combination of the low microwave transmission of certain food components and the small role that heat conduction and other forms of heat transfer can play, provided a basis for achieving controlled differential heating in multi-component food systems, i.e., two or more food or edible components positioned adjacent or proximate to one another. Within a given time of heating in a microwave oven one can achieve predictable and controlled temperatures which were different, say for example, 11° C. or more, with some differentials being as high as 65° C. to 80° C. and even as high as 110° C. (See FIG. 4) over small distances, for example the 2 cm between ice cream and the brownie. Even more surprising is that the food systems of this invention are tolerant to different ovens and varying heating times. These tolerances are important for the effective preparation of the items by consumers.

Tolerance is important because of timer variation from oven to oven, the different power outputs of different ovens and because of the hot/cold spot phenomena in ovens. This means that for a given time of exposure, the amount of available energy for heating a food product can significantly vary thereby causing the product to be either overheated or underheated. Without tolerance, consumer acceptance of heat sensitive food products could be unacceptably low. Tolerance of products is dependent on the particular product being heated, the particular oven and the consumer concept of quality for that particular product. For example, ice cream, which is very sensitive to heating, has a very small heat tolerance range. Quality ice cream should be stiff or viscous and not soupy. In contrast, soup, which is not sensitive to heating, would be very tolerant. What is meant by tolerance herein, is that given the above described variabilities in microwave ovens, etc., that a substantial percent of the products after being heated in a microwave oven according to the instructions will have a level of quality acceptable to the consumer. Tolerance can be tested organoleptically which is a standard procedure in the food industry.

In order to better understand the invention, a discussion of microwave radiation and elements of electromagnetic theory are provided.

Microwaves, like any other form of electromagnetic radiation, are propagated in waves composed of electric and magnetic components. A primary result of Maxwell's equations is that a time-varying electric field must generate a time-varying magnetic field and vice versa.

Thus, if one generates a time-varying electric field, say by sinusoidally accelerating electric charges in an antenna, the resulting electric field strength varies sinusoidally too and generates a sinusoidally varying magnetic field. In free space the two fields are out of phase by 90 degrees. Thus, as the electric field is sinusoidally decaying from its maximum toward zero the magnetic field is approaching its maximum. The time-varying electric component has "all" been converted to a magnetic component, but the magnetic component now decays and regenerates the electric component. In this way the electromagnetic field generated by the antenna propagates through space ad infinitum.

In free space at a distance many wavelengths from the antenna the wavefront is, to good approximation, essentiallly planar (i.e., there are plane waves), and the magnetic and electric field components are mutually perpendicular and are perpendicular to the direction of propagation. This is called a TEM field (Transverse ElectroMagnetic) because the magnetic and electric components are both transverse to the direction of propagation. Only TEM fields can propagate in free space, as discussed above.

When such a field encounters a region of space bounded (or partially bounded) by electrically conducting walls Maxwell's equations require the formation of TM and TE fields at the expense of the TEM field. Further, Maxwell's equations require that both fields be zero at the walls; the result is reflection at the walls and generation of currents at the wall surface.

In TM fields, the magnetic component only is prependicular to the propagation direction. Therefore the electric component is in the propagation direction.

In TE fields, the electric component is transverse to propagation so the magnetic component is in the propagation direction.

When waves are confined by reflecting walls various modes arise which in the simple case of a rectangular waveguide can be pictured as being synthesized from reflected waves with particular reflection angles. Boundary conditions require the field at the wall be zero and therefore only reflection angles which allow an exactly integral number of half wavelengths to span the gap between walls are allowed. When such a condition is met the waves add vectorially to made a new wave which is called a TM or TE mode depending on the orientation of the electric and magnetic components relative to the direction of propagation. Thus there are families of the TE modes and families of TM modes.

Since wavelength depends on the dielectric properties of the medium the wave is in, these along with the geometry and the separation of the conducting walls determine which modes may exist in each circumstance. Each mode has a unique wavelength and penetration depth; in any particular medium; properties sensitive to interference phenomena like reflection, absorbance and transmission will also be different in each circumstance for each mode.

When a particular mode is not allowed in a material it is said to be "below cutoff". Although frequency does not vary significantly in a microwave oven the concept of a cutoff frequency is useful because it represents a threshold: a mode whose frequency is below the cutoff frequency represents a wavelength too long to "fit" under the particular circumstance of geometry and dielectric properties. Thus, if we know the propagation and power delivery characteristics of the various available modes, one can manipulate or adjust the system to achieve a desired result.

Although the "cutoff" phenomenon is usually described in terms of the cutoff frequency, and cutoff frequency is the term most used technically, the cutoff phenomenon can also be described alternatively by the cutoff wavelength. The relationship between the cutoff frequency ($f_c$) and the cutoff wavelength ($\lambda_c$) is shown by the following formula.

$$\lambda_c = \frac{1}{\sqrt{\mu\epsilon}\ (f_c)} . \qquad 1.$$

$\mu$ = permeability of the particular medium
$\epsilon$ = permittivity of the particular medium.

Since $\mu\epsilon$ for any material at a specified temperature is a constant, a new constant, k, can be defined as:

$$k = \frac{1}{\sqrt{\mu\epsilon}} . \qquad 2.$$

In this way, Equation 1 can be written as:

$$\lambda_c = \frac{k}{f_c} . \qquad 3.$$

It is thus seen that the cutoff wavelength, $\lambda_c$, and the cutoff frequency, $f_c$, are inversely related within a constant value, k.

In some circumstances, no modes are allowed in a downstream medium. Downstream means in the direction of wave propagation, upstream is the direction opposite to wave propagation. Then, the energy incident on that boundary will be divided between a reflected traveling wave and an evanescent wave (stationary, non-propagating) extending beyond the boundary and which decays exponentially into the downstream medium. If the penetration depth is short compared to the layer thickness (and evanescent modes are often characterized by short penetration depths and high reflection coefficients) then essentially no power will pass beyond the boundary under discussion. If the evanescent wave reaches the next boundary and one or more propagating modes are allowed in that layer, those modes will continue to propagate in downstream layers as has been described above. If a mode is not allowed its energy or power is unavailable in the non-allowing or downstream layers for heating. Each mode gets a share of the total energy and the allowed mode energy is available for heating.

More simplistically stated, if the power that would have been carried in one of the modes of a microwave is not allowed, then substantially all of the power that would have been carried in that particular mode will not be delivered to the dielectric material in the waveguide. If none of the modes are allowed substantially no power will be delivered to the dielectric material in the waveguide. In the latter case substantially no microwave energy can enter that particular waveguide filled with that particular dielectric substance. Consequently, the dielectric material cannot absorb any substantial microwave radiation and it will not heat at an appreciable rate.

This process is complicated if a waveguide is of a complex geometry or if the waveguide is occupied by layers of materials with different relative dielectric constants. By holding waveguide geometry constant, the wavelengths and allowed modes of the microwave (transverse electric or transverse magnetic) are primarily dependent on the dielectric materials and their geometries in the waveguide. Thus, in one particular layer microwave energy can be carried in only one form (i.e., transverse electric) but as the energy crosses a boundary into another dielectric material (with its accompanying characteristic wavelengths) it may be carried by other forms. Similarly, if the next dielectric layer disallows any form, effectively no microwave energy will cross the boundary and it will be disallowed. Therefore, the amount of microwave energy traveling through one of the dielectric materials is influenced by all components of the system.

If one chooses to keep the material in the waveguide constant then the primary waveform determining factor is the waveguide dimensions (geometry). If the waveguide dimensions change as the microwave travels through the waveguide the allowed and disallowed modes may change and a similar result as described in the preceding paragraph may occur.

It has been previously discussed that a waveguide has two possible propagation modes for the electromagnetic field patterns, transverse electric and transverse magnetic. These modes discriminate between the two conditions of whether a magnetic or electric field (respectively) is in the direction of propagation of the wave. Within each of the aforementioned modes there exists a plurality of "sub modes", which will henceforth be referred to simply as modes. These modes discriminate between the various allowable field patterns of the remaining electric and magnetic fields making up the entire electromagnetic field propagating through a waveguide.

These modes can be illustrated using a waveguide with rectangular cross section, see FIG. 21A, as an example.

For transverse electric waves in a rectangular waveguide as illustrated in FIG. 21A, there are five general equations describing the fields patterns in the guide.

$$H_z^o(x,y) = H_o \cos\left(\frac{m\pi}{a} x\right)\cos\left(\frac{n\pi}{b} y\right). \quad 1.$$

$$E_x^o(x,y) = \frac{jw\mu}{h^2}\left(\frac{n\pi}{b}\right)H_o \cos\left(\frac{m\pi}{a} x\right)\sin\left(\frac{n\pi}{b} y\right). \quad 2.$$

$$E_y^o(x,y) = -\frac{jw\mu}{h^2}\left(\frac{m\pi}{a}\right)H_o \sin\left(\frac{m\pi}{a} x\right)\cos\left(\frac{n\pi}{b} y\right). \quad 3.$$

$$H_x^o(x,y) = \frac{\gamma}{h^2}\left(\frac{m\pi}{a}\right)H_o \sin\left(\frac{m\pi}{a} x\right)\cos\left(\frac{n\pi}{b} y\right). \quad 4.$$

$$H_y^0(x,y) = \frac{\gamma}{h^2}\left(\frac{n\pi}{b}\right)H_o \cos\left(\frac{m\pi}{a} x\right)\sin\left(\frac{n\pi}{b} y\right). \quad 5.$$

$$h^2 = \left(\frac{m\pi}{a}\right)^2 + \left(\frac{n\pi}{b}\right)^2.$$

$$\gamma = j\sqrt{w^2\mu\epsilon - \left(\frac{m\pi}{a}\right)^2 - \left(\frac{n\pi}{b}\right)^2}$$

$$w = 2\pi f$$

It is seen that the fields depend on the dimensions, a and b, the magnetic permeability, $\mu$ and dielectric permittivity, $\epsilon$, and the frequency, f. The dielectric permittivity is related to the relative dielectric constant E' and the relative dielectric loss factor E'' by $\epsilon = E' - jE''$. The quantities m and n are integer constants used to discriminate between all of the individual "sub modes". These modes are written as $TE_{mn}$.

Take for example the case where m=1 and n=0. This is the $TE_{10}$ mode. The field patterns then come from Equations 1 through 5 below:

$$H_z^o(x,y) = H_o \cos\left(\frac{\pi}{a} x\right). \quad 1.$$

$$E_x^o(x,y) = 0. \quad 2.$$

$$E_y^o(x,y) = \frac{jw\mu}{h^2}\left(\frac{\pi}{a}\right)H_o \sin\left(\frac{\pi}{a} x\right). \quad 3.$$

$$H_x^o(x,y) = \frac{\gamma}{h^2}\left(\frac{\pi}{a}\right)H_o \sin\left(\frac{\pi}{a} x\right). \quad 4.$$

$$H_y^o(x,y) = 0. \quad 5.$$

$$h^2 = \left(\frac{\pi}{a}\right)^2$$

$$\gamma = j \sqrt{w^2 \mu\epsilon - \left(\frac{\pi}{a}\right)^2}$$

Each mode has its own field patterns, cutoff frequency, characteristic impedance, propagation constant, and is capable of transmitting energy as the wave propagates through the wave guide.

One can describe these field patterns in terms of time instead of using complex numbers as above. The field patterns then become:

$$H_z(x,y,z,t) = H_o \cos\left(\frac{\pi}{a} x\right) \cos(wt - \beta z). \tag{1}$$

$$E_y(x,y,z,t) = \frac{w\mu a}{\pi} H_o \sin\left(\frac{\pi}{a} x\right) \sin(wt - \beta z). \tag{3}$$

$$H_x(x,y,z,t) = -\frac{\beta a}{\pi} H_o \sin\left(\frac{\pi}{a} x\right) \sin(wt - \beta z). \tag{4}$$

$$\beta = j \sqrt{w^2 \mu\epsilon - \left(\frac{\pi}{a}\right)^2}$$

$$w = 2\pi f$$

The non-lossy case was used throughout to simplify the equations, but does not alter the description of the field mode concept. A dissertation on waves and waveguide modes can be found in "*Field and Wave Electromagnetics*" by David K. Cheng published 1983 by Addison-Wesley Publishing Company which disclosure is incorporated herein by reference.

Perhaps the best illustration of this principle is a practical example of a brownie, chocolate sauce, and ice cream in an aluminum cylinder (waveguide) that is closed on one end with an aluminum lid. Air comprises the space directly below the lid followed successively by the ice cream, sauce, and brownie. All forms of microwave energy in the air layer in a cylinder of this type are disallowed if the radius of the cylinder is by theory and as calculated by the following compute program less than 3.6 cm. Therefore, the thickness of the air layer in a system where the radius exceeds 3.6 cm will affect the heating rate of the layers below it because microwave energy will be allowed. This is because interference will occur due to reflection off the aluminum lid. If the radius is below 3.6 cm no microwave energy is allowed in the air space. Therefore no reflection off the lid can occur, no resultant interference patterns can develop, and the thickness of the air layer is inconsequential.

Comparison of the heating curves from two different experiments for the ice cream component in an 8 cm diameter cup (FIG. 6) and for the ice cream component in a 7 cm diameter cup (FIG. 10) illustrate this surprising effect of the microwave energy "cutoff". When the energy is allowed in the air space (headspace) as in FIG. 6, the height of the can and subsequently the amount of headspace have an effect on the heating curves. In this case when the headspace is low (Line 1, can height 6.5 cm, headspace 2.1 cm) the ice cream heats more rapidly than when the head space is high (Line 3, can height 9.4 cm, headspace 5.0 cm). When energy is not allowed in the headspace as is the case in the 3.5 cm diameter can in FIG. 10, the thickness of the headspace layer does not influence the heating rate of the ice cream layer. This is clear when Line 2 (can height 6.3 cm, low headspace, 0.6 cm sauce layer) is compared to Line 4 (can height 7.2 cm, higher headspace, 0.6 cm sauce layer) or when Line 3 and Line 5 are compared (0.9 cm sauce layer). The thicknesses of the brownie layer and ice cream layers were constant throughout these comparisons.

Arcing and microwave field regeneration in conductive members or walls are described in co-pending U.S. patent application entitled Food Container and Methods of Manufacture by Dan J. Wendt Ser. No. 922,287 filed contemporaneously herewith. The disclosure therein is incorporated herein by reference.

The following provides an understanding of the interference effect of microwave radiation in food products. Interference analysis is one means of analyzing microwave heating. The following interference analysis technique is based on free space systems and is an effective tool for system design and can be used to determine power and energy distribution in food products like transmission line analysis techniques.

Figure 1A:
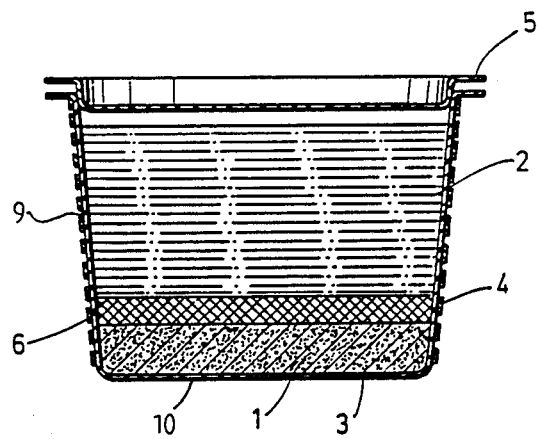
FIGS. 1A and 1B are side-sectional views of multi-component food products.

FIG. 1A shows a food system which was a basis for the present invention. Food item or component 1 is a brownie and food item or component 2 is ice cream. It was desired to heat the brownie to a serving temperature of approximately 43° C.–60° C. while the ice cream remained "frozen", i.e., at a temperature of approximately −9° C. or colder without appreciable localized melting of the ice cream for example at the interface between the brownie and ice cream. As used herein, unless otherwise designated, frozen means the product is at a temperature of less than 0° C. Container 3 has a conductive shield 4, preferably metal, on the sidewall 9, extending from the top down to approximately the top surface of the brownie as used herein conductive means the item has a conductivity of about $1 \times 10^5$ Siemens/Meter or greater. The top of the container also has a shielding closure or lid 5, preferably metal, to shield incident radiation from the sides and top of the ice cream. The container 3 has a microwave transmissive portion such as the bottom 10. This portion is preferably transparent to microwave radiation. The lid 5 is removably secured to the container 4 and can be glued or heat sealed on and can be a piece of metal foil or microwave transmissive or transparent material, for example, aluminum foil or plastic or paper, attached to the top of a container in a manner as is known in the art. The shield or control layer 6 is positioned between the layers 1 and 3.

Figure 1B:
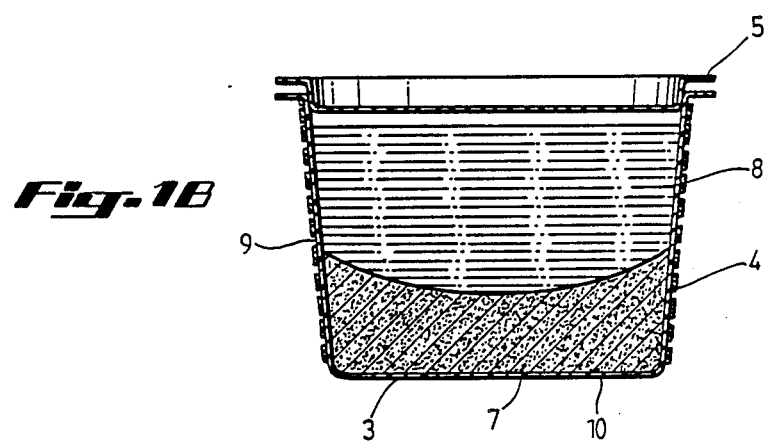

FIG. 1B illustrates another form of product which contains two different edible products 7 and 8. For example, layer 7 can be a sauce, shielding or control layer positioned inside cup 3. The cup 3 can also have the shield 4 therearound. The lid 5 shields the open end of the cup 3 and, as seen in FIGS. 1A and 1B, can be recessed in the cup 3. The layer of product 8 can be, for example, ice cream. The form of the invention shown in FIG. 1B can be, for example, a layer of cheese sauce 7 and a layer of broccoli 8.

In the development of the product shown in FIG. 1A, a three layer system was initially used, i.e., a layer of brownie, a layer of sauce thereon, and a layer of ice cream on top of the sauce. It was noted that when the layer of sauce was eliminated there was more heating and melting of the ice cream. Then, various control layers were interposed between the brownie and ice cream. It was initially believed that the improved performance from the sauce layer was due to the thermal insulation of the intermediate layer. To test this theory, experiments were conducted using aluminum foil and a silicone foam insert as the intermediate layer. The results of that type of experimentation are shown in FIG. 2. The surprise was that it was not thermal insulation which was making the sauce layer prevent heating of the ice cream, but it was in fact the nontransmission of microwave energy to the ice cream. This is graphically shown by the fact that the highest temperature differential is achieved by a very good conductor of heat and a perfect reflector of microwave energy, i.e., the aluminum foil, while the good insulator and high transmitter of microwave energy, provided one of the lowest temperature differentials. At this same time, a theoretical understanding based on interference analysis techniques was being developed which explained the phenomenon of reflectivity and absorbance as functions of thickness and dielectric properties of certain types of food products.

Thus, by interposing an unneeded intermediate edible layer 6 of sauce between the ice cream 2 and the brownie 1, which was initially added only for meeting the definition of the product concept, i.e., a brownie with chocolate sauce and ice cream, the temperature differential between the brownie and ice cream was substantially increased when the properties of that layer were properly selected as shown in FIG. 4.

The shield or control layer(s) can be defined as an edible layer that affects the microwave irradiation of another edible product or component in the food product, i.e., it is capable of being used for control or it is selected or intended for the purpose of control or is suitable for control. It is to be understood that all components and the packaging have an effect on the system to some degree and that each component can be adjusted toward an overall product performance optimum. The use of the layer as a shield can provide shielding control of the time/temperature relationship and final temperature of one or more of the components of the system.

With the use of the interference analysis techniques and product manipulation, effective heating of the brownie and almost complete elimination of detrimental heating of the ice cream were achieved. It was found that this intermediate layer, if it had a high water content, was very low in transmissivity (high in the sum of absorbance and reflectance) of the incident power thereby acting as an effective edible shield when positioned between the food product to be shielded and the microwave environment. It was also a surprise that the control layer could also enhance heating of the brownie thereby reducing the time of exposure to radiation for a given brownie size.

In order to test the theory of operability of the interference effect, certain experiments were conducted. Some of the results are illustrated in FIG. 2. A brownie-sauce-ice cream system was used and opposite ends of the spectrum of reflectance and heat transfer were also tested using a brownie-metal foil or silicone foam-ice cream system. Line A in FIG. 2 shows heating results when an aluminum foil layer was positioned between the brownie and ice cream. This foil, for practical purposes, is a perfect reflector (no transmission or absorption) and a perfect conductor of heat. Another experiment utilized an insulating layer, which for practical purposes is a perfect transmitter of microwave energy and a perfect thermal insulator. The particular layer was a silicone foam. Line E in FIG. 2 shows heating results for this foam layer.

Figure 9B:
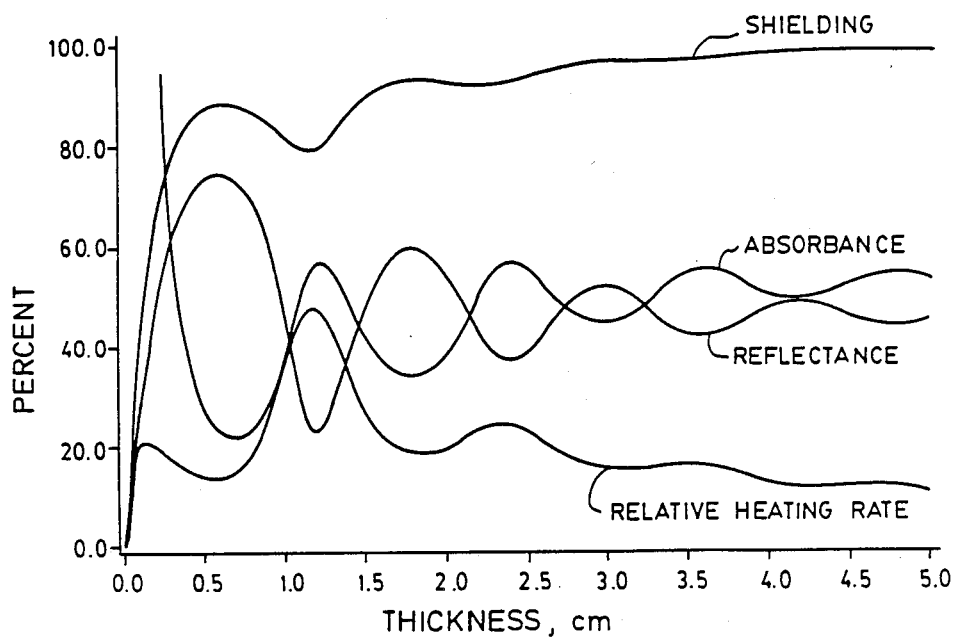
FIGS. 9D, E, F, and G are graphs showing functional relationships between four variables; reflected power, absorbed power, shielded power, and relative heating rate. When these figures are viewed in combination with FIG. 9B they show the effect of changing E' or E'' while holding the other constant.

The theory of operation of the interference effect is further illustrated in FIGS. 9A, B, and C which show curves for reflectance, absorbance, shielding, and related properties of the intermediate layer as a function of layer thickness. The curves are based on calculations applicable to a dielectric slab in free space but illustrate the nature of interference based effects. FIG. 9A is specific to the control sauce type intermediate layer described above and having the following properties $E' = 13$ and $E'' = 3.5$ which has a free water content of 24%. FIGS. 9B and 9C utilize different $E'$ and $E''$ values for comparison and would represent layers with increased water contents. The locations and intensities of the maxima and minima on these types of curves are dependent on the dielectric properties of the layer material.

The disposition of microwave energy or power in the product in FIG. 1 can be approximately defined by the theoretical interference relationships in FIGS. 9A, B, and C. For example, the amount of power or radiation that is delivered to the brownie is largely dependent on the amount of power reflected by the intermediate layer. However, the amount of power that is delivered to the ice cream is largely dependent on both the amount of power reflected by and absorbed in the intermediate layer. Thus, by addition of the amount of power reflected by and absorbed in the intermediate layer, it is possible to determine the amount of power that has been shielded by the intermediate layer as shown in FIGS. 9A, B, and C. The relative heating rate of the intermediate layer which was calculated from the absorbance and thermal load of the layer is also displayed in FIGS. 9A, B, and C. It is apparent that the effectiveness of the layer as a shield can remain high through a wide range of thicknesses, but its absorbing and reflecting properties and subsequently its ability to heat can vary significantly with a change in thickness. In general, an increase or decrease in absorbance or reflectance results in a decrease or increase, respectively, in the other. The relationships described in FIGS. 9A, B, and C show that food materials can act the same as other shielding boundaries and differently because it can also absorb, thereby allowing the achievement of temperature differentials and differential heating as desired in the product in FIG. 1 or the achievement of other beneficial dispositions of microwave power within a food product in an effective and controlled manner.

Figure 8:
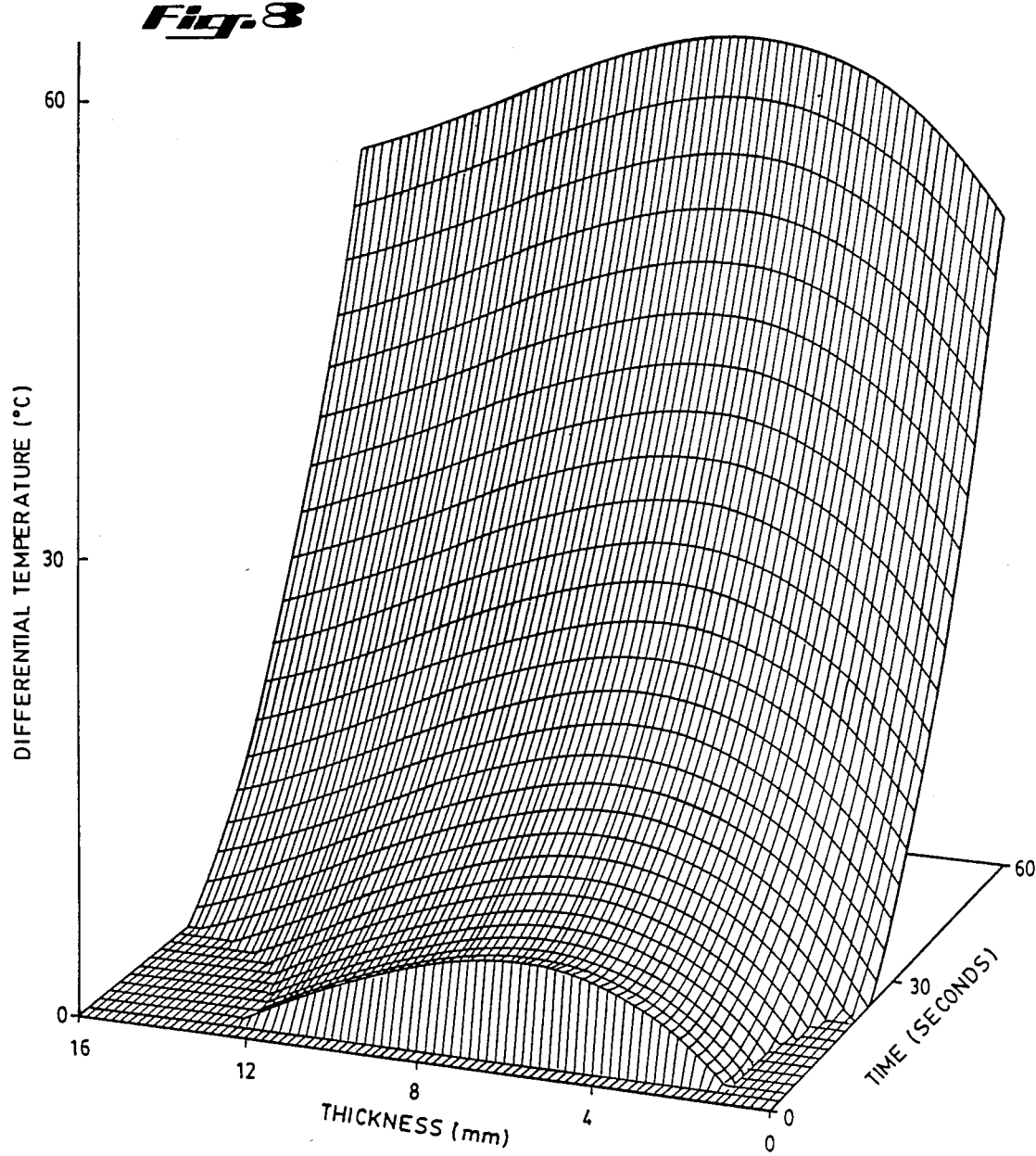
FIG. 8 is a three-dimensional representation of a mathematical model showing a functional relationship between temperature differential, microwave heating time, and chocolate sauce thickness using a sauce with 24% moisture in a multi-component food system as shown in FIG. 1A.

Another test of the theory of operability of the interference effect invention involved the measurement of the temperature differential between the brownie and the ice cream as a function of intermediate layer thickness. To understand the results one should review FIG. 9A, a theoretical series of curves based on a layer having $E' = 13$ and $E'' = 3.5$. This figure indicates that the percent of power reflected by the intermediate layer should rise from zero to a maxima and then fall to a minima between layer thicknesses of 0 cm and about 1.6 cm. The power reflected by the intermediate layer helps heat the brownie in FIG. 1A and also helps shield the ice cream, thereby, exerting a major effect on the temperature differential between the two components. FIG. 7 illustrates the results of experimentation varying intermediate layer thickness of the brownie-sauce-ice cream system between 0 cm and 1.6 cm. On the three dimensional graphical representation, FIG. 8, temperature differential is plotted as a function of both layer thickness (mm) and microwave preparation time (T, seconds). It is observed that the curve of this surface in space shows a strong relationship to the shape of the reflectance curve of FIG. 9A. Thus, the theory and the practical application of that theory are in good agreement.

Figure 11:
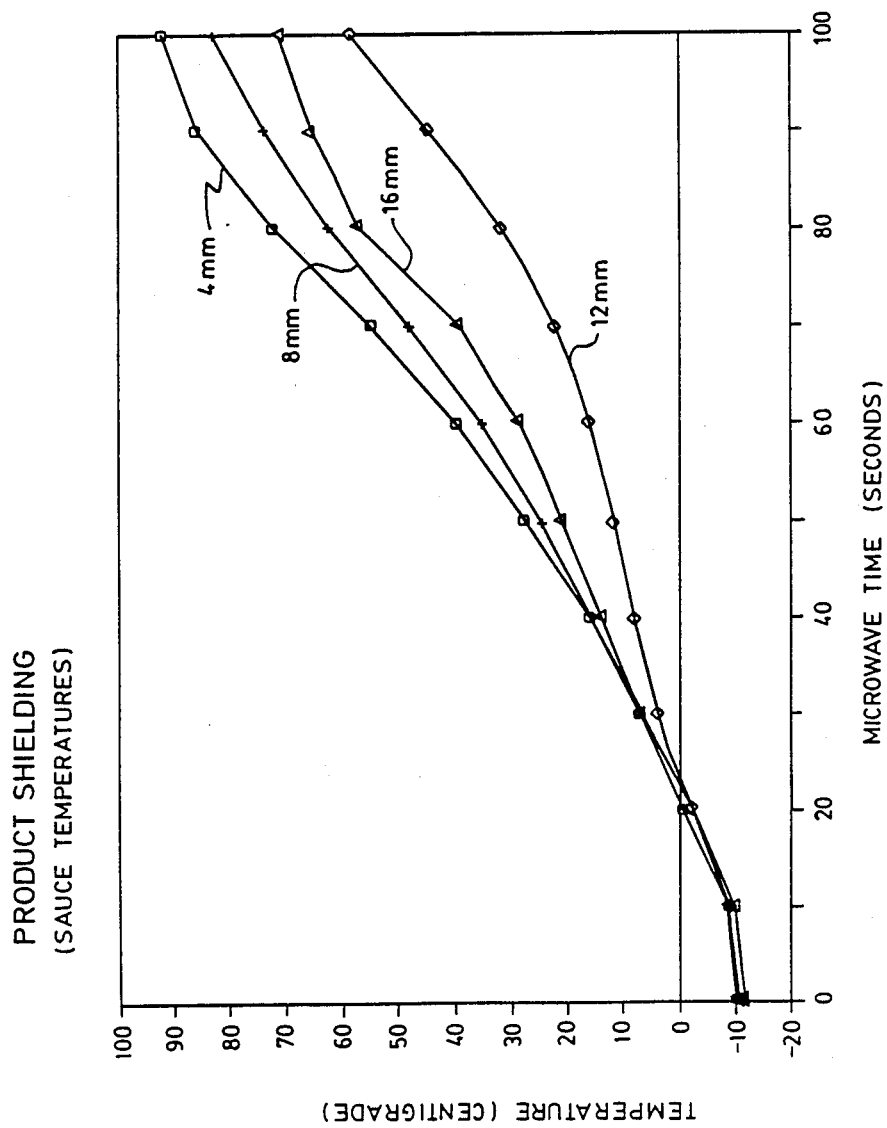
FIG. 11 is a graph showing the functional relationship between chocolate sauce temperatures and microwave heating time for four different sauce thicknesses.

Another test of the theory of operability of the interference effect involved the measurement of intermediate layer temperatures as a function of intermediate layer thickness. As illustrated in FIG. 9A, the relative heating rate of the intermediate layer is highest at very low thicknesses, falls to a minimum and then rises to a maximum at about 1.6 cm. FIG. 11 illustrates the results of experimentation measuring the sauce temperatures of the brownie-sauce-ice cream system at sauce thicknesses between 0.4 and 1.6 cm. As can be seen from this data the heating rate is highest at 0.4 cm (temperature in still lower sauce thicknesses cannot be accurately measured with a luxtron model 750 fluoroptic thermometric system), slightly lower at 0.8 cm, lowest at 1.2 cm and then higher again at 1.6 cm. A mathematical model of sauce temperature as functions of sauce thickness and microwave preparation time was prepared using this data. The three dimensional representation of this model is illustrated in FIG. 12. It is observed that the curve of this surface in space shows a strong relationship to the relative heating rate curve of FIG. 9A. Thus, again, the theory and the practical application of that theory are in good agreement.

Interference analysis shows that by properly selecting, either by calculation or empirically, the thermal loads of the two main components of the system in combination with proper microwave characteristics of the shield layer effective differential heating can be achieved in a three or more component system. Further, work has also indicated that in a two component system, one component with properly selected properties can also be effectively used to shield the other component to achieve differential heating. For example, this might take the form of cheese sauce and broccoli wherein the broccoli can be on top of the cheese sauce. The cheese sauce can be heated and also act as a shield to prevent the broccoli from objectionable heating or overcooking. The time necessary to heat such systems also needs to be controlled in relation to the physical characteristics of the food system components.

By selecting the relative thermal loads of the components in the multi-component system, the dielectric properties (e.g., $E'$ and $E''$) and geometries of the components of the system, it is possible to reliably control the absorbance, reflectance, transmission, and shielding ability of them and subsequently reliably control the disposition of microwave power in a multi-component food system. Geometry has an effect on the system. For example, the physical dimensions of, the shape of and the relative positions of the components play a part. These can be selected empirically or through experimentation or as hereinafter described. It is preferred that the shield layer be generally the same shape as the surface it is in contact with, i.e., it coincides with the shape of the edible components adjacent thereto.

The series of curves illustrated in FIGS. 9A, B, and C indicate the dependency of the absorbance, reflectance, shielding ability (absorbance plus reflectance), and layer heating rate on the dielectric constant ($E'$) and dielectric loss factor ($E''$) with varying layer thicknesses. FIG. 9A represents the relationships for the chocolate sauce described above as calculated from a mathematical model of that chocolate sauce layer (24% free water) suspended in space. This sauce is believed to have values of 13.0 and 3.5 for $E'$ and $E''$, respectively. As the values of $E'$ and $E''$ increase in FIGS. 9A, B, and C, the intensities (amplitudes) of all the peaks on similar plots increase while the wavelength of the generally sinusoidal curves decreases. This is illustrated in FIG. 9B which is projected for an intermediate layer with the following dielectric properties of $E'=26.0$ and $E''=7.0$. Further increases in these values to $E'=39.0$ and $E''=10.5$ yield the relationships illustrated in FIG. 9C with even higher intensities and lower wavelengths. Consequently, by controlling the thickness and dielectric properties of the intermediate layer it is possible to control the reflectance, absorbance, shielding ability, and heating rate of that layer and vary reflectance and absorbance several times over a wide range of thicknesses above a minimum thickness. This permits the design of numerous products having acceptable performance at different thicknesses. It is also possible to use the above described relationships to design even single component food products to heat in accordance with the same criteria set forth for the multi-component systems.

FIGS. 9A, B, and C are families of curves showing the functional relationship between percent of reflected power, absorbed power, shielded power, and relative heating rate as functions of the shielding layer thickness. This was based on calculations using $E'$ values of 13, 26 and 39 and $E''$ values of 3.5, 7.0 and 10.5, respectively. As $E'$ and $E''$ change, the characteristics of the shielding or control effect of the intermediate layer also change, i.e., as $E'$ and $E''$ increase in value the amplitude of the variables increase and the wavelengths decrease. Higher $E'$ and $E''$ values are for higher free water level sauces.

In addition to controlling the functionality of the active or shield (intermediate) layer one should also consider the properties of the materials (layers) and adjacent the active layer. For example, the shielding ability of the intermediate layer can be varied as described above to optimize the shielding effect but the microwave and thermal loads of the component being shielded should also be considered. If the sauce in the example discussed remains constant and is shielding about 80% of the incident microwave power as is suggested in FIG. 9A, the remaining 20% transmitted through the layer will have a greater effect on raising the temperature of a small amount of ice cream than it will on a large amount just due to the thermal load of the ice cream. This is illustrated in FIG. 13 which shows the effect of the amount of ice cream being shielded with a constant intermediate layer. It can be observed that the small amount of shielded ice cream heats up more rapidly than higher amounts of shielded ice cream.

Therefore in the use of interference analysis, one should first consider the relationships identified in FIGS. 9A, B, and C to optimize the desired property (i.e., reflectance, absorbance, heating rate, and/or shielding ability) of the active (intermediate) layer. One should then consider the effects of all the components in the system active layer and the conductive sidewall.

As seen in FIGS. 9A, B, and C, by changing the dielectric properties of the shielding layer, which can be easily done by changing the free water content, the functionality of the shield can be easily adjusted.

Figure 14:
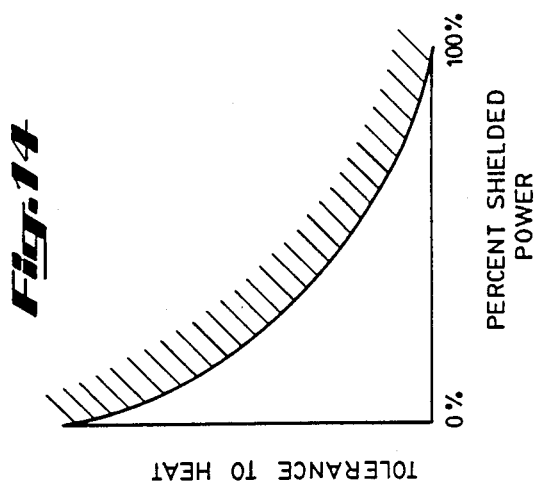
FIG. 14 is an illustration generally showing a possible functional relationship between tolerance to heat of the shielded component and the amount of microwave energy transmitted through the shielding component(s) which is useful to directionally design multi-component food systems.

As seen in FIG. 14, if the shielded product is less tolerant to heat take-up or temperature increase, e.g., small thermal load or degraded by a small increase in temperature or heat uptake, then more shielding is required. Conversely, if the product is more tolerant to heat uptake or temperature increase, then less shielding is required. The tolerance to heat of the shielded product is dependent upon its dielectric properties, its thermal mass and also its sensory attributes. The amount of shielding can be varied as discussed above by varying the makeup of the shielding layer and also by using in combination therewith metal shielding or other shields. As seen from the discussion herein, the smaller the food item that is to be shielded, generally the more incident radiation which needs to be shielded from the product particularly when it is not very tolerant to heat uptake as for example ice cream.

It is believed important to have the boundary between the shielding layer and the other layers be distinct in order to provide good reflection and hence low transmission because of an impedance mismatch between the layers, i.e., a sharp change in impedance between the layers. From reviewing the graphs of FIGS. 9A, B, and C, it is seen, particularly for products with high E′ and E″ values, that the slope of the shield curve is initially very steep as it relates to a change in layer thickness. Thus, desirably, the layer thickness is chosen at about or beyond the peak of the initial incline so that minor variations in thickness do not adversely affect the amount of transmitted microwave energy particularly for systems intolerant to heat uptake. This peak or change in slope of the shield value curve can be approximated by the first point of inflection of the first derivative of the shielded power curve. For example, in FIG. 9A, the first point of inflection occurs near 80%. Also, the required thickness of this layer can be changed by varying the dielectric properties of the layer and achieve the same shield value. Thus, one can see that a multi-component layered food system can be easily manufactured where a shielding layer can effectively shield a shielded product to control the disposition of microwave energy within the multi-component food system.

As described above the shield layer is used to control the amount of energy transmitted to the shielded component. Preferably the shielding layer has thickness such that the shield value (absorbance plus reflectance) just prior to exposure to microwave radiation for consumption is at least about 70%, preferably at least about 80%, and most preferably at least about 90% of the first point of inflection of the shielding power versus thickness curve. These values are determinable by calculation using the following equation to produce a shielding value curve as hereinafter described in reference to determining absorbance and reflectance values. Based on theory and assuming a layer in free space, absorbance, transmission and reflectance can be calculated by:

$$A = 1 - |t|^2 - |r|^2 = 1 - \left| \frac{4(n-jk)e^{\frac{-2\pi j(n-jk)d}{\lambda_o}}}{(n-jk+1)^2 \left| 1 + \left| \frac{1-(n-jk)}{1+(n-jk)} \right| \left| \frac{(n-jk)-1}{1+(n-jk)} \right| \left| e^{\frac{-4\pi j(n-jk)d}{\lambda_o}} \right| \right|} \right|^2 -$$

$$\left| \frac{\frac{1-(n-jk)}{1+(n-jk)} + \frac{(n-jk)-1}{1+(n-jk)} \left| e^{\frac{-4\pi j(n-jk)d}{\lambda_o}} \right|}{1 + \left| \frac{1-(n-jk)}{1+(n-jk)} \right| \left| \frac{(n-jk)-1}{1+(n-jk)} \right| \left| e^{\frac{-4\pi j(n-jk)d}{\lambda_o}} \right|} \right|^2$$

Where:
$A$ = Fraction of absorbed power
$d$ = Thickness
$e$ = Base of natural log $j = \sqrt{-1}$ $k$ = Extinction coefficient
$n$ = Refractive index
$r$ = Reflected electric field intensity
$t$ = Transmitted electric field intensity
$\lambda_o$ = Wavelength = 12.24 cm @ 2450 megahertz $n - jk = \sqrt{E' - jE''}$ The terms absorbance, reflectance and transmission as used herein are defined as follows: absorbance (A) is that part of the incident power that is absorbed, and converted to heat, reflectance $|r|^2$ is that part of the incident power that is reflected and transmission $|t|^2$ is that part of the power transmitted through the product or layer.

This equation is graphically illustrated in FIGS. 9A, B, and C. The formula is based on the product being a layer in free space at 2450 megahertz and can probably be improved for accuracy to include multiple layers in free space. Transmission and reflectance can also be measured by a Genesys Machine (manufactured by Gerling Laboratories).

Further, preferably the shielding layer has a substantial amount of water. Also, preferably, this water should be free water and unfrozen at the storage temperature or temperature of the product just prior to heating in the microwave oven. Preferably, the free water content be in the range of between about 20% and about 95%, preferably in the range of between about 24% and about 90%, and most preferably in the range of between about 27% and about 85% by weight of shielding layer just prior to exposure to radiation. This free water level can be measured by the procedure set forth in AOAC (methods of analysis) 14th edition, 1984 section 31.118 using an air oven and exposing the sample of 70° C. for 16 hours under a pressure of less than 50 mm HG. Preferably, the shielding component should have less than about 50% ice, preferably less than about 30% ice, and most preferably less than about 10% ice by weight of said component as measured just prior to exposure to radiation. Ice content can be measured by differential scanning calorimetry. The amount of free water and ice can be easily adjusted by controlling the additives to this layer, as described above, which can function as freezing point depressants as well as viscosifiers if desired.

If the water in the shielding layer is ice, its ability to shield is substantially reduced, but could be utilized in systems requiring little shielding.

Also, it is to be understood that the shielding layer as described above can be in multiple layers and can also be nonhomogeneous for example it could contain particulate material. With the described values for the layer applying to the composite layers as well. An example of this would be a sundae with both a chocolate sauce and a caramel sauce positioned adjacent to one another and forming a shield around, for example, ice cream.

The shielding or control layer has thickness and dielectric properties such that of the incident microwave power impinging from the oven side on the exposed, direct or indirect, major surface thereof about 20% to about 90%, preferably about 25% to about 80% and more preferably about 30% to about 80% of the incident power is reflected and about 10% to about 65%, preferably about 15% to about 65% and more preferably about 20% to about 65% of the incident power is absorbed and preferably the sum of reflected and absorbed power for shielding or control exceeds about 60% more preferably about 70% and most preferably about 80%. These values for absorbance and reflectance and also for transmission and shielding (as well as the first point of inflection as disclosed above) as disclosed in the specification and as used in the claims (except as noted below for a composite layer) are determined for a single layer by calculation from the above equation $A = 1 - |t|^2 - |r|^2$. $E'$ and $E''$ can be calculated from impedance values measured with a network analyzer, such as a Hewlett Packard network analyzer. By using the $E'$ and $E''$ values in the equation, absorbance, reflectance, transmission and shielding can be calculated. $E'$ and $E''$ and hence the absorbance, reflectance, transmission and shielding values are for the product at a temperature the same as that at which the product would be just prior to exposure to microwave radiation for consumption. For a multiple layer "layer", absorbance, reflectance, transmission and shielding can be measured or determined for the composite using a coaxial wave guide at the subject temperature as just described. The shielding value is the numerical sum of reflectance and absorbance values or 1.0 minus transmission.

It can be seen from FIGS. 9A, B, and C that a thickness in excess of a minimum in practicality will only slightly change the amount of the shielding ability or value of the shielding layer. However, it can be seen from the curves denoted reflectance and absorbance that a further increase in the thickness can change the relative amounts of absorbance and reflectance allowing fine tuning of the time/temperature relationship for heating during exposure to microwave radiation. This allows for the design of food products to achieve adequate shielding while being able to adjust the temperature of the shielding layer and outer layer(s) without significantly or substantially changing the shielding ability of the shield layer.

The above values are based on a microwave frequency of 2,450 megahertz. These values will change as the frequency changes. The most utilized frequency for operation of home microwave ovens is 2,450 megahertz and an industrially used microwave frequency is 915 megahertz. Thus, if the frequency changes the mode of control is the same but the values for thickness, dielectric properties, absorbance, transmission and reflectance will change but are accommodable with the theory and equations.

Thus, as can be seen, one can use interference analysis techniques to manufacture food products. By using the following methods this can be accomplished.

If one needs to preselect the dielectric properties or the free water level because of product constraints, then and adjustment in the thickness of the shielding layer above a minimum thickness will vary the heating characteristics or time/temperature relationships as described above. It should be noted, according to theory, that absorbed power initially increases with an increase in thickness but quickly reaches a relatively flat response, i.e., a further increase does not substantially increase or decrease absorbance. Thereafter, further increase can substantially increase or decrease absorbance. Thus, with a given sauce, i.e., dielectric properties or free water level, the thickness can be varied to control the heating characteristics or time/temperature relationship. It would be preferred to preselect a range or ranges of thicknesses such that a change in thickness results in a relatively small increase or decrease or change in absorbance and reflectance values so that the thickness is not critical. If the layer thickness is a constraint, then the dielectric properties or free water level can be adjusted to achieve the same control over the heating characteristics of the shielding sauce layer. Another aspect of utilizing the interference effect is that the dielectric properties or free water level can be determined to be within predetermined ranges and then the thickness can be varied to achieve the proper heating characteristics or time/temperature relationships during heating. Even more significantly, in making a three-layer product, for example, the brownie, sauce, and ice cream product, by changing the reflectance of the shield, thereby oppositely changing the absorbance of the shielding layer, the heating characteristics or time/temperature relationship of the brownie can be changed. The reflectance value of the shield can be increased or decreased thereby allowing fine tuning of the heating of the brownie by providing it more or less energy. Thus, it can be seen that interference effect provides means for controlling the heating characteristics of one component foods as well the different components of a multi-component food system in an easy manner.

The heating characteristics or time/temperature relationship of the brownie or exposed component can be varied by varying its thickness and/or dielectric properties or free water level. Also, the heating characteristics or time/temperature relationship of the directly exposed component can be varied by varying the thickness and/or dielectric properties or free water level of another layer in the container, i.e., by varying its absorbance and reflectance as described above. Thus, the final brownie temperature can be controlled or adjusted by the control or adjustment of another layer's thickness and/or dielectric properties or free water level characteristics. For example, the brownie can remain relatively cool during heating while the sauce layer can be made to heat to a relatively higher temperature by having high absorbance and low reflectance. The brownie can be heated to a relatively higher temperature and the control layer to a relatively lower temperature by its having high absorbance and low reflectivity.

An evaluation of FIGS. 9B, D, E, F, and G shows the effect of changing $E'$ and/or $E''$. A decrease in $E'$ dampens the effect of thickness on reflectance, absorbance and shielding if $E''$ remains generally constant. An increase in $E''$ also dampens the effect of thickness on reflectance, absorbance and shielding if $E'$ remains generally constant. If particular, the thickness at which successive maxima or minima occur for reflectance and absorbance are increased or decreased by decreasing or increasing, respectively, $E'$. $E'$ and $E''$ can be adjusted to achieve a desired value for at least one of absorbance and reflectance at a selected thickness so that the food product will heat within a predetermined time/temperature relationship range when exposed to microwave radiation. Conversely, the $E'$ and/or $E''$ value can be selected and the thickness adjusted to achieve the same performance characteristics. The value of $E'$ and/or $E''$ is preferably adequate to provide an acceptable tolerance for the range of or variation in product thickness. Thus, the critical nature of thickness can be changed, e.g., reduced, making the manufacture and heating of foods less critical. Another method to control the shape of the reflectance and absorbance curves is to change the value of n and K, respectively the real and imaginary parts of the square root of the complex dielectric permittivity. As n increases the thicknesses at which successive maxima and minima occur in the absorbance and reflectance curves decrease. As K increases the intensity difference between successive maxima and minima in the absorbance and reflectance curves decreases. The converse of the above manipulations results in opposite changes.

$E'$ and $E''$ can be changed by changing the free water level and/or by changing the concentration of and the solutes in the food or edible product or the other components therein. Typically a change in $E'$ or $E''$ will result in a change in the other but it is possible to effect a much larger change in one than the other.

What is meant by direct exposure to microwave radiation is that on first impingement of the radiation, the radiation has not passed through another food product whereas indirect exposure means the radiation has just passed through another food. Passage through or reflection from packaging or oven components does not mean the food is not directly exposed.

In summary, one can preselect a thickness of the control layer and vary the dielectric properties or free water level to achieve the appropriate heating characteristics or time/temperature relationship of the shielded product. Also, one can preselect the dielectric properties or free water level and vary the thickness of the control layer to achieve the desired heating characteristics or time/temperature relationship of the shielded product. Still further, one can have in the product a given control layer thickness and have dielectric properties or free water level selected to achieve desired heating characteristics or time/temperature relationship of the nonshielded or exposed layer or conversely, the control layer can have given dielectric properties or a given free water level and have thickness selected to achieve the desired heating characteristics or time/temperature relationship of the nonshielded or exposed layer. Still further, in the process of making the product one can select a thickness for the control layer and vary the dielectric properties or free water level to provide the desired heating characteristics or its time/temperature relationship of the control layer or conversely, one can have selected dielectric properties or free water level and vary the thickness to provide the desired heating characteristics or time/temperature relationship of the control layer. Likewise, one can in the process of making the product select thickness and dielectric properties or free water level from within predetermined ranges of values and select values from within the range to provide the desired heating characteristics and/or time/temperature relationship in the same manners just described. Also, in the product one can have a given value of thickness or dielectric properties and free water level from within a predetermined range and have a value for the other selected from within a predetermined range.

A shielding layer should be immiscible with the other layer(s) in contact therewith. Immiscible means that the two layers remain substantially separate or distinct having a substantially distinct interface between the two layers. Immiscibility can be achieved by the control of the properties of each of the layers or can also be provided by a barrier film between the two layers which is also preferably edible. What is believed to be important is not a complete separation of the layers over time, but the provision of a sharp change or break in impedance or dielectric properties ($E'$ and/or $E''$) at the interface between the two layers. Preferably the layers remain immiscible, at least initially during exposure to microwave radiation. Also, a shielding layer should be high in water because (1) water is inexpensive, and (2) water is a very effective and edible shield and has easily variable dielectric properties by the addition of viscosifiers and other soluble materials. The water should preferably be nonfrozen, i.e., in this case not in the ice or crystalline form even when it is at a temperature below 0° C. Ice content can be easily affected by the addition of freezing point depressants such as sugars, salt, etc. Also, by adding sufficient viscosifiers such as starch, gums or sugars or others, it could easily be made immiscible with a host of other food product layers and by binding the water effectively with the additives there will be little moisture migration during storage and can be stored over a wide range of temperatures without losing its immiscibility. An edible barrier can also be interposed between two layers to provide immiscibility if less viscous or higher water layers are desired.

The above describes an inference analysis method of designing food products and the use of edible products as shields. The following is another method of designing foods products in a container having at least one conductive member.

It was noted during further experimentation that not only did product changes affect product performance but that container changes also affected performance. This led to the herein described invention.

The below described transmission line analysis techniques take into account both the food products and the effect of the conductive member, e.g., sidewall. It is to be understood that these transmission line analysis techniques can also be used to analyze food product performance characteristics when no waveguide or conductive member is used. This can be done by having the free space impedance values and the propagation constants of the edible components rather than those when a waveguide is used.

Product manipulation and container configuration permits the design and use of new types of microwave products because edible instead of nonedible control layers, as in U.S. Pat. No. 4,233,325, can be used. The edible products in combination with the side and top metal shields, as seen in FIG. 1A, prevented detrimental heating of the ice cream within the time period required to heat the brownie, thereby improving the performance of the multi-component food system. Thus, this combination of edible product and conductive member fulfills a long felt need in microwave food heating.

In the design of products by the interference effect or transmission line analysis a determination which needs to be made is the desired product end temperature or heating differential. Another determination which needs to be made is how the product will be distributed. Will it be distributed frozen, refrigerated or shelf stable, i.e., the starting temperature of the product needs to be known. More importantly, the properties of the product just prior to exposure to microwave radiation should be known to properly design the product. Generally a product will be microwaved directly from storage and the storage conditions will be the starting condition of the product. However, a product may be stored at −10° C. but heated after a thaw or preheating period. The microwave properties could be substantially different at these different temperatures. Thus, the properties of the product as hereinafter described are those just prior to the product being exposed to microwave radiation for consumption. This would be after preheating, thawing, etc. either in the microwave, after holding at an elevated temperature or the like. Usually it is the final and major exposure to microwave radiation that prepares the product for consumption that is the condition for which the product is designed. By selecting the relative thermal loads, adjusting the dielectric properties of the components of the food system, the reflectance, absorbance and transmission of the components and the time necessary to heat the components which should be hotter or require more heat input can be reliably achieved.

The present invention utilizes the effect of conductive members adjacent edible components to control the disposition of microwave power therein and thereby control heating.

In order to understand the present invention, a discussion of each of the important variables is provided below.

As used herein, edible component or edible product means a food product or edible substance with or without nutritional value so long as the edible component can be consumed by humans. With regard to the edible component, several variables or properties are important. Those are:

(1) Thickness of the edible component;
(2) The cross sectional shape and dimensions of the edible component;
(3) The number of edible components;
(4) The dielectric properties;
(5) Interference and cutoff phenomena;
(6) Frequency of the microwave energy;
(7) Position of each product in the container (or waveguide); and
(8) The temperature dependence of the dielectric properties.

Geometry of an edible component includes (1), (2) and (7) above.

With respect to the container, the important variables are:

(1) The cross-sectional shape and dimension(s) of the container, or its conductive member, taken in a plane generally normal to the longitudinal axis from one of the open (microwave transmissive) ends to the other end of the container;
(2) The height of the container or the conductive portion of the sidewall thereof (The term sidewall means one or more walls that extend away from the microwave transmissive portion of the container and would typically extend upwardly from the oven floor); and
(3) The electrical conductivity of the sidewall.
(4) The number of containers (waveguides) containing food products for simultaneous heating.

Geometry of a container or conductive member includes (1) and (2) of the immediately preceding description of the container.

When microwave energy or radiation passes thru any medium, energy is dissipated exponentially as expressed by $e^{-2\alpha l}$ where $\alpha$ is the real part of the propagation constant and $l$ is the penetration depth.

It has been shown that the transmission of microwave power across a boundary into or within a waveguide can be prevented if at least one section of the waveguide comprising that boundary is in the "below cutoff" condition. Under this condition, a product in the below cutoff section cannot be heated through the absorption of microwave energy. It has also been shown that the amount of power transmitted across a boundary when not in a cutoff condition will depend on the extent of mismatch of the impedances at the boundaries of the waveguide. The greater the mismatch, the higher the reflectivity to microwave fields, and the less the energy transmitted beyond the boundary.

It is generally known that the dielectric properties of a product depend on the temperature of the product. Water is an example of a material whose dielectric properties decrease with increasing temperature. Ham is an example of a material whose dielectric properties increase with increasing temperature. It has been shown that the cutoff effect and characteristic impedances are dependent on the dielectric properties of the product comprising the waveguide structure. The cutoff effect and characteristic impedances are then temperature dependent, and this characteristic can be utilized to design temperature control into the waveguide heating structure. Methods for executing the temperature control effect are described in several cases below.

As described above certain food components when placed in a system can be used, in effect, to reduce or eliminate the amount of microwave energy passing downstream. An example of such a food product would be water. Certain other food components can be selected to provide a reverse choke effect, i.e., will allow more energy to pass downstream as the temperature of the system or that particular component increases. An example of such a product that would provide such an effect would be ham.

CASE I

If the container (waveguide) geometry and the edible component(s) dielectrics are chosen such that it is always below cutoff, the edible product(s) therein will not heat by absorption of microwave energy. This is illustrated as Curve (a) in FIG. 3.

CASE II

Assume the waveguide structure is filled with a product whose temperature dependence of the dielectric is like that of water. If the geometry of the waveguide structure is chosen such that it is operating initially at a low temperature above cutoff, and the geometry is also chosen such that it is below cutoff at some higher temperature of the product, $T_c$, then the product will absorb microwave energy and heat until it reaches the temperature $T_c$. This temperature limiting effect is illustrated as Curve (b) in FIG. 3.

CASE III

Assume the waveguide structure is filled with the same product as in Case II. If the geometry of the waveguide structure is chosen such that it is always operating above cutoff, it will always absorb microwave energy and heat. Assume for instance that the product is water. Then the water will continue to heat, reaching a maximum temperature at its boiling point, $T_b$. It has been shown that a waveguide has a plurality of wave modes, each with its own cutoff frequency and capable of carrying microwave energy. The geometry of the waveguide structure can be chosen such that only some of these wave modes are above cutoff. In this way the rate at which energy or power is transmitted to the product can be controlled. This is illustrated by Curves (c) and (d) in FIG. 3. In this case, water is the product. Curve (c) would allow only one wave mode to propagate, and Curve (d) would allow many more modes to propagate. This is done by designing the structure to selectively cutoff various wave modes by a difference in container geometry.

CASE IV

The converse of Case II can be achieved using a product whose temperature dependence of the dielectric is like that of ham. The geometry of the waveguide structure would be chosen such that it is operating initially below cutoff, but operating above cutoff at some higher temperature, $T_h$. This product could be heated via heat transfer from a secondary product being heated by the microwave field. The product would then be absorbing microwave energy at some later time, $t_o$. A heating curve such as shown by Curve (e) in FIG. 3 is thus possible.

CASE V

Another effect that can be used to control the temperature history of a product during cooking/heating is the temperature variation of the impedance at an interface between food products due to the temperature dependency of the dielectrics. By controlling impedances with respect to temperature, the amount of microwave energy transmitted across a waveguide boundary can be controlled.

Not only is the cutoff frequency the demarcation between he evanescent and propagating modes in a waveguide, it is also an important parameter in determining the characteristic impedance and propagation constant of the medium. The cutoff frequency, $f_c$, in a waveguide can be determined from the following equation:

$$f_c = \frac{h}{2\pi \sqrt{\mu\epsilon}},$$

where $\epsilon$ is the permittivity, and $\mu$ is the permeability of the medium.

The quantity h depends on the dimensions of the cross sectional area of the waveguide orthogonal to the direction of wave propagation, and on the particular mode of propagation.

For microwave oven applications, any wavemode for a particular geometry waveguide that has its cutoff frequency less than 2.45 GHZ±50 MHZ will be a propagating mode. If the cutoff frequency is greater than or equal to 2.45 GHZ±50 MHZ, only evanescent modes will exist.

Methods for calculating h for a planar, rectangular and circular cross section are given below. The general method for determining h for an arbitrary waveguide cross section is also presented.

I. Planar Cross Section
For both TE & TM modes $$h = \frac{n}{2x},$$
$$n = 1, 2, 3, \ldots$$
$$x = \text{the gap dimension between plates}$$

II. Rectangular Cross Section $$h = \sqrt{\left(\frac{m\pi}{x}\right)^2 + \left(\frac{\pi n}{y}\right)^2}$$

Where $x$ = the width,
$y$ = the height.
For TM modes,
$m = 1, 2, 3, \ldots$
and $n = 1, 2, 3, \ldots$
in any combination.
For TE modes,
$m = 0, 1, 2, 3, \ldots$
and $n = 0, 1, 2, 3, \ldots$
in any combination, and m and n cannot be simultaneously zero.

III. Circular Cross Section
For TE modes:
$$h = \frac{X'}{r},$$
Where r is the radius, and X' is the zero of the derivative of the Bessel function of the first kind in m and n.
Example:
for $TE_{11}$ mode,
X' for $m = n = 1$ is 1.841
for $TE_{23}$,
X' for $m = 2, n = 3$ is 9.969

For TM modes:
$$h = \frac{X}{r},$$
Where X is the zero of the Bessel function of the first kind in m and n.

Example:
for $TM_{11}$ mode,
X for m = n = 1 is 3.832

The following equations can be used to calculate the propagation constant ($\gamma$) and the characteristic impedance (Z) if the operating frequency f is above the cutoff frequency. TE and TM are used to denote transverse electric and transverse magnetic, respectively.

THE GENERAL METHOD FOR DETERMINING H

Given the following Helmholtz equations:

$$H_x^o = -\frac{1}{h^2}\left(\gamma \frac{\partial H_z^o}{\partial x} - jw\epsilon \frac{\partial E_z^o}{\partial y}\right). \quad (a)$$

$$H_y^o = -\frac{1}{h^2}\left(\gamma \frac{\partial H_z^o}{\partial y} + jw\epsilon \frac{\partial E_z^o}{\partial x}\right). \quad (b)$$

$$E_x^o = -\frac{1}{h^2}\left(\gamma \frac{\partial E_z^o}{\partial x} + jw\mu \frac{\partial H_z^o}{\partial y}\right). \quad (c)$$

$$E_y^o = -\frac{1}{h^2}\left(\gamma \frac{\partial E_z^o}{\partial y} - jw\mu \frac{\partial H_z^o}{\partial x}\right). \quad (d)$$

$$h_2 = \gamma^2 + k^2 \quad (f)$$

Refer to FIG. 21B for an illustration of a general waveguide shape.

For TM waves the above five equations and the following equation are used:

$$V_{xy}^2 E^\circ{}_z + h^2 E^\circ{}_z = 0.$$

For TE waves the above five equations and the following equation are used:

$$V_{xy}^2 E^\circ{}_z + h^2 H^\circ{}_z = 0.$$

The value h is then determined by simultaneously solving the above six appropriate partial differential equations for the appropriate boundary conditions of the waveguiding structure.

$$\gamma = \alpha + j\beta; \quad \beta = \frac{2\pi}{\lambda}$$

$$\gamma = 2\pi f \sqrt{\mu_o \epsilon_o} \sqrt{\left(\left(\frac{f_c}{f}\right)^2 - \epsilon'\right) + j\epsilon''}$$

$$Z_{TE} = \sqrt{\frac{\left(\frac{f_c}{f}\right)^2 - 1}{\sqrt{\left(\left(\frac{f_c}{f}\right)^2 - \epsilon'\right) + j\epsilon''}}}$$

$$Z_{TM} = \frac{1}{\epsilon' - j\epsilon''} \sqrt{\frac{\left(\left(\frac{f_c}{f}\right)^2 - \epsilon'\right) + j\epsilon''}{\left(\frac{f_c}{f}\right)^2 - 1}}$$

NOTE:
$f > f_c$ always

If the operating frequency is in the cutoff condition the propagation constant is zero, and the following equations give the characteristic impedance.

$$Z_{TE} = j \frac{2\pi f \mu}{h \sqrt{1 - \left(\frac{f}{f_c}\right)^2}}$$

$$Z_{TM} = -j \frac{h}{2\pi f \epsilon} \sqrt{1 - \left(\frac{f}{f_c}\right)^2}$$

Refer to "*Microwave Devices and Circuits*" by Samuel Y. Liao and published 1985 by Prentice-Hall, Inc., and "*Field and Wave Electromagnetics*" by David K. Cheng and published 1983 by Addison-Wesley the disclosures of which are incorporated herein by reference.

A method for calculating the power or energy distributions or disposition between the different product layers and within each layer is by transmission line analysis. The power and energy distributions in the system are dependent on the impedance at each layer interface, the characteristic impedance of the layers, and the propagation constant of each layer.

FIG. 5A illustrates a single section of Transmission Line that is equivalent to a single layer of product in a waveguide structure, a power source or generator composed of a voltage source ($V_{gen}$) plus impedance ($Z_{gen}$) that is equivalent to the source of microwave power in the oven, and a load impedance ($Z_L$). An example of a load impedance is the foil lid on the product of FIG. 1A. In this case, this is technically referred to as a short circuit termination and has an impedance value of zero. The transmission line is characterized by three properties:
1. the characteristic impedance, $Z_o$,
2. the propagation constant, $\gamma$, and
3. the length, l.

The method for calculating the values of these characteristic properties for a given waveguide section with product load has been described previously. Since relative power or energy distributions are the primary concern, the absolute power of the generator is not necessary and $V_{gen}$ can be arbitrarily selected, say as 100 volts. $Z_{gen}$ can be approximated as the free space value, 377 ohms.

Power values can be calculated from four values shown in FIG. 5A, $V_i$ (input voltage), $I_i$ (input current), $V_L$ (load voltage) and $I_L$ (load current). In general, these are complex numbers as are $V_{gen}$, $Z_{gen}$, $Z_L$, $Z_O$ and $\gamma$. The power input ($P_i$) to the section of line, i.e., the product load in the waveguide and its end load, is given by the following formula:

$$P_i = \tfrac{1}{2} Re(V_i I_i^*),$$

where Re means 'the real part of', and $I_i^*$ means the complex conjugate of $I_i$.

Similarly, the power into the end load ($P_L$) is given by:

$$P_L = \tfrac{1}{2} Re(V_L I_L^*).$$

The power absorbed by the food product ($P_{abs}$) is then:

$$P_{abs} = P_i - P_L,$$

and the percent power absorbed is:

$$\frac{P_{abs}}{P_i} \times 100.$$

$V_i$, $I_i$, $V_L$ and $I_L$ are calculated from the following four equations:

1. $$V_i = \frac{V_{gen} Z_o}{Z_{gen} + Z_o} \left( \frac{1 + \Gamma e^{-2\gamma l}}{1 - \Gamma_g \Gamma e^{-2\gamma l}} \right)$$

2. $$I_i = \frac{V_{gen}}{Z_{gen} + Z_o} \left( \frac{1 - \Gamma e^{-2\gamma l}}{1 - \Gamma_g \Gamma e^{-2\gamma l}} \right)$$

3. $$V_L = \frac{V_{gen} Z_o}{Z_{gen} + Z_o} (e^{-\gamma l}) \left( \frac{1 + \Gamma}{1 - \Gamma_g \Gamma e^{-2\gamma l}} \right)$$

4. $$I_L = \frac{V_{gen}}{Z_{gen} + Z_o} (e^{-\gamma l}) \left( \frac{1 - \Gamma}{1 - \Gamma_g \Gamma e^{-2\gamma l}} \right)$$

$$\Gamma = \frac{Z_L - Z_o}{Z_L + Z_o} \text{ and } \Gamma_g = \frac{Z_{gen} - Z_o}{Z_{gen} + Z_o}$$

$\Gamma$ = the reflection coefficient between the end load and line section.

$\Gamma_g$ = the reflection coefficient between the generator and line section.

For determining the power delivered to multiple line sections the following technique is used. An example of multiple line sections is two layers of product in a waveguide structure. Another example of multiple line sections is a single layer of product in a waveguide structure whose geometry varies along the length of the waveguide, a tapered waveguide, for example.

FIG. 5B illustrates the technique. To begin, there is a transmission line with three sections and a load impedance, $Z_L$. By using the following formula this three section line plus load impedance $Z_L$ can be transformed into a two section line plus a new load impedance, $Z_L'$.

$$Z_L' = Z_{01} \frac{Z_L \cosh(\gamma_1 l_1) + Z_{01} \sinh(\gamma_1 l_1)}{Z_{01} \cosh(\gamma_1 l_1) + Z_L \sinh(\gamma_1 l_1)}.$$

Where $Z_{01}$ = the characteristic impedance of section 1.

Similarly, the two section line plus load impedance $Z_L'$ can be converted into a single section line plus load impedance $Z_L''$. The formula is repeated for clarity.

$$Z_L'' = Z_{02} \frac{Z_L' \cosh(\gamma_2 l_2) + Z_{02} \sinh(\gamma_2 l_2)}{Z_{02} \cosh(\gamma_2 l_2) + Z_L' \sinh(\gamma_2 l_2)}.$$

Where $Z_{02}$ = the characteristic impedance of section 2.

At this point the input powers can be calculated as previously described.

The absorbed powers for the remaining sections are calculated as follows.

The single section line is expanded back to the two section line plus Load $Z_L'$.

$$V_i' = V_L$$

$$I_i' = I_L$$

The power input to Section 2 is $P_L$ from the single section calculation, $$P_{i2} = P_L.$$

The power input to $Z_L'$ is given by the following formula, $$P_L' = \tfrac{1}{2} Re(V_L' I_L'^*).$$

The power absorbed by Section 2 is:

$$P_{abs2} = P_{i2} - P_L'$$

and the percent power absorbed is:

$$\frac{P_{abs2}}{P_i} \times 100$$

$V_L'$ and $I_L'$ can be calculated from the following formulas.

1. $$V_L' = \tfrac{1}{2} V_i' \left[ \left( 1 + \frac{Z_{02}}{Z_L'} \right) e^{-\gamma_2 l_2} + \left( 1 - \frac{Z_{02}}{Z_L'} \right) e^{\gamma_2 l_2} \right]$$

2. $$I_L' = \frac{V_L'}{Z_L'}$$

Similarly, the two section line is converted to the three section line plus load impedance $Z_L$, and the process repeated. The formulas are repeated for clarity.

$$P_{i3} = P_L'$$
$$P_L'' = \tfrac{1}{2} Re(V_L'' I_L''^*)$$
$$V_i'' = V_L'$$
$$I_i'' = I_L'$$
$$P_{abs3} = P_{i3} - P_L''$$

$$\text{percent power absorbed} = \frac{P_{abs3}}{P_i} \times 100$$

$$V_L'' = \tfrac{1}{2} V_i'' \left[ \left( 1 + \frac{Z_{01}}{Z_L} \right) e^{-\gamma_1 l_1} + \left( 1 - \frac{Z_{01}}{Z_L} \right) e^{\gamma_2 l_2} \right]$$

$$I_L'' = \frac{V_L''}{Z_L'}$$

This entire process can easily be expanded for any number of line sections.

By combining the above equations into a computer program which is attached as Appendix A, the design of food systems and the waveguide container therefore can be easily accomplished using transmission line analysis techniques.

To understand the invention a discussion of the bases for the program is provided. It is based on transmission line analysis. A dissertation of transmission line analysis is found in *Microwave Transmission Design Data*, by Theodore Moreno published 1948 by Dover Publications which disclosure is incorporated herein by reference.

A simplistic view of the food product and its container is that in the microwave oven the food product and the container have a composite impedance which will determine the amount of power or energy available to the food product. The composite impedance will probably change as the temperature of the food product changes. Each component of the food product or other substance, e.g., air in the container, will have its own impedance in the container and this/these will determine the power or energy distribution inside the container.

The heating of any food system or product, including microwave heating, is dynamic and temperature varies with time and location in the product. This is particularly true with microwave heating because of the changing dielectric properties of the product as its temperature changes. Heating results in temperature gradients within each of the components and from component to component in a system. Further, because of the nonuniformity of microwave heating of a food product it can have hot and cold spots within the product. Therefore, it is difficult to define a microwave heated product by its temperature because of the variability of the temperature within such a nonuniformly heated product. Temperature can be measured at various locations within a product to determine an appropriate time/temperature relationship and would normally be done on an empircal basis after determining the proper location and number of the temperature probes. This type of data can be correlated to consumer testing of the product. However, the desired end result of heating is the perception by the consumer of the product temperature or temperature differential and/or the degree of cooking, e.g., overcooked or undercooked.

The time/temperature relationship of the product during heating determines both the final temperature and the degree of cooking, i.e., the total heat or energy uptake. Consumer perception of temperature and degree of cooking can be tested organoleptically by a sensory panel, for example, too hot, too cold, overcooked or undercooked. In fact, actual temperature is not necessarily the relevant criteria, but the perception of temperature, for example, two ice creams which are at the same temperature can be consumed, but the sensation of temperature to a consumer is different. This can be caused, e.g., by the differing ice contents of the products, i.e., a high ice content product can be perceived as very cold when in fact it has the same temperature as a lower ice product.

A time/temperature relationship can be measured by temperature probes at given locations which can give a representative but incomplete indication of the dynamics of the system at predetermined locations. Such testing can indicate proper or improper heating. However, the final temperature of the product is better measured organoleptically. Thus, within the desired or predetermined or selected time range of heating, the product should not be overcooked or undercooked and should not become overly hot or stay too cold from an organoleptic standpoint or one product should not heat faster than another product, whereby, the consumer perceives the resulting product as not being properly heated. Preparation instructions can be devised by both organoleptic testing and temperature measurement systems for different wattage ovens to determine the appropriate time range and time/temperature relationship range generally required to achieve an acceptable end product, i.e., within a temperature range for consumption.

Heating of a product is done within a desired or predetermined or selected time/temperature relationship range and the final product temperature should be within a desired or predetermined or selected temperature range suitable. The final temperature can be that desired for consumption or the product can cool from the final temperature or equilibrate before consumption. The ranges can be predetermined or selected by evaluating the heated or cooked product(s) for ensuring adequate heating to provide an acceptably cooked and/or appropriate temperature for consumption.

In order to design food products using the above, the following are examples of how certain aspects of the system can be changed and the effect on the system. For example, as $E'$ increases, the wavelength in that product decreases and conversely, as $E'$ decreases, the wavelength increases. As the frequency of the microwave radiation increases, the wavelength in a product decreases and conversely, as the frequency decreases, the wavelength increases. Also, the wavelength of microwave radiation within a medium is a function of $E'$ and $E''$, the geometry of the food product and container.

It can also be seen from the discussion herein and through the use of the computer program that there are several ways to design a product to achieve similar desired end results for a given product.

In summary, to achieve the appropriate heating characteristics or time/temperature relationship of a given product or products, several parameters should be considered. These parameters are:

(1) The dielectric properties (or free water level) of the products in the waveguide;
(2) The way that the dielectric properties of the products in the waveguide vary with temperature;
(3) The geometry of the products in the waveguide;
(4) The number of the products in the waveguide and their quantity;
(5) The conductive sidewall (waveguide) geometry; and
(6) The conductive sidewall (waveguide) materials (or electrical conductivity).
(7) The number of containers (waveguides) containing food products for simultaneous heating.

If one or more of these parameters is a constraint and therefore cannot be varied, then one or more of the non-constrained parameters can be varied to achieve the appropriate heating characteristics or time/temperature relationship range of a given product (or given products) within the waveguide.

Another aspect of utilizing the invention is that any one or more of these parameters can be preselected to be within predetermined ranges. Then one or more of the other parameters can be varied to achieve the proper heating characteristics or time/temperature relationships during heating.

Thus it can be seen that the invention herein provides means for controlling the heating characteristics of one of the component foods in a waveguide as well as the different components of a multi-component food system in a waveguide in a systematic and controlled manner.

A common problem when heating foods with microwave power is uneven power or energy disposition within the product which often leads to localized overheating of the food while adjacent areas of the product are still cool. This can result in reduced product quality (e.g., by dehydration, toughening, or charring of the food product). By use of the present invention, microwave heating can be moderated or modulated as it relates to time, i.e., the rate of microwave heating can be substantially reduced (by selecting conditions of product composition, geometry, and waveguide geometry) so that the rate of heat input is more closely matched to heat dissipation by conventional methods of heat transfer, e.g., thermal conduction, thus reducing or eliminating problems with overheating. This has additional importance because, as described above, the ability of certain food products to heat increases with increasing temperature and if there is localized heating thermal runaway can occur in selected areas of the product resulting in degradation of that area while other protions remain relatively cool.

In the design of or method of manufacturing food products for use in microwave ovens the various portions of the food system including the edible component(s) and the container are selected or intended to achieve a desired temperature heating profile (time-/temperature relationship range) for the purpose of heating control. The various parameters which are believed to affect this control are described above.

Another aspect of the present invention is the ability to utilize the invention to provide consistent performance results from product to product. Once a product has been designed and found workable, it is important to ensure that each subsequent similar product or a substantial number of those products, i.e., more than 50% and preferably more than 80% of the products, are similar or substantially identical in performance capability. This is accomplished by control of the impedance of each layer and/or the impedance of the system. As noted above, each component of a system has an effect on the other components of the system. The quantity, geometry and dielectric properties of each layer or component and the geometry of the conductive member and/or the container and the conductivity of the conductive member, the number of components, impedance of each component and its temperature dependence, the thickness of each component, its dielectric properties, the position of the edible component in the waveguide, the cross-sectional dimension(s) of the container, the height of the container and the electrical conductivity of the sidewall should be consistently controlled to provide consistent performance. Also, the thickness of a food product should be controlled as a functional relationship of the dielectric properties. As the dielectric properties of a layer decrease, for example, going from a high water content layer to a low water content layer, the critical nature of thickness will change. This can be graphically seen in FIGS. 9A–F wherein a decrease in dielectric properties smoothes out the undulating nature of the absorbance and reflectance curves.

The sensitivity of the particular food system to heat or a particular component in that food system to heat will determine the level of criticality of the control of the parameters that affect the performance of the system. Those parameters are disclosed above. When making successive similar products, for example, an ice cream and brownie sundae as described above, a substantial portion of the manufactured items that are similar should have similar performance characteristics and should be tolerant. Thus, the particular structure of the food system should not vary sufficiently to provide a significant number of poor performing items. Consistent performance is achieved by consistently controlling properties of the system as described below. However, it is to be noted that a change in excess of the amount described below can be accommodated if there is a compensating change in one or more of the other components in that system.

As discussed herein the present invention is used to achieve controlled heating of single- and multi-layered or component systems.

In the manufacture or production of a plurality of similar products it is important to control certain properties as hereinafter discussed in order to achieve consistent heating results. The required consistency is determined by product tolerance.

When one makes or produces the products, a value for the property is established or selected and a permissable variation from that value is also established or selected. In evaluating products this same tolerance range would be that based on measuring the value in a number of products and having the established tolerance range around an average of those measured values. Each of the below listed paramaters and their tolerance ranges are specified relative to an established or selected value or an average value plus or minus the stated tolerance range.

Adequate heating rate control can be achieved if the impedance of the overall system (including waveguide and edible components) is maintained within about ±20% of the average or established value and if the impedance of each component in the system does not vary by more than about ±20% from its average or established value. A better degree of heating rate control can be achieved if the impedance of the overall system is maintained within about ±10% of its average or established value and if the impedance of each component in the system does not vary by more than about ±10% from its average or established value at the desired quality. A still better degree of heating rate control can be achieved if the impedance of the overall system is maintained within about ±5% of its average or established value and if the impedance of each component in the system does not vary by more than about ±5% from its average or established value. Impedance can be measured with a network analyzer for example the Hewlett Packard model 8753A.

If the waveguide geometry and dimensions are fixed and the dielectric properties of the food component(s) are fixed, the heating rates of the food component(s) can be controlled by manipulating one or more of the thicknesses of the food components and air gaps (if any) one of which might be headspace. As the thickness of each layer is adjusted in turn control of the heating process can be attained if the thickness of each layer is maintained within a range. If one has fixed waveguide geometry and dimensions and the dielectric properties of the food component(s), then the range of food component thicknesses which control product performance is related to the wavelength of the dominant mode in that layer. (The wavelength can be determined from the computer program in Appendix A and the dominant mode is the mode with the lowest cutoff frequency.)

Adequate heating rate control can be attained when the thickness variation from the average or established value of each layer in the system (including air gaps if present) is within about ±20% of the wavelength of the dominant mode in that layer or less. Better heating rate control can be attained when the thickness variation from the average or established value of each layer in the system is about ±10% of the wavelength of the dominant mode in that layer or less. Still better heating rate control can be attained when the thickness variation from the average or established value of each layer in the system is within about ±5% of the wavelength of the dominant mode in that layer or less.

If the waveguide geometry and dimensions are fixed and the dimensions of the food component(s) and air gaps (if present) are fixed, the heating rates of the food component(s) can be controlled by manipulating one or more of the dielectric properties of the various food components. The dielectric properties of the food components (along with food component and waveguide geometries) determine which modes may exist, their wavelengths and propagation constants, and the fraction of incident power absorbed by each component in the system and therefore its heating rate.

An adequate degree of heating rate control can be attained if the real and imaginary parts of the complex dielectric constant of each layer are maintained within about ±45% of the average or established values for that layer. A better degree of heating rate control can be attained if the real and imaginary parts of the complex dielectric constant of each layer are maintained within about ±30% of the average or established values for that layer, and a still better degree of heating rate control can be attained if the real and imaginary parts of the complex dielectric constant of each layer are maintained within about ±20% of the average or established values for that layer.

When one of the system components is below cutoff and when the propagation constants and layer thickness are such that inconsequential amounts of power are transmitted downstream from the cutoff layer, then there is negligible or no system dependence on downstream geometry or composition.

It can be seen from the foregoing discussion that at a given starting condition, i.e., at a temperature just prior to exposure to microwave radiation, that the end result can be more accurately and predictably controlled. The present invention also provides a means for controlling power or energy disposition throughout heating when temperature has an effect on the functioning of the system. Different food products behave differently as the temperature of the food product increases during exposure to microwave radiation. Three occurrences can happen with an increase in temperature. In general, the dielectrics can increase, whereby the wavelength gets shorter. Examples of such foods that do this are chocolate sauces and ham. A second effect is that the dielectric properties can decrease, wherein the wavelength in the product gets longer. Examples of such products are water and beef. The third effect is that the dielectric properties stay relatively constant and the wavelength remains substantially the same. Examples of such products are air, fat and oil.

From the above discussion, it can be seen that these three effects can be utilized to control heating of food products in a microwave oven. For example, when the dielectric properties increase, a product can be designed, that, as the temperature increases, more and more microwave power can pass thru a layer or food product of this type. Say for example, a brownie on top of a chocolate sauce layer if it is desired to keep same relatively cool can be designed such that the chocolate sauce initially prevents microwave power from entering the brownie. Then, as the chocolate sauce becomes hot, microwave power will enter the brownie and cause same to heat. This would be a system, wherein, the chocolate sauce is between the source of microwave radiation and the brownie.

The system that utilizes a decrease in dielectrics with an increase in temperature would, in essence, function as a microwave power or energy choke with an increase in temperature. As the wavelength of the microwave radiation gets longer in the product, eventually a cutoff frequency (and thus cutoff wavelength) can be reached or the amount of power passing thru the layer can be decreased to help control microwave heating of a food product as described above.

A system using a relatively constant dielectric property with an increase in temperature is demonstrated by the use of the air layer on top of the ice cream such that the cutoff frequency remains constant throughout heating of a food product providing reliable control of the elimination of heating of ice cream in the above described brownie/sauce/ice cream system.

Likewise, as the temperature of a layer or system increases, the reflectance of the system or layer may also increase. In such a case, the system can be designed such that reflectance will prevent or substantially prevent passage of microwave thru one or more layers or portions or the system to help control heating of downstream food products just as the increase in dielectric properties with temperature also helps control downstream disposition of microwave power. What is meant by substantially prevents is that about 80% of the power originally impinging on the system or layer at a temperature just prior to microwave heating is prevented from passing thru the system, edible component or layer at an elevated temperature.

With the change in impedance of the system or component or layer, the time to finish heating of the product or layers can be modulated such that the heating time can be increased allowing heat transfer to play a role in the overall heating aspects of the system through the increase in heating time if so desired.

The use of localized changes in waveguide (container) geometry can be used to produce beneficial effects because these localized geometry changes will cause localized impedance changes. Consequently, the microwave power distribution within the materials in the waveguide, and subsequently the heating rates of those materials, will also be affected. One example of this would be a localized reduction in the internal dimensions of a rectangular waveguide as shown in FIG. 21A. This localized impedance change could be used to produce the microwave choking effect and/or any of the other effects described herein.

It is possible to design a layer of an edible dielectric material to be so thick as to absorb substantially all of the microwave energy or power that entered the layer. The power at any depth from the initial impinged layer boundary decays as a function of the distance from that boundary in an exponential manner. This relationship is described by a parameter commonly known as the power penetration depth which is defined as the reciprocal of two times the real part of the propagation constant described herein. About 37% of the original power remains after one power penetration depth, about 14% of the original power remains after two power penetration depths, and about 5% of the original power remains after three power penetration depths. Therefore, thickness can be adjusted according to this relationship to regulate the amount of power available to downstream materials.

From the above, it can be seen that the present invention can be utilized in several ways to control the disposition of microwave energy in the different components of the multi-component system. This can be accomplished by varying one or more properties over a wide range providing flexibility in product concepts.

The present invention can be utilized in several manners to control the disposition or distribution of microwave power or energy within a system comprising at least one edible component and a container having at least one conductive member.

As described above, transmission line analysis techniques can be used to determine a power or energy disposition or distribution or distribution within each of the edible components within the system as well as within each edible component of the system. This analysis can be done on an existing system or on a proposed system to assist in the design thereof. This then provides one with the ability to predict energy uptake and temperature rise as well as other performance characteristics of the system as for example, cutoff frequencies and the other criteria as discussed above.

The properties of the edible components and conductive member as described herein and the heating characteristics, e.g., time/temperature relationship and temperatures and time of exposure to microwave radiation as described herein are important variables. In the manufacture of food product systems any one or combination of these properties can be adjusted or changed to provide a properly heated product. Any property and/or heating characteristic can be preselected, selected, predetermined, and/or at a desired value as desired depending on the desired method of manufacture or adjustment.

A surprising result is that the dimensions of the edible component(s) at which interference-based and cutoff effects occur is on a size scale typical of foods and food products (on the order of 0.1 cm. to 10 cm.). Therefore the amount of power absorbed by, transmitted through, or reflected from a particular layer can be significantly changed by varying edible component layer thicknesses by a few millimeters or centimeters. Similarly, adjustment or waveguide dimensions by a few millimeters or centimeters can significantly alter the heating rate of the edible component(s).

The container has a portion, thereof, sufficiently transmissive or transparent to microwave energy to permit microwave radiation to enter the container.

In one aspect of this invention, the edible product has an impedance proximate the conductive member or sidewall (waveguide) of the container sufficient to provide a below cutoff frequency at a predetermined location in the container. This can be at a product temperature just prior to microwave radiation or at some elevated temperature during heating. Also, one of the edible components can be selected such that it will initially have an impedance that would be below the cutoff frequency, but through heating, e.g., heat conduction from one of the other layers, can be above the cutoff frequency and thereby permit the passage of microwave energy thereinto or therethrough.

In another aspect of this invention, the container can also have a second portion, thereof, generally transparent to or transmissive of microwave radiation. Positioned in this container there can be a substance adjacent to the second portion which will provide a below cutoff frequency section immediately adjacent to second portion thereby substantially or totally preventing microwave radiation from entering the container thru the second portion while microwave radiation will enter the first transparent portion of the container.

Another aspect of this invention is that by selection of a plurality of edible components each having a respective desired or preselected impedance in the container whereby the disposition of microwave power within the container is such that each component will heat within a respective predetermined or desired time/temperature relationship range and after a predetermined or desired time period will reach a respective predetermined or desired temperature within a respective predetermined or desired temperature range.

Further, at least one of the edible components will have a first impedance that will allow microwave energy to enter and at an elevated temperature will have a second impedance that will be sufficient to provide a below cutoff frequency whereby microwave radiation will be substantially or totally prevented from passing into or thru said at least one edible component. Likewise, and edible component can have a first reflectance value at a first temperature just prior to exposure to microwave radiation to allow heating thereof but at a second predetermined or desired temperature the product will have a second reflectance value sufficient to substantially prevent microwave radiation from passing thru this edible component.

As described above, transmission line analysis techniques can be utilized to manufacture food products. In this regard, several methods of manufacturing can be utilized.

Once a waveguide geometry is selected, for example by transmission line analysis, then, since normal manufacturing dimensional tolerances are a very small fraction of the dominant mode wavelengths, variation among manufactured waveguides (containers) will not contribute significantly to variation in the heating rate(s) of the edible component(s). Therefore, once a waveguide dimension is selected, the primary variables when designing a food product system are edible component geometry and dielectric properties.

In one aspect, a food product or edible component is first selected and is for positioning in a container having at least one conductive sidewall or member and will be located proximate to that conductive member. A time/temperature relationship range is determined for the heating profile of the edible product and also a final temperature range for the product after exposure to microwave heating. Transmission line analysis, as described above, can be used to analyze the performance characteristics and/or power or energy distributions within said food system such that the food product will generally heat within the desired time/temperature relationship range and reach a desired temperature within the desired temperature range. Further, an approximate container geometry or configuration can be selected and the transmission line analysis techniques can be used to determine an acceptable container geometry and sidewall conductivity therefor so that the food product will heat as described above. Also, these techniques can be used for a plurality of food products in such a system and the food products can be positioned in layers.

More particularly, in the manufacture of food product, one can select at least one edible component having properties including geometry, microwave properties and quantity preferably selected from within a quantity range. The edible component is to be placed proximate the conductive member which also has properties including gemoetry and electrical conductivity. In this proximate position, the edible component would be exposed to microwave radiation for heating. One can then adjust at least one of the geometry, microwave properties and quantity of the edible component relative to at least one of the geometry and conductivity of the conductive member for the purpose that the edible component will heat within a preselected or desired time/temperature relationship to a desired temperature within a preselected or desired temperature range upon exposure to microwave radiation. What is meant by relative adjustment is that one or more of the properties of the edible component or one or more of conductive member properties can be separately adjusted or one or more of the properties of both can be adjusted. Thereafter, transmission line analysis techniques can be used to analyze the power distribution within the system and the heating characteristics of the edible component as well as its geometry microwave properties and/or quantity and the container geometry and/or conductivity of the conductive member and thereafter adjusting or readjusting the food system to change the performance thereof.

Further, the same technique can be used wherein an edible component is selected and has geometry, microwave properties and quantity and will be positioned next to or proximate a conductive member having geometry and electrical conductivity for exposure to microwave radiation for heating. One or more of the geometry, microwave properties and quantity of the edible component and the conductive member geometry and electrical conductivity are analyzed using transmission line analysis techniques. After the analysis, a balancing or adjusting of the properties, i.e., the geometry, microwave properties, quantity and the conductive member geometry and electrical conductivity for the purpose of estimating the power distribution within the food product system. From this, an estimate of a time/temperature relationship range and temperature range for the edible component can be made. The food product system can then be made using the balanced or adjusted properties. After the product is made, it can be tested for performance and thereafter further balancing of the above described properties can be made such that the edible component will heat within a preselected or desired time/temperature relationship range to a desired or preselected temperature within a preselected or desired temperature range when exposed to microwave radiation.

Another aspect of the present invention is a method of making a food product where an edible product is positioned in a container with the container having at least one conductive sidewall or member. The container has a portion sufficiently transparent or transmissive of microwave radiation to permit microwave radiation to enter the container and expose the edible product to microwave radiation. By varying or adjusting the impedance of the edible product one can determine an appropriate impedance such that the edible component will heat within a predetermined or desired time/temperature relationship range and after a predetermined or desired time period of exposure to microwave radiation will reach a preselected or desired temperature within a predetermined or desired temperature range.

As described herein, a change in impedance can be effected in several ways. Through a change in impedance of one or more of the edible components the food system can be manipulated to provide the desired heating characteristics as herein discussed.

The impedance of the edible product can be varied or adjusted by one or more of the following, either individually or in any combination. In general, any change in the system can change its impedance and/or the impedance of each edible component. Also, impedance can be adjusted or varied, at least partially, by one or more of the following methods. The cross sectional area and/or dimensions of the container or the conductive member can be varied or at least a portion of the container or conductive member can have its cross sectional area or dimension varied. The dielectric properties of the edible component can be varied as well as its thickness. The number of layers in the food system can be changed. The conductive member or sidewall can have its height varied as well as its electrical conductivity. If the container has headspace (air gap), the height or thickness of that headspace can also be varied. The position of an edible component relative to the conductive member can also be adjusted.

In the making of a food product system a change in impedance at a temperature just prior to exposure to microwave radiation of the system and/or one or more of the edible components can change the performance characteristics as discussed herein. If a change in the performance of the system or one of the edible components is desired the impedance of the system, at least one of the impedance of at least one edible component, the real and imaginary parts of the complex dielectric constant or the dielectric permittivity, and thickness as a function of the wavelength of the dominant mode should be changed as follows: (1) impedance of the system at least about $\pm 5\%$ preferably at least about $\pm 10\%$ and most preferably at least about $\pm 20\%$; (2) impedance of an edible component at least about $\pm 5\%$ preferably at least about $\pm 10\%$ and most preferably at least about $\pm 20\%$; (3) the real and imaginary parts of the complex dielectric constant at least about $\pm 20\%$ preferably at least about $\pm 30\%$ and most preferably at least about $\pm 45\%$; (4) the dielectric permittivity at least about $\pm 20\%$ preferably at least about $\pm 30\%$ and more preferably at least about $\pm 45\%$; and (5) the thickness of an edible component at least about $\pm 5\%$ preferably at least about $\pm 10\%$ and most preferably at least about $\pm 20\%$ of the wavelength of the dominant mode. After selecting or determining the change to be made at least one food product system which incorporates the change is made and heated.

It is to be understood that a plurality of food product systems can be simultaneously heated. For example a meal system would include a dessert, vegetables with sauce, potatoes with gravy and meat with sauce can each be in their own container (waveguide) for simultaneous heating.

When a plurality of food product systems (container and edible component(s) therein) are to be heated simultaneously a change in the impedance one or ore of the systems can be used to change the heating characteristics of the remainder of the systems.

A particularly preferred embodiment is that shown in FIG. 1A and is described hereinafter. It includes a brownie positioned in the bottom of a shielded cup having a layer of chocolate sauce positioned thereover and in contact therewith and having positioned over the sauce a layer of ice cream in contact with the sauce each contact surface being generally flat. Each layer has a substantially uniform thickness but it is particularly desired for the sauce to have a uniform thickness. The metal shield and the sauce cooperate with one another to substantially completely and preferably completely surround the ice cream to prevent leakage of microwave radiation through gaps between the shielding layer and the metal shield.

When data were taken for comparison of similar or the same products the temperature probes were located in positions that were believed would provide the most valid and/or reliable data even if they were in different locations in the same or different products. The attempt was to locate the probes in constant positions relative to the geometry of the containers.

In some of the following examples using ice cream, brownie and sauces in juxtaposed layers in a plastic cup the following are preferred embodiments for the products and container. The brownie is made from a brownie mix and is baked to about a 14% moisture content. Approximate formula of the brownie mix, by weight of mix, is flour 29.1%, enrichment 0.024%, sugar 51.8%, shortening 7.5%, cocoa 0.37%, cocoa 1.96%, cocoa 2.21% (the three cocoas are different), soda 0.05%, salt 0.76%, vanilla flavor 0.14%, chocolate liquor 6%, and albumin 0.6%. Eggs, oil, and water are added to the mix to form a batter with the approximate formula of the batter, for a dry mix with albumin, mix 71%, Durkex 100 oil 11.6%, and water 17.3%. It is preferred that the vertical edge of brownie when in the cup is spaced from the bottom end of the shield 4 at least 3 mm when localized heating of the brownie has occurred when positioned closer. For the brownie $E'=3.03$ and $E''=0.67$ at 23° C.

A preferred chocolate sauce in this product is Johnston's Red Label sauce which is commercially available. For flowability, the sauce should have good shear thinning properties. The relative dielectric constants ($E'$) and relative dielectric loss factor ($E''$) for this sauce at various temperatures are: $E'=6.89$ and $E''=2.85$ at $-23°$ C.; $E'=11.85$ and $E''=6.96$ at 0° C.; $E'=18.0$ and $E''=9.16$ at 23° C.; and $E'=22.54$ and $E''=10.3$ at 50° C.

A preferred ice cream has an overrun of 70%, a butterfat content of approximately 12%, vanilla flavor and a churned out fat content of approximately 1.25%. The fat globule size preferably is about 3 to about 10 microns as compared to a normal ice cream which has unchurned fat with a fat globule size of about 1 to 2 microns. It was unexpectedly found that ice cream containing a churned out fat content by weight of ice cream of about 1% to about 2% preferably about 1.2% to about 1.8% most preferably about 1.4% to 1.6% by weight of ice cream was more stable during microwave exposure. Churned out fat means that the fat globule sizes are about 3 to about 10 microns in diameter. The reason for improved microwave exposure stability is unclear. Normal ice cream has little or no churned out fat, about 0.3% or less by weight. For this ice cream $E'=5.92$ and $E''=2.51$ at $-23°$ C.

Figure 15:
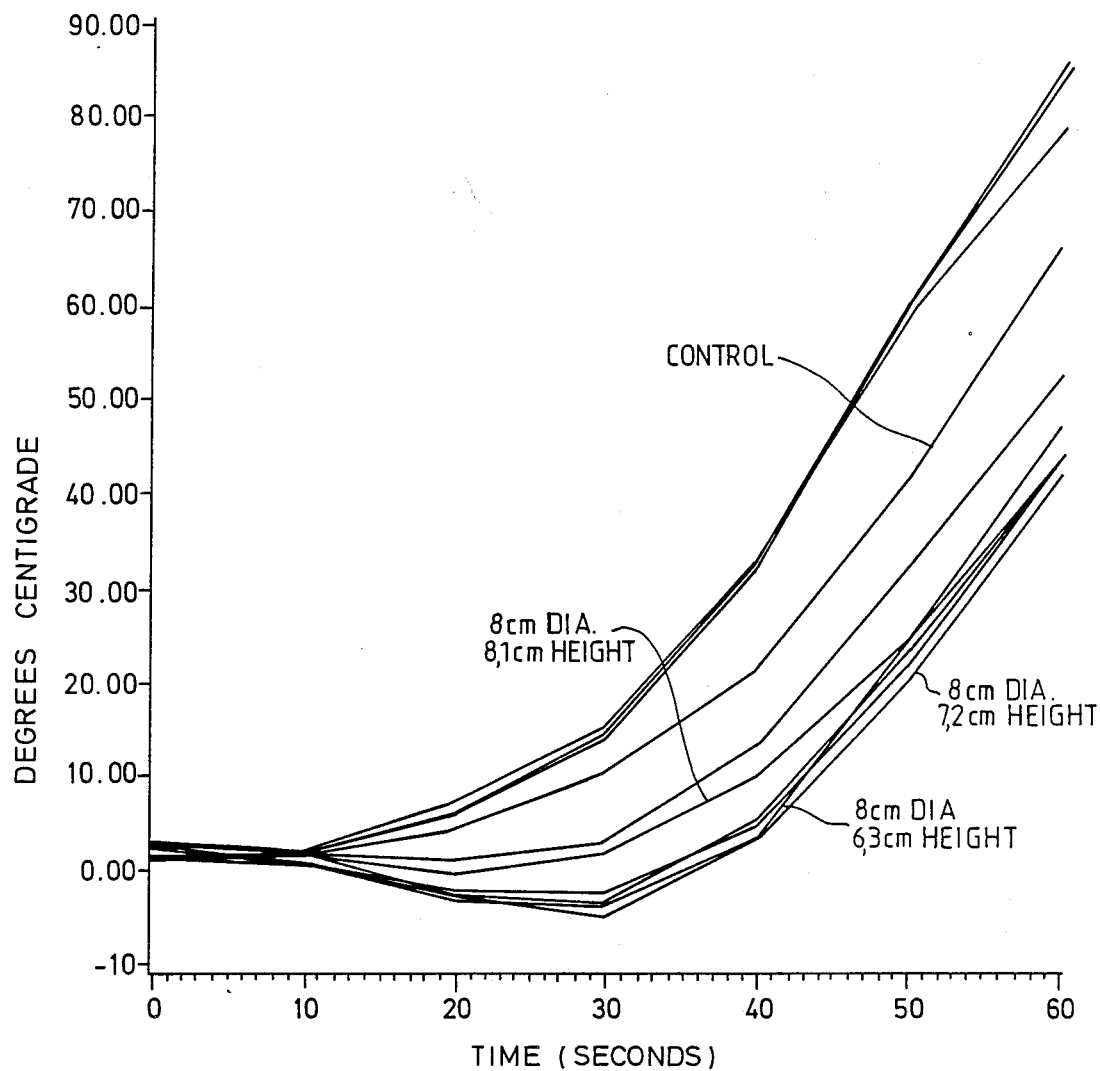
FIG. 15 is a graph showing the functional relationships between differential temperature and microwave heating time for a brownie-chocolate sauce-ice cream multi-component system in various containers: control as shown in FIG. 1A; 6 cm. diameter straight wall containers with 6.3 cm., 7.2 cm. and 8.1 cm. heights; 7 cm. diameter straightwall containers with 6.3 cm., 7.2 cm. and 8.1 cm. heights; and 8 cm. straightwall containers with 6.3 cm., 7.2 cm. and 8.1 cm. heights.
Figure 16:
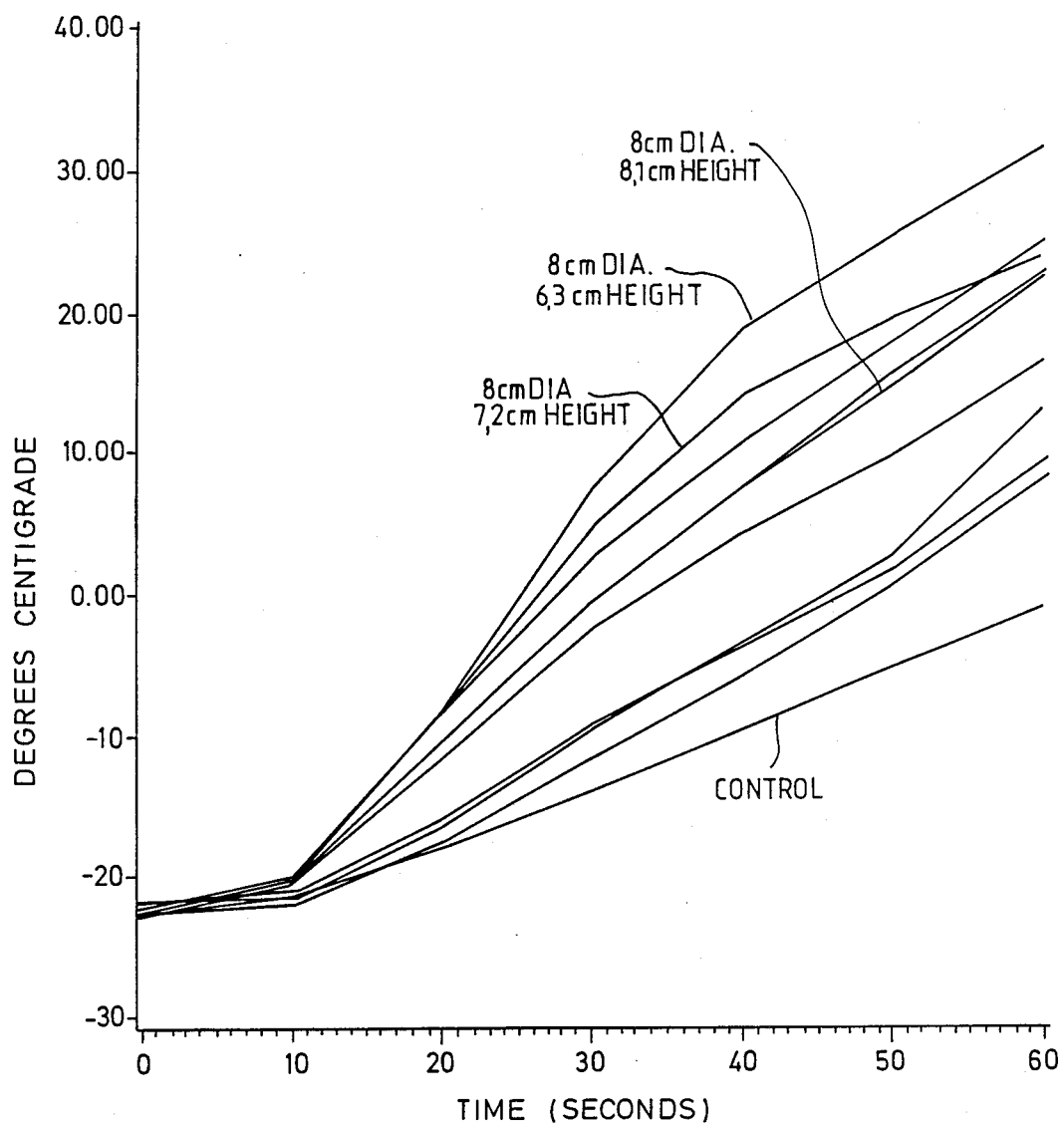
FIG. 16 is a graph showing the functional relationships between ice cream temperatures and microwave heating time for the systems mentioned in the description of FIG. 15.
Figure 17:
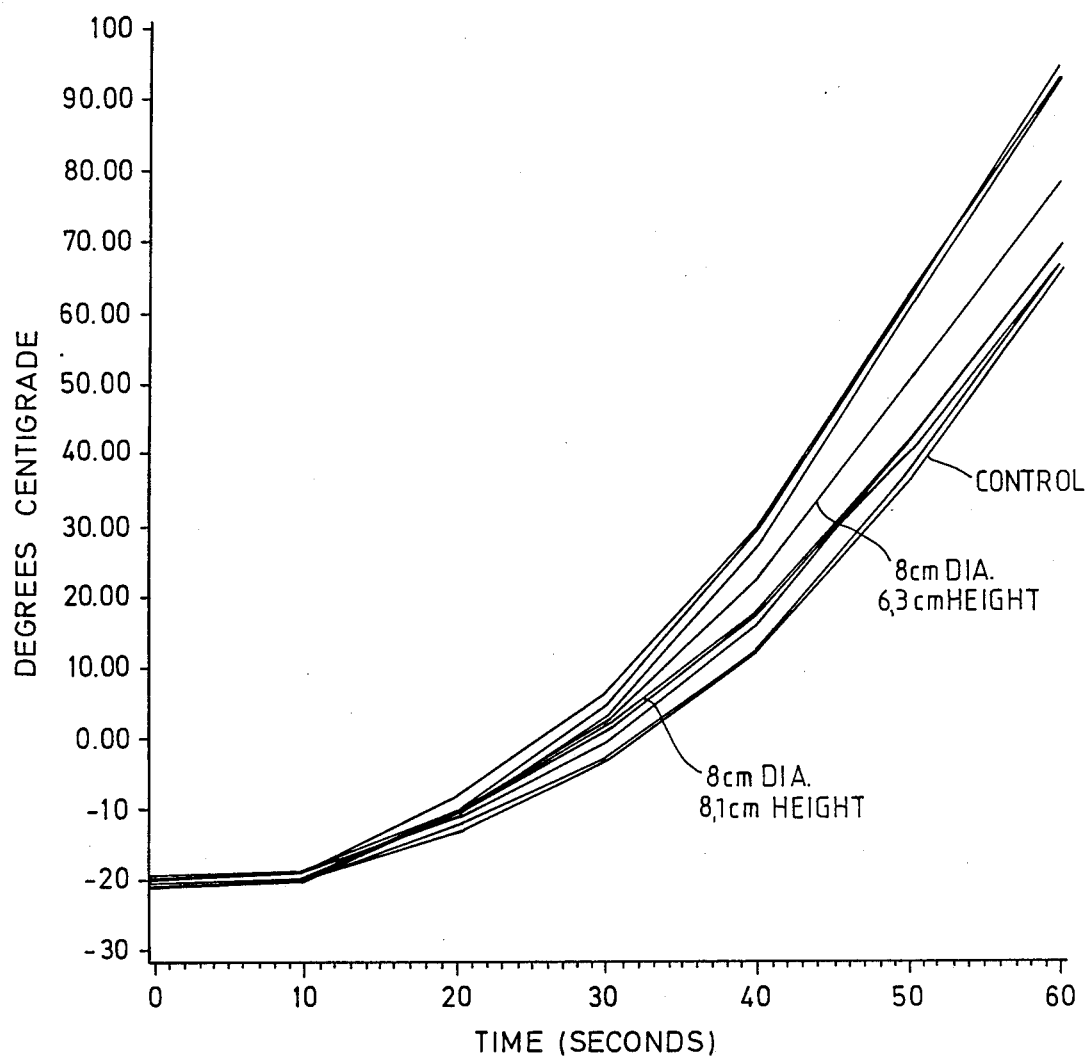
FIG. 17 is a graph showing the functional relationships between brownie temperatures and microwave heating time for the systems mentioned in the description of FIG. 15.

The package for commercial introduction for single serve products is shown in FIG. 1A. It has a container 3 wall thickness of 0.15 cm and is made from high density polyethylene with the dimensions as described above. It is preferred that the top 5 be 48 gauge (0.011 cm) polyethylene of 7 pound low density polyethylene as the outer laminant with a 35 gauge (0.0009 cm) foil laminated thereon with a 1.5 mil (0.0025 cm) extrudable hot melt as the inner laminant with the foil between the inner and outer laminants. A preferred shielding label 4 material is a 48 gauge (0.0011 cm) polyethylene of 7 pound low density polyethylene material as an outer laminant with a 28 gauge (0.0007 cm) aluminum foil layer laminated between the outer laminant and a 2 mil (0.005 cm) Surlyn inner laminant. It has become clear that the three major variables that should be considered to describe the microwave heating performance of FIG. 1A are the dielectric properties of the food components, the thicknesses (geometries) of the food layers, and the geometry of the shielding package. The package presently employed in the development of this product is shown in FIG. 1A. It is a cup which has a 7 degree taper, a bottom diameter of about 7.0 cm, a top diameter of about 8.2 cm, a height of about 6.0 cm, and is shilded on the sides and top with aluminum foil. A preferred cup 3 diameter is 8.1 cm in diameter when the cup is cylindrical, but if frusto conical it is preferred that the minimum diameter be in the range of 7.0 cm to 8.5 cm inches while the height of the aluminum portion of the label is preferred to be 6.1 cm in height with the two ends electrically connected or spaced apart about 0.32 cm. A preferred container is now believed to be straight walled having a diameter of 6 cm. and a height of about 7 cm. This is illustrated in FIGS. 15-17 as providing higher temperature differentials.

The FIG. 1A product consists of a brownie (about 1.7 cm thick), a chocolate sauce (about 0.6 cm thick), and ice cream (about 2.3 cm thick).

The above described shielded cup is particularly good for the prevention of arcing in single size serving containers.

The above identified figures which are based on the three component brownie-sauce-ice cream system or the brownie and ice cream system utilize the above described brownie, sauce and ice cream in a tapered sidewall cup as described. The graphs illustrate the operability of the present invention.

The following examples are provided to illustrate operability of the present invention:

EXAMPLE 1

Aluminun foil lined paper board was fashioned into tubes of 6, 7 and 8 cm. diameters. Each of these tubes were cut to lengths of 6, 7 or 8 cm. Consequently nine different combinations of diameter and length were created. Approximately eight tubes of each diameter/length combination were manufactured. All the tubes were closed on one end with a circular disk of unmetalized paperboard. Above this bottom closure was successively placed a brownie (1.7 cm. thick), chocolate sauce (0.6 cm. thick), ice cream (2.3 cm. thick), a layer of headspace whose thickness depended on the length of the tube, and an aluminum foil closure on the top end of the tube. Two Luxtron temperature probes were placed in geometrically equivalent positions 1 cm. up from the bottom closure and 2 cm. in from the sidewall of the tube in the brownie. Similarly, two Luxtron temperature probes were placed in geometrically equivalent positions 3 cm. up from the bottom closure and 2 cm. in from the sidewall of the tube in the ice cream. Temperatures were recorded for brownie and ice cream at 10 second intervals for all the variables and replicates described above. Values obtained from geometrically equivalent temperature probes and replicates were averaged. FIG. 16 shows these average ice cream temperatures with time, FIG. 17 shows brownie temperatures with time, and FIG. 15 shows temperature differentials with time (brownie temperature minus ice cream temperature). A control product described herein and illustrated by FIG. 1A was also included and appears on all the figures.

According to the transmission line theory described herein the ice cream should receive less power in the 6 cm. diameter containers than in the 7 or 8 cm. diameter containers. The heating curves shown in FIG. 16 illustrates lower heating rates for the 6 cm. diameter container than for the 7 cm. or 8 cm. diameter container. This effect is even more dramatic than illustrated because the thickness of the ice cream layer remained constant throughout the experiment. Therefore the mass of the ice cream decreased, proportionately with the volume of the ice cream, as th diameter decreased. Thus, the power reduction to the ice cream layer, was greater than proportional to the volume or mass decrease to achieve significantly lower ice cream heating rates. This is as predicted by the transmission line theory described herein. Similarly, the brownie heating rate is significantly higher in the 6 cm. diameter container than in the 7 cm. or 8 cm. diameter container as shown in FIG. 17. As predicted this increase in the heating rate is greater than proportional to the mass or volume change in the brownie as predicted. Finally, FIG. 15 shows that the temperature differential (brownie minus ice cream) is very significantly higher in the 6 cm. diameter container than in the 7 cm. or 8 cm. diameter container.

EXAMPLE 2

In the same experiment as described in Example 1 the choke effect of the transmission line theory is shown. To simplify the discussion, data obtained from this experiment and available in FIGS. 15-17 has been replotted in FIGS. 18-20. An average preparation time of 50 seconds has been chosen to illustrate the effect of can length and more specifically headspace on product temperatures.

According to the transmission line theory described herein microwaves are excluded in air in a circular aluminum tube below about 7 cm. diameter. Therefore in the systems described in Example 1 where the diameter of the container is 6 cm. no microwaves will pass through the headspace. Consequently, no reflections off the aluminum foil top closure will occur and no interference patterns that are dependent on the thickness of the headspace layer will occur. In the 6 cm. diameter systems described, can height and more specifically headspace layer thickness is inconsequential. In the 7 cm. and especially in the 8 cm. containers this is not the case. FIGS. 18-20 clearly show that there is no effect of container length on differential, ice cream or brownie temperatures for the 6 cm. diameter products at 50 seconds of microwave heating time. At 7 cm. and 8 cm. however, there is a length dependency. Thus, theory and observation are in good agreement.

The above examples illustrate that the present invention is an effective and tolerant way of achieving temperature differential in multi-component food systems. It shows that a low temperature differential can be achieved as well very high temperature differentials. The invention provides for the manufacture of many food items which heretofore have not been available for microwave heating. If fact, a brownie and ice-cream system could not be differentially heated in any other manner is the two components are packaged together.

APPENDIX A

This is the source code of a chained program consisting of four chain files and one COM file. The source program was compiled to object code using the Turbo Pascal* version 3.0 compiler. The PC/MS-DOS* operating system was used. File names are the same as program names.

Chaining Data

Openmenu.CHN

Code: 0062 par, 1568 bytes.

Data: 0007 par, 112 bytes.

Charvalu.CHN

Code: 01C0 par, 7168 bytes.

Data: 0017 par, 368 bytes.

Guidvalu.CHN

Code: 0748 par, 29824 bytes.

Data: 011F par, 4592 bytes.

Transanl.CHN

Code: 08EB par, 36528 bytes.

Data: 004E par, 1248 bytes.

Worstat.COM

Code: 003A par, 928 bytes.

Data: 0007 par, 112 bytes.

Stack/Heap: 16384 bytes minimum - 655360 bytes maximum

Minimum code segment: 08ED par

Minimum data segment: 0125 par

- The computer used was equipped with the 8087 coprocessor -

* Turbo Pascal and PC/MS-DOS are trademarks.

©1986
The Pillsbury Company
All rights reserved.

```
program workstat(input,output);

var chainfile: file;

procedure lineone;
  begin
    TextColor(red);
    write(char(4));
  end;

procedure linetwo;
  begin
    TextColor(green);
    write(char(254));
  end;

procedure border;
  var i: integer;
  begin
    for i := 0 to 13 do
    begin
      GoToXY(27+i,3);
      lineone;
      GoToXY(53-i,3);
      lineone;
      GoToXY(27+i,13);
```

```
    lineone;
  GoToXY(53-i,13);
  lineone;
  if i < 7 then
  begin
    GoToXY(27,3+i);
    lineone;
    GoToXY(52,3+i);
    lineone;
    GoToXY(27,13-i);
    lineone;
    GoToXY(53,13-i);
    lineone;
  end;
  if i > 0 then
  begin
    GoToXY(27+i,4);
    lineone;
    GoToXY(53-i,4);
    lineone;
    GoToXY(27+i,12);
    lineone;
    GoToXY(53-i,12);
    lineone;
  end;
  if i > 0 then
  begin
      GoToXY(27+i,5);
      linetwo;
      GoToXY(53-i,5);
      linetwo;
      GoToXY(27+i,11);
      linetwo;
      GoToXY(53-i,11);
      linetwo;
    end;
  GoToXY(79,25);
  TextColor(black);
  write('a');
  GoToXY(79,25);
  Delay(50);
  end; {for}
end;

begin
  ClrScr;
  border;
  Delay(750);
  normvideo;
  GoToXY(35,7);
  write('WORKSTATION');
  GoToXY(36,9);
  write('DIELAYERS');
  GoToXY(79,25);
  TextColor(black);
  write('a');
```

```
    GoToXY(79,25);
    Delay(750);
    Lowvideo;
    GoToXY(2,22);
    write('c 1986');
    GoToXY(2,23);
    write('The Pillsbury Co.');
    GoToXY(2,24);
    write('All rights reserved.');
    GoToXY(79,25);
    TextColor(black);
    write('a');
    GoToXY(79,25);
    Delay(20000);
    Normvideo;
    ClrScr;
    Assign(chainfile, 'OPENMENU.CHN' );
    Chain( chainfile );
end.

program openmenu(input,output);

var chainfile: file;
        Ch,workcase: char;

procedure position(k:integer);

begin
    case k of
    0 : begin
        GoToXY(29,9);
        TextColor(red);
        write(char(174),'MC');
        TextColor(yellow);
        GoToXY(5,24);
        workcase := 'A';
        end;
    1 : begin
        GoToXY(34,11);
        TextColor(red);
        write(char(174),'WGC');
        TextColor(yellow);
        GoToXY(5,24);
        workcase := 'B';
        end;
    2 : begin
        GoToXY(34,13);
        TextColor(red);
        write(char(174),'TLA');
        TextColor(yellow);
        GoToXY(5,24);
        workcase := 'C';
        end;
    3 : begin
        GoToXY(24,15);
        TextColor(red);
        write(char(174),'E');
```

```
                TextColor(yellow);
                GoToXY(5,24);
                workcase := 'D';
                end;
            end;
    end;    {position} procedure erasepos(k:integer);

begin
    case k of
    0 : begin
            GoToXY(29,9);
            write('        ');
            end;
    1 : begin
            GoToXY(34,11);
            write('       ');
            end;
    2 : begin
            GoToXY(34,13);
            write('       ');
            end;
    3 : begin
            GoToXY(24,15);
            write('       ');
            end;
    end;
end;    {erasepos} procedure menuselc;

var j: integer;
        Cha: char;

begin
        GoToXY(33,2);
        write(char(4));
        TextColor(red);
        write(' WORKSTATION ');
        TextColor(yellow);
        write(char(4));
        GoToXY(33,3);
        write(char(4));
        TextColor(red);
        write('    MENU     ');
        TextColor(yellow);
        write(char(4));
        for j := 33 to 47 do
        begin
        GoToXY(j,1);
        write(char(4));
        end;
```

```
      for j := 33 to 47 do
      begin
      GoToXY(j,4);
      write(char(4));
      end;
   GoToXY(5,6);
   TextColor(magenta);
   write(char(174),char(175),' ENTER your MENU CHOICE ',char(174),char(175));
   Normvideo;
   GoToXY(5,9);
   write('Media Characteristics::');
   GoToXY(5,11);
   write('Wave Guide Characteristics::');
   GoToXY(5,13);
   write('Transmission Line Analyzer::');
   GoToXY(5,15);
   write('Exit Workstation::');
   GoToXY(5,23);
   TextColor(green);
   write('Use ');
   Lowvideo;
   write(char(24),' ',char(25));
   TextColor(green);
   write(' arrow keys to select from menu:');
   GoToXY(5,24);
   write('Hit "enter" to continue:');
   Normvideo;
   j := 0;
   position(j);
     Repeat
     read(Kbd,Cha);
     case ord(Cha) of 80 : begin
          if j <> 3 then
          begin
          erasepos(j);
          j := j + 1;
          position(j);
          end;
          end;
     72 : begin
          if j <> 0 then
          begin
          erasepos(j);
          j := j - 1;
          position(j);
          end;
          end;
      end;
      until Cha = chr(13);
end;    {menuselc} begin
ClrScr;
```

```
menuselc;
case workcase of
'A' : assign (chainfile, 'CHARVALU.CHN' );
'B' : assign (chainfile, 'GUIDVALU.CHN' );
'C' : assign (chainfile, 'TRANSANL.CHN' );
'D' : begin
      ClrScr;
      Halt;
      end;
end;   {case}
Chain( chainfile);
ClrScr;
end.

program charvalu(input,ouput);

const uo = 12.56637e-7;
         eo = 8.841941e-12;

type index1 = 0..3;
        param = array[index1] of real;
        string1 = string[2];
        string2 = string[9];

var h : integer;
       again,donit: char;
       freq: real;
       e,g,t,bta,alp,n,r,q: param;
       chainfile: file;

procedure InputInt(var inintgr: integer; inX,inY: integer);

var invalu: string1;
       error: integer;

begin
     repeat
     GoToXY(inX,inY);
     BufLen := 9;
     read(invalu);
     ClrEol;
     Val(invalu,inintgr,error);
     if error <> 0 then
     begin
       GoToXY(40,23);
       TextColor(red + blink);
       write('Data entry error -- reenter!');
       Lowvideo;
       end;   {if}
     until error = 0;
     GoToXY(40,23);
     ClrEol;
end;    {InputInt}
```

```
procedure InputRel(var inreal: real; inX,inY: integer);

var invalu: string2;
       error: integer;

begin
     repeat
     GoToXY(inX,inY);
     BufLen := 9;
     read(invalu);
     ClrEol;
     Val(invalu,inreal,error);
     if error <> 0 then begin
       GoToXY(40,23);
       TextColor(red + blink);
       write('Data entry error -- reenter!');
       Lowvideo;
       end;   {if}
     until error = 0;
     GoToXY(40,23);
     ClrEol;
end;     {InputRel} function alpha(x,y,w,uo:real): real;
        {function alpha calculates the real part of the}
        {propogation constant from the same parameters as}
        {function beta.}
   var a:real;
   begin
     w := 2*pi*w;
     a := y/w;
     alpha := w*sqrt(uo)*sqrt(0.5*(sqrt(sqr(x)+sqr(a))-x));
   end; {alpha} function beta(x,y,w,uo:real): real;
        {function beta calculates the imaginary part of the}
        {propagation constant from the permittivity(x), the}
        {conductivity(y), the frequency(w) in hertz, and the}
        {permeability of free space(uo). }
   var a:real;
   begin
     w := 2*pi*w;
     a := y/w;
     beta := w*sqrt(uo)*sqrt(0.5*(x+sqrt(sqr(x)+sqr(a))));
   end; {beta} function realchar(x,y,w,uo:real): real;
        {function realchar calculates the real part of the}
        {characteristic impedance of a material from the same}
        {parameters as function beta.}
   var a,b,ua:real;
```

```
begin
  w := 2*pi*w;
  ua := sqrt(uo);
  y := y/w;
  a := x/(sqr(x)+sqr(y));
  b := y/(sqr(x)+sqr(y));
  realchar := ua*sqrt(0.5*(a+sqrt(sqr(a)+sqr(b))));
end; {realchar} function imagchar(x,y,w,uo:real): real;
      {function imagchar calculates the imaginary part of the}
      {characteristic impedance of a material from the same}
      {parameters as function beta.}
  var a,b,ua:real;
  begin
    w := 2*pi*w;
    ua := sqrt(uo);
    y := y/w;
    a := x/(sqr(x)+sqr(y));
    b := y/(sqr(x)+sqr(y));
    imagchar := ua*sqrt(0.5*(sqrt(sqr(a)+sqr(b))-a));
  end;

function gamareal(w,x,y,z:real): real;
      {function gamareal calculates the real part of the reflection}
      {coefficient from impedance1=w+jx, and impedance2=y+jz.}
  var a,b,c,d:real;
  begin
    a := w-y;
    b := x-z;
    c := w+y;
    d := x+z;
    gamareal := ((a*c)+(b*d))/(sqr(c) + sqr(d));
  end;

function gamaimag(w,x,y,z:real): real;
      {function gamaimag calculates the imaginary part of the reflection}
      {coefficient from the same parameters as in gamareal.}
  var a,b,c,d:real;
  begin
    a := w-y;
    b := x-z;
    c := w+y;
    d := x+z;
    gamaimag := ((b*c)-(a*d))/(sqr(c) + sqr(d));
  end;

procedure initial;

var i,stop1,stop2 : integer;

begin
  for i := 0 to 3 do
```

```
      begin
       e[i] := 0.0;
       g[i] := 0.0;
     bta[i] := 0.0;
     alp[i] := 0.0;
       n[i] := 0.0;
       r[i] := 0.0;
       end;
end;   {initial} procedure intrimp;

var i,j,k,stop : integer;

begin
         stop := 2*h - 1;
         i := 0;
         k := 0;
       while i < stop do
       begin
         n[i] := realchar(e[k],g[k],freq,uo);
           j := i + 1;
         n[j] := imagchar(e[k],g[k],freq,uo);
           i := i + 2;
           k := k + 1;
       end;
end;    {intrimp} procedure datainput;

var i : integer;

begin
      GoToXY(31,2);
      write(char(4));
      TextColor(red);
      write(' Plane Wave Data ');
      Normvideo;
      write(char(4));
         for i := 31 to 49 do
         begin
         GoToXY(i,1);
         write(char(4));
         end;
         for i := 31 to 49 do
         begin
         GoToXY(i,3);
         write(char(4));
         end;
      GoToXY(5,5);
      write('Enter the number of media, 1 or 2:');
      GoToXY(12,6);
      TextColor(green);
      write('-- Enter 0 to quit --');
      GoToXY(41,5);
```

```
repeat
  Lowvideo;
  InputInt(h,41,5);
  GoToXY(5,7);
  ClrEol;
  if (h < 0) or (h > 2) then
  begin
    GoToXY(5,7);
    TextColor(red + blink);
    write('Number of media out of limits -- reenter!');
  end;  {if}
until (h = 0) or (h = 1) or (h = 2);
if h = 0 then
begin
Exit;
end;  {if}
GoToXY(12,6);
ClrEol;
Normvideo;
GoToXY(5,7);
writeln('Enter the relative permitivity and conductivity(S/m) of medium 1.');
GoToXY(5,9);
write(char(238),'1:');
GoToXY(5,10);
write(char(229),'1:');
Lowvideo;
InputRel(e[0],10,9);
InputRel(g[0],10,10);
Normvideo;
e[0] := e[0]*eo;
  if h = 2 then
    begin
    GoToXY(5,12);
    writeln('Enter the relative permitivity and conductivity(S/m) of medium 2.');
    GoToXY(5,14);
    write(char(238),'2:');
    GoToXY(5,15);
    write(char(229),'2:');
    Lowvideo;
    InputRel(e[1],10,14);
    InputRel(g[1],10,15);
    Normvideo;
    e[1] := e[1]*eo;
    GoToXY(5,17);
    write('Enter the frequency in hertz:');
    Lowvideo;
    InputRel(freq,36,17);
    Normvideo;
    end
  else
    begin
    GoToXY(5,12);
    write('Enter the frequency in hertz:');
    Lowvideo;
    InputRel(freq,36,12);
    Normvideo;
    end;
```

```
    GoToXY(10,23);
    write(chr(174),chr(175));
    TextColor(green);
    write(' Hit "enter" to continue ');
    Normvideo;
    write(chr(174),chr(175));
    GoToXY(41,5);
 end;    (procedure datainput)

procedure btaalpin;

var i,stop: integer;

begin
   bta[0] := beta(e[0],g[0],freq,uo);
   alp[0] := alpha(e[0],g[0],freq,uo);
   if h = 2 then
   begin
   bta[1] := beta(e[1],g[1],freq,uo);
   alp[1] := alpha(e[1],g[1],freq,uo);
   end;
end;    (btaalpin)

procedure reflcoef;

begin
   r[0] := gamareal(n[2],n[3],n[0],n[1]);
   r[1] := gamaimag(n[2],n[3],n[0],n[1]);
   r[2] := gamareal(n[0],n[1],n[2],n[3]);
   r[3] := gamaimag(n[0],n[1],n[2],n[3]);
end;    (reflcoef)

procedure main;
begin
initial;
datainput;
if h = 0
then Exit;
intrimp;
btaalpin;
if h = 2
then reflcoef;
again := 'a';
repeat
read(Kbd,again);
until again = char(13);
end;

procedure output;

begin
  ClrScr;
```

```
if h = 0 then
begin
Exit;
end;
GoToXY(12,2);
TextColor(red);
write('MEDIUM 1:');
if h = 2 then
begin
GoToXY(51,2);
write('MEDIUM 2:');
end;
Normvideo;
GoToXY(2,4);
write('Characteristic Impedance (',char(234),'):');
GoToXY(2,5);
if n[1] < 0
then begin
write('n = ');
Lowvideo;
write(n[0]:8:3,' -j ',abs(n[1]):8:3);
Normvideo;
end
else begin
GoToXY(2,5);
write('n = ');
Lowvideo;
write(n[0]:8:3,' +j ',abs(n[1]):8:3);
Normvideo;
end;
if h = 2 then
begin
GoToXY(41,5);
if n[3] < 0
then begin
write('n = ');
Lowvideo;
write(n[2]:8:3,' -j ',abs(n[3]):8:3);
Normvideo;
end
else begin
GoToXY(41,5);
write('n = ');
Lowvideo;
write(n[2]:8:3,' +j ',n[3]:8:3);
Normvideo;
end;
end;
GoToXY(2,7);
write('Propagation Constant (Np/m and rd/m):');
GoToXY(2,8);
write(char(224),' +j ',char(225),' = ');
Lowvideo;
write(alp[0]:3:3,' +j ',bta[0]:3:3);
Normvideo;
if h = 2 then
begin
GoToXY(41,8);
write(char(224),' +j ',char(225),' = ');
```

```
Lowvideo;
write(alp[1]:3:3,' +j ',bta[1]:3:3);
Norsvideo;
end;
GoToXY(2,10);
write('Penetration Depth (meters):');
GoToXY(2,11);
if alp[0] = 0
then
begin
write(char(235),' = ');
Lowvideo;
write('infinity');
Norsvideo;
end
else
begin
write(char(235),' = ');
Lowvideo;
write(1/alp[0]:8);
Norsvideo;
end;
if h = 2 then
begin
GoToXY(41,11);
if alp[1] = 0
then
begin
write(char(235),' = ');
Lowvideo;
write('infinity');
Norsvideo;
end
else
begin
write(char(235),' = ');
Lowvideo;
write(1/alp[1]:8);
Norsvideo;
end;
end;
GoToXY(2,13);
write('Wavelength (meters):');
GoToXY(2,14);
write('w = ');
Lowvideo;
write((2*pi)/bta[0]:4:4);
Norsvideo;
if h = 2 then
begin
GoToXY(41,14);
write('w = ');
Lowvideo;
write((2*pi)/bta[1]:4:4);
Norsvideo;
end;
GoToXY(2,16);
```

```
write('Phase Velocity (meters/second):');
GoToXY(2,17);
write('v = ');
Lowvideo;
write(2*pi*freq/bta[0]:8);
Normvideo;
if h = 2 then
begin
GoToXY(41,17);
write('v = ');
Lowvideo;
write(2*pi*freq/bta[1]:8);
Normvideo;
end;
if h = 2 then
begin
GoToXY(2,19);
write('Reflection coefficient from medium 1 to medium 2:');
GoToXY(2,20);
if r[1] < 0
then begin
write(char(226),' = ');
Lowvideo;
write(r[0]:6:5,' -j ',abs(r[1]):6:5);
Normvideo;
end
else begin
write(char(226),' = ');
Lowvideo;
write(r[0]:6:5,' +j ',r[1]:6:5);
Normvideo;
end;
GoToXY(2,21);
write(char(179),char(226),char(179),' = ');
Lowvideo;
write((sqr(r[0])+sqr(r[1])):5:3);
Normvideo;
GoToXY(2,23);
if freq < 1000 then
begin
write(char(159),' = ');
Lowvideo;
write(freq:6:3,' Hz');
Normvideo;
end;
freq := freq/1000;
if (freq >= 1) and (freq < 1000) then
begin
write(char(159),' = ');
Lowvideo;
write(freq:6:3,' KHz');
Normvideo;
end;
freq := freq/1000;
if (freq >= 1) and (freq < 1000) then
begin
write(char(159),' = ');
```

```
Lowvideo;
write(freq:6:3,' MHz');
Normvideo;
end;
freq := freq/1000;
if (freq >= 1) and (freq < 1000) then
begin
write(char(159),' = ');
Lowvideo;
write(freq:6:3,' GHz');
Normvideo;
end;
end;
if h = 1 then
begin
GoToXY(2,19);
if freq < 1000 then
begin
write(char(159),' = ');
Lowvideo;
write(freq:6:3,' Hz');
Normvideo;
end;
freq := freq/1000;
if (freq >= 1) and (freq < 1000) then
begin
write(char(159),' = ');
Lowvideo;
write(freq:6:3,' KHz');
Normvideo;
end;
freq := freq/1000;
if (freq >= 1) and (freq < 1000) then
begin
write(char(159),' = ');
Lowvideo;
write(freq:6:3,' MHz');
Normvideo;
end;
freq := freq/1000;
if (freq >= 1) and (freq < 1000) then
begin
write(char(159),' = ');
Lowvideo;
write(freq:6:3,' GHz');
Normvideo;
end;
end;
GoToXY(20,25);
Normvideo;
write(char(174),char(175));
    TextColor(green);
    write(' Hit "c" to Continue, "q" to Quit ');
    Normvideo;
    write(char(174),char(175));
    GoToXY(19,2);
  end;
```

```
begin
repeat
ClrScr;
main;
output;
if h = 0
then again := 'q';
if h <> 0 then
begin
again := 'a';
repeat
read(Kbd,again);
until (again = 'c') or (again = 'q');
end;
until again = 'q';
ClrScr;

assign( chainfile, 'OPENMENU.CHN' );
chain( chainfile );
end.

program guidvalu(input,ouput);

const eo = 8.841941e-12;
        uo = 12.56637e-7;
        maxmod = 30;
        cprtchk = 1.1324e-10;

type param = array[0..3] of real;
        savemode = array[1..50] of integer;
        besselvl = array[1..50] of real;
        Fieldmod = Record
              mode : array[1..2] of integer;
           cutofreq : real;
           cutofwav : real;
           charimpd : real;
           charimpe : real;
           waveimpd : real;
           waveimpi : real;
           Mwavelen : real;
           Gwavelen : real;
               beta : real;
            alphadi : real;
            alphagi : real;
            alphaco : real;
              alpha : real;
         end;    {Fieldmod}
         string1 = string[2];
         string2 = string[9];

var h,nummodeE,nummodeM: integer;
        Ch,typeguid,again,donit: char;
        e,g,bta,alp,n,r: param;
        freq,platw,rad,rectw,recth,besnumbr: real;
        Bintr,valumode: savemode;
        Areal,besselnm: besselvl;
        modemenb: array[1..maxmod] of Fieldmod;
        chainfile: file;
```

```
procedure InputInt(var inintgr: integer; inX,inY: integer);

var invalu: string!;
       error: integer;

begin
     repeat
     GoToXY(inX,inY);
     BufLen := 9;
     read(invalu);
     ClrEol;
     Val(invalu,inintgr,error);
     if error <> 0 then
     begin
       GoToXY(40,23);
       TextColor(red + blink);
       write('Data entry error -- reenter!');
       Lowvideo;
     end;   (if)
     until error = 0;
     GoToXY(40,23);
     ClrEol;
   end;   (InputInt)

procedure InputRel(var inreal: real; inX,inY: integer);

var invalu:astring2;
       error: integer;

begin
     repeat
     GoToXY(inX,inY);
     BufLen := 9;
     read(invalu);
     ClrEol;
     Val(invalu,inreal,error);
     if error <> 0 then
     begin
       GoToXY(40,23);
       TextColor(red + blink);
       write('Data entry error -- reenter!');
       Lowvideo;
     end;   (if)
     until error = 0;
     GoToXY(40,23);
     ClrEol;
   end;   (InputRel)

function PlnAlphE(x:integer;uo,y,w,freq,z:real): real;
        {function PlnAlphE calculates the TE attenuation constant}
        {due to guide wall losses from the mode number(x), the}
        {wall conductivity(z),the cutoff frequency(w), and the}
        {permittivity of the guide media(y).}
   var a,b,c:real;
```

```
begin
  if freq <= w
  then PlnAlphE := 0.0
  else begin
       a := w/freq;
       a := sqrt(a/(1 - sqr(a)));
       b := sqrt((pi*uo*w)/z);
       c := 2/(x*sqrt(uo/y));
       PlnAlphE := a*b*c;
       end;    {if}
end;  {PlnAlphE} function PlnAlphM(x:integer;uo,y,w,freq,z:real): real;
     {function PlnAlphM calculates the TM attenuation constant}
     {due to guide wall losses from the mode number(x), the}
     {wall conductivity(z),the cutoff frequency(w), and the}
     {permittivity of the guide media(y).}
  var a,b,c:real;
  begin
    if freq <= w
    then PlnAlphM := 0.0
    else begin
         a := w/freq;
         a := sqrt(a/(1 - sqr(a)));
         a := 1/a;
         b := sqrt((pi*uo*w)/z);
         c := 2/(x*sqrt(uo/y));
         PlnAlphM := a*b*c;
         end;   {if}
  end;  {PlnAlphM} function RecAlphE(s,t:integer;u,v,w,x,y,z,freq:real): real;
     {function RecAlphE calculates the TE attenuation constant}
     {due to guide wall losses from the mode numbers(s,y), the}
     {wall conductivity(u),the cutoff frequency(v), the guide}
     {dimensions(w,x) the imaginary part of the propagation}
     {constant(z), and the permittivity of the guide media(y).}
  var a,b,c,d:real;
  begin
    if freq <= v
    then RecAlphE := 0.0;
    if freq > v then
    begin
      if (s <> 0) and (t = 0) then
      begin
        a := v/freq;
        b := 1.0 + (2*x*sqr(a)/w);
        c := sqrt((pi*freq*uo)/(u*(1 - sqr(a))));
        c := 1.0/(x*sqrt(uo/y));
        RecAlphE := a*b*c;
      end;   {if}
      if (s = 0) and (t <> 0) then
      begin
        a := v/freq;
        b := 1.0 + (2*w*sqr(a)/x);
```

```
      c := sqrt((pi*freq*uo)/(u*(1 - sqr(a))));
      c := 1.0/(w*sqrt(uo/y));
      RecAlphE := a*b*c;
    end;   {if}
    if (s <> 0) and (t <> 0) then
    begin
      a := sqrt((pi*freq*uo)/u);
      b := sqr(s*pi/w) + sqr(t*pi/x);
      c := (sqr(a) + sqr(z*s*pi/w))*w;
      d := (sqr(a) + sqr(z*t*pi/x))*x;
      a := a*(c + d);
      b := w*x*pi*freq*uo*z*b;
      RecAlphE := a/b;
    end;   {if}
   end;   {if}
  end;  {RecAlphE} function DielAlph(w,x,y,z,freq,eo:real): real;
      {function DielAlph calculates the real part of the propagation}
      {constant associated with the waveguide media from the media}
      {conductivity(z), the guide cutoff wavelength(x), the permittivity(y),}
      {the operating frequency(freq), and the cutoff frequency(w).}
  var a,b,c:real;
  begin
    if freq <= w
    then DielAlph := 0.0
    else begin
          c := 3e8/freq;
          a := sqr(c/x) - (y/eo);
          b := z/(2*pi*freq*eo);
          c := (2.0*pi)/c;
      DielAlph := c*sqrt(0.5*(a + sqrt(sqr(a) + sqr(b))));
    end;   {if}
  end;   {DielAlph} function CutAlpha(x,a,eo,freq,w:real): real;
      {function CutAlpha calculates the attenuation constant of the}
      {waveguide for the evanescent modes from the media permittivity(x),}
      {the cutoff wavelength(a), the permeability of free space(uo), the}
      {cutoff frequency(w), and the operating frequency(freq).}
  var b:real;
  begin
    if freq >= w
    then CutAlpha := 0.0
    else begin
          b := 4*sqr(pi*freq/3e8)*(x/eo);
          b := (4*sqr(pi/a)) - b;
      CutAlpha := sqrt(b);
    end;   {if}
  end;   {CutAlpha} function RectBeta(w,x,y,z,freq,eo:real): real;
      {function RectBeta calculates the imaginary part of the propagation}
      {constant associated with the waveguide media from the media}
```

```
    {conductivity(z), the guide cutoff wavelength(x), the permittivity(y),}
    {the operating frequency(freq), and the cutoff frequency(w).}
  var a,b,c:real;
  begin
    if freq <= w
    then RectBeta := 0.0
    else begin
            c := 3e8/freq;
            a := sqr(c/x) - (y/eo);
            b := z/(2*pi*freq*eo);
            c := (2.0*pi)/c;
       RectBeta := c*sqrt(0.5*(-a + sqrt(sqr(a) + sqr(b))));

end;    {if}
  end; {RectBeta} function charimp(x,uo:real): real;
     {function charimp calculates the characteristic impedance}
     {of a material from the permittivity(x), and the}
     {permeability of free space(uo).}
  begin
    charimp := sqrt(uo/x);
  end; {charimp} function charimpr(x,y,w,uo:real): real;
     {function charimpr calculates the real part of the characteristic}
     {impedance of a material from the permittivity(x), the conductivity(y),}
     {the frequency(w) in hertz, and the permeability of free space(uo).}
  var a,b,ua: real;
  begin
    w := 2*pi*w;
    ua := sqrt(uo);
    y := y/w;
    a := x/(sqr(x) + sqr(y));
    b := y/(sqr(x) + sqr(y));
    y := a*b*1.3e10/cprtchk;
    charimpr := ua*sqrt(0.5*(a + sqrt(sqr(a) + sqr(b))));
  end; {charimpr} function charimpi(x,y,w,uo:real): real;
     {function charimpi calculates the imaginary part of the characteristic}
     {impedance of a material from the permittivity(x), the conductivity(y),}
     {the frequency(w) in hertz, and the permeability of free space(uo).}
  var a,b,ua: real;
  begin
    w := 2*pi*w;
    ua := sqrt(uo);
    y := y/w;
    a := x/(sqr(x) + sqr(y));
    b := y/(sqr(x) + sqr(y));
    charimpi := ua*sqrt(0.5*(sqrt(sqr(a) + sqr(b)) - a));
  end; {charimpi}
```

```
function WaveLen(x,uo,freq:real): real;
      {function WaveLen calculates the characteristic wave length}
      {in a material from the permittivity(x), the permeability}
      {of free space(uo), and the frequency(freq).}
  begin
    WaveLen := 1/(freq*sqrt(uo*x));
  end; {WaveLen} function RectCutF(m,n:integer; x,a,b,uo:real): real;
      {function RectCutF calculates the cutoff frequency for a rectangular}
      {wave guide from the permittivity(x), the permeability(uo), the}
      {height(a), the width(b), and the corresponding mode numbers n and m.}
  var c,d,e:real;
  begin
    c := 1/(2*sqrt(uo*x));
    d := sqr(m/a);
    e := sqr(n/b);
    RectCutF := c*sqrt(d + e);
  end; {RectCutF} function CircCutF(x,a,b,uo:real): real;
      {function CircCutF calculates the cutoff frequency for a circular}
      {wave guide from the permittivity(x), the permeability(uo), the}
      {radius(a), and the Bessel number(b).}
  begin
    CircCutF := b/(2*pi*a*sqrt(x*uo));
  end; {CircCutF} function PlanCutF(n:integer; x,a,uo:real): real;
      {function PlanCutF calculates the cutoff frequency for a parallel}
      {plate wave guide from the permittivity(x), the permeability(uo), the}
      {plate gap(a), and the mode number(n).}
  begin
    PlanCutF := n/(2*a*sqrt(x*uo));
  end; {CircCutF} function RectCutW(m,n:integer; a,b:real): real;
      {function RectCutW calculates the cutoff wavelength for a}
      {rectangular wave guide from the height(a), the width(b),}
      {and the corresponding mode numbers n and m.}
  var c,d,e:real;
  begin
    c := sqr(m/a);
    d := sqr(n/b);
    RectCutW := 2.0/sqrt(c + d);
  end; {RectCutW} function CircCutW(a,b:real): real;
      {function CircCutW calculates the cutoff wavelength for a}
      {circular wave guide from the radius(a),}
      {and Bessel number b.}
  begin
    CircCutW := (2*pi*a)/b;
  end; {CircCutW}
```

```
function PlanCutW(n:integer; a:real): real;
        {function PlanCutW calculates the cutoff wavelength for a}
        {parallel plate wave guide from the plate gap(a)}
        {and mode number n.}
    begin
      PlanCutW := (2*a)/n;
    end; {PlanCutW} function TMImpedR(v,w,x,y,z,freq,eo,uo:real): real;
        {function TMImpedR calculates the real part of the transverse magnetic}
        {wave impedance for a waveguide from the media conductivity(z),the}
        {guide cutoff wavelength(x), the permittivity(y), the operating}
        {frequency(freq), the empty guide cutoff frequency(v), and the cutoff}
        {frequency(w).}
    var a,b,c:real;
    begin
      if freq = w
      then TMImpedR := 0.0;
      if freq < w
      then TMImpedR := -charimp(y,uo)*sqrt(1 - sqr(freq/w));
      if (freq > w)
      then begin
          if freq <= v
          then TMImpedR := charimp(y,uo)*sqrt(1 - sqr(w/freq))
          else begin
              c := 3e8/freq;
              a := sqr(c/x) - 1.0;
              b := sqr(c/x) - (y/eo);
              c := z/(2*pi*freq*eo);
              a := b/a;
              b := abs(c/a);
              a := sqrt(0.5*(a + sqrt(sqr(a) + sqr(b))));
              b := -sqrt(0.5*(-a + sqrt(sqr(a) + sqr(b))));
              c := ((a*(y/eo)) - (b*c))/(sqr(y/eo) + sqr(c));
              a := charimp(eo,uo)/sqrt(1 - sqr(v/freq));
              TMImpedR := a*c;
          end;    {else}
      end;    {if}
    end; {TMImpedR} function TMImpedI(v,w,x,y,z,freq,eo,uo:real): real;
        {function TMImpedI calculates the imaginary part of the transverse}
        {magnetic wave impedance for a waveguide from the media conductivity(z),}
        {the guide cutoff wavelength(x), the permittivity(y), the operating}
        {frequency(freq), the empty guide cutoff frequency(v), and the cutoff}
        {frequency(w).}
    var a,b,c:real;
    begin
      if (freq <= w)
      then TMImpedI := 0.0;
      if (freq > w)
      then begin
          if freq <= v
          then TMImpedI := 0.0
          else begin
              c := 3e8/freq;
```

```
            a := sqr(c/x) - 1.0;
            b := sqr(c/x) - (y/eo);
            c := z/(2*pi*freq*eo);
            a := b/a;
            b := abs(c/a);
            a := sqrt(0.5*(a + sqrt(sqr(a) + sqr(b))));
            b := -sqrt(0.5*(-a + sqrt(sqr(a) + sqr(b))));
            c := ((a*c) + (b*(y/eo)))/(sqr(y/eo) + sqr(c));
            a := chariap(eo,uo)/sqrt(1 - sqr(v/freq));
            TMIapedI := a*c;
          end;   {else}
      end;   {if}
  end; {TMIapedI} function TEIapedR(v,w,x,y,z,freq,eo,uo:real): real;
      {function TEIapedR calculates the real part of the transverse magnetic}
      {magnetic wave impedance for a waveguide from the media conductivity(z),}
      {the guide cutoff wavelength(x), the permittivity(y), the operating}
      {frequency(freq), the empty guide cutoff frequency(v), and the cutoff}
      {frequency(w).}
  var a,b,c:real;
  begin
    if freq = w
    then TEIapedR := 123321.0;
    if freq < w
    then TEIapedR := -chariap(y,uo)/sqrt(1 - sqr(freq/w));
    if (freq > w)
    then begin
        if freq > v
        then begin
            c := 3e8/freq;
            a := sqr(c/x) - 1.0;
            b := sqr(c/x) - (y/eo);
            c := z/(2*pi*freq*eo);
            a := (a*b)/(sqr(b) + sqr(c));
            b := (a*c)/(sqr(b) + sqr(c));
            c := sqrt(0.5*(a + sqrt(sqr(a) + sqr(b))));
            a := chariap(eo,uo)/sqrt(1 - sqr(v/freq));
            TEIapedR := a*c;
            end
        else TEIapedR := chariap(y,uo)/sqrt(1 - sqr(w/freq));
    end;   {if}
  end; {TEIapedR} function TEIapedI(v,w,x,y,z,freq,eo,uo:real): real;
      {function TEIapedI calculates the real part of the transverse magnetic}
      {magnetic wave impedance for a waveguide from the media conductivity(z),}
      {the guide cutoff wavelength(x), the permittivity(y), the operating}
      {frequency(freq), the empty guide cutoff frequency(v), and the cutoff}
      {frequency(w).}
  var a,b,c:real;
  begin
    if (freq <= w)
```

```
      then TEImpedI := 0.0;
      if (freq > v)
      then begin
          if freq <= v
          then TEImpedI := 0.0
          else begin
              c := 3e8/freq;
              a := sqr(c/x) - 1.0;
              b := sqr(c/x) - (y/eo);
              c := z/(2*pi*freq*eo);
              a := (a*b)/(sqr(b) + sqr(c));
              b := (a*c)/(sqr(b) + sqr(c));
              c := sqrt(0.5*(-a + sqrt(sqr(a) + sqr(b))));
              a := charimp(eo,uo)/sqrt(1 - sqr(v/freq));
              TEImpedI := a*c;
          end;    {else}
      end;    {if}
   end;  {TEImpedI} function GuidWavL(wc,x,a,freq,eo,fc:real): real;
       {function GuidWavL calculates the guide wave length for a wave}
       {guide from the permittivity(x), the media wavelength(w), the}
       {cutoff wavelength(wc), the media conductivity(a), and the}
       {frequency(freq).}
   var b,c,w: real;
   begin
      if freq <= fc
      then GuidWavL := 0.0
      else begin
           x := x/eo;
           w := 3e8/freq;
           b := x - sqr(w/wc);
           c := sqr(a/(2*pi*freq*eo))/sqr(b);
           c := 0.5 + (0.5*sqrt(1 + c));
      GuidWavL := w/(sqrt(c)*sqrt(b));
      end;    {if}
   end;  {GuidWavL} procedure initial;

var i,stop1,stop2 : integer;

begin
   for i := 0 to 3 do
   begin
   e[i] := 0.0;
   g[i] := 0.0;
bta[i] := 0.0;
alp[i] := 0.0;
   n[i] := 0.0;
   r[i] := 0.0;
   end;
    for i := 1 to 50 do
    begin
```

```
    valuaode[i] := 0;
    end;
end;   {initial} procedure position(k:integer);

begin
    case k of
    0 : begin
        GotoXY(20,7);
        TextColor(red);
        write(char(174),'R');
        noravideo;
        GotoXY(21,7);
        typeguid := 'a';
        end;
    1 : begin
        GotoXY(17,9);
        TextColor(red);
        write(char(174),'C');
        noravideo;
        GotoXY(18,9);
        typeguid := 'b';
        end;
    2 : begin
        GotoXY(14,11);
        TextColor(red);
        write(char(174),'P');
        noravideo;
        GotoXY(15,11);
        typeguid := 'c';
        end;
    end;
end;    {position} procedure erasepos(k:integer);

begin
    case k of
    0 : begin
        GotoXY(20,7);
        write('   ');
        end;
    1 : begin
        GotoXY(17,9);
        write('   ');
        end;
    2 : begin
        GotoXY(14,11);
        write('   ');
        end;
    end;
end;    {erasepos} procedure guidselc;
```

```
var j : integer;

begin
  GoToXY(31,2);
    write(char(4));
    TextColor(red);
    write(' WAVEGUIDE MENU ');
    normvideo;
    write(char(4));
    for j := 31 to 48 do
    begin
    GoToXY(j,1);
    write(char(4));
    end;
    for j := 31 to 48 do
    begin
    GoToXY(j,3);
    write(char(4));
    end;
  GoToXY(5,5);
  write(char(174),char(175));
  TextColor(magenta);
  write(' ENTER the TYPE of WAVEGUIDE ');
  Normvideo;
  write(char(174),char(175));
  GoToXY(5,7);
  write('Rectangular::');
  GoToXY(5,9);
  write('Circular::');
  GoToXY(5,11);
  write('Plane::');
  GoToXY(5,23);
  write('Use ');
  TextColor(green);
  write(char(24),' ',char(25));
  Normvideo;
  write(' arrow keys to select guide type:');
  GoToXY(5,24);
  write('Hit "enter" to continue:');
  j := 0;
  position(j);
    Repeat
    read(Kbd,Ch);
    case ord(Ch) of
80 : begin
     if j <> 2 then
     begin
     erasepos(j);
     j := j + 1;
     position(j);
     end;
     end;
72 : begin
     if j <> 0 then
     begin
     erasepos(j);
     j := j - 1;
```

```
            position(j);
            end;
          end;
      end;
      until Ch = chr(13);
end;    {guidselc} procedure RectEntr;

var i : integer;

begin
   GoToXY(25,2);
   write(char(4));
   TextColor(red);
   write(' Rectangular Waveguide Data ');
   normvideo;
   write(char(4));
      for i := 25 to 54 do
      begin
      GoToXY(i,1);
      write(char(4));
      end;
      for i := 25 to 54 do
      begin
      GoToXY(i,3);
      write(char(4));
      end;
   GoToXY(5,5);
   write('Enter the guide dimensions in centimeters:');
   GoToXY(5,7);
   write('width:');
   GoToXY(5,9);
   write('height:');
   lowvideo;
   InputRel(rectw,16,7);
   rectw := rectw/100;
   InputRel(recth,16,9);
   recth := recth/100;
   normvideo;
   GoToXY(5,11);
   write('Enter the relative permittivity and conductivity (S/m) of the medium:');
   GoToXY(5,13);
   write(' ',chr(238),':');
   GoToXY(5,15);
   write(chr(229),'d:');
   lowvideo;
   InputRel(e[0],10,13);
   e[0] := e[0]*eo;
   InputRel(g[0],10,15);
   normvideo;
   GoToXY(5,17);
   write('Enter the guide conductivity (S/m):');
   GoToXY(5,19);
   write(chr(229),'g:');
   lowvideo;
```

```
InputRel(g[1],10,19);
noravideo;
GoToXY(5,21);
write('Enter the operating frequency in Hz:');
GoToXY(5,23);
write(chr(159),':');
lowvideo;
InputRel(freq,9,23);
GoToXY(10,25);
Noravideo;
write(chr(174),chr(175));
TextColor(green);
write(' Hit "enter" to continue ');
noravideo;
write(chr(174),chr(175));
GoToXY(5,5);
end;         {procedure RectEntr} procedure CircEntr;

var i : integer;

begin
GoToXY(26,2);
write(char(4));
TextColor(red);
write(' Circular Waveguide Data ');
noravideo;
write(char(4));
   for i := 26 to 52 do
   begin
   GoToXY(i,1);
   write(char(4));
   end;
   for i := 26 to 52 do
   begin
   GoToXY(i,3);
   write(char(4));
   end;
   GoToXY(5,5);
   write('Enter the guide radius in centimeters:');
   GoToXY(5,7);
   write('radius:');
   lowvideo;
   InputRel(rad,16,7);
   rad := rad/100;
   noravideo;
   GoToXY(5,9);
   write('Enter the relative permittivity and conductivity (S/m) of the medium:');
   GoToXY(5,11);
   write(' ',chr(239),':');
   GoToXY(5,13);
   write(chr(229),'d:');
   lowvideo;
   InputRel(e[0],10,11);
   e[0] := e[0]*eo;
```

```
    InputRel(g[0],10,13);
    noravideo;
    GoToXY(5,15);
    write('Enter the guide conductivity (S/m):');
    GoToXY(5,17);
    write(chr(229),'g:');
    lowvideo;
    InputRel(g[1],10,17);
    noravideo;
    GoToXY(5,19);
    write('Enter the operating frequency in Hz:');
    GoToXY(5,21);
    write(chr(159),':');
    lowvideo;
    InputRel(freq,9,21);
    GoToXY(10,25);
    Noravideo;
    write(chr(174),chr(175));
    TextColor(green);
    write(' Hit "enter" to continue ');
    noravideo;
    write(chr(174),chr(175));
    GoToXY(5,5);
    end;         {procedure CircEntr} procedure PlanEntr;

var i : integer;

begin
    GoToXY(23,2);
    write(char(4));
    TextColor(red);
    write(' Parallel Plane Waveguide Data ');
    noravideo;
    write(char(4));
    for i := 23 to 55 do
    begin
    GoToXY(i,1);
    write(char(4));
    end;
    for i := 23 to 55 do
    begin
    GoToXY(i,3);
    write(char(4));
    end;
GoToXY(5,5);
write('Enter the plate separation distance in centimeters:');
GoToXY(5,7);
write('width:');
lowvideo;
InputRel(platw,16,7);
platw := platw/100;
noravideo;
GoToXY(5,9);
write('Enter the relative permittivity and conductivity (S/m) of the medium:');
```

```
    GoToXY(5,11);
    write(' ',chr(232),':');
    GoToXY(5,13);
    write(chr(229),'d:');
    lowvideo;
    InputRel(e[0],10,11);
    e[0] := e[0]*eo;
    InputRel(g[0],10,13);
    normvideo;
    GoToXY(5,15);
    write('Enter the guide conductivity (S/m):');
    GoToXY(5,17);
    write(chr(229),'g:');
    lowvideo;
    InputRel(g[1],10,17);
    normvideo;
    GoToXY(5,19);
    write('Enter the operating frequency in Hz:');
    GoToXY(5,21);
    write(chr(159),':');
    GoToXY(9,21);
    lowvideo;
    read(freq);
    InputRel(freq,9,21);
    normvideo;
    GoToXY(10,25);
    Normvideo;
    write(chr(174),chr(175));
    TextColor(green);
    write(' Hit "enter" to continue ');
    normvideo;
    write(chr(174),chr(175));
    GoToXY(5,5);
end;        {procedure PlanEntr} procedure indatsel;

begin
    case typeguid of

'a' : RectEntr;
    'b' : CircEntr;
    'c' : planEntr;
    end;
end;    {indatsel} procedure genmode1;

var i,j,k: integer;

begin
    i := 1;
    j := 0;
    k := 1;
    while k < 4 do
```

```
   begin
      valumode[i] := j;
            i := i + 1;
      valumode[i] := k;
            i := i + 1;
            k := k + 1;
   end;   {while}
   for j := 1 to 3 do
   begin
      for k := 0 to 3 do
      begin
         valumode[i] := j;
            i := i + 1;
      valumode[i] := k;
            i := i + 1;
      end;    {for}
   end;    {for}
   for j := 1 to 3 do
   begin
      for k := 1 to 3 do
      begin
         valumode[i] := j;
            i := i + 1;
      valumode[i] := k;
            i := i + 1;
      end;   {for}
   end;   {for}
end;    {genmode1} procedure genmode2;

var i,j,k: integer;

begin
   i := 1;
   for j := 0 to 3 do
   begin
      for k := 1 to 3 do
      begin
         valumode[i] := j;
            i := i + 1;
      valumode[i] := k;
            i := i + 1;
      end;   {for}
   end;    {for}
   for j := 0 to 3 do
   begin
      for k := 1 to 3 do
      begin
         valumode[i] := j;
            i := i + 1;
      valumode[i] := k;
            i := i + 1;
      end;   {for}
   end;   {for}
end;    {genmode2}
```

```
procedure genmode2;

var i: integer;

begin
   for i := 1 to 4 do
   begin
      valumode[i] := i;
   end;   {for}
   for i := 5 to 9 do
   begin
      valumode[i] := i - 4;
   end;   {for}
end;   {genmode3} procedure genbesel;

begin
      besselna[1] := 3.832;
      besselna[2] := 7.016;
      besselna[3] := 10.173;
      besselna[4] := 1.841;
      besselna[5] := 5.331;
      besselna[6] := 8.536;
      besselna[7] := 3.054;
      besselna[8] := 6.706;
      besselna[9] := 9.969;
      besselna[10] := 4.201;
      besselna[11] := 8.015;
      besselna[12] := 11.346;
      besselna[13] := 2.405;
      besselna[14] := 5.520;
      besselna[15] := 8.645;
      besselna[16] := 3.832;
      besselna[17] := 7.106;
      besselna[18] := 10.173;
      besselna[19] := 5.136;
      besselna[20] := 8.417;
      besselna[21] := 11.620;
      besselna[22] := 6.380;
      besselna[23] := 9.761;
      besselna[24] := 13.015;
end;   {genbesel} procedure RecValRc;

var start,stop,i: integer;
       tempfreq: real;

begin
      start := 1;
      stop := nummodeE;

for i := start to stop do
```

```
begin
   with modemsmb[i] do
   begin
      mode[1] := valumode[2*i-1];
      mode[2] := valumode[2*i];
      cutofreq := RectCutF(mode[1],mode[2],e[0],rectw,recth,uo);
      cutofwav := RectCutW(mode[1],mode[2],rectw,recth);
      charimpd := charimpr(e[0],g[0],freq,uo);
      charimpe := charimpi(e[0],g[0],freq,uo);
         tempfreq := RectCutF(mode[1],mode[2],eo,rectw,recth,uo);
      waveimpd := TEImpedR(tempfreq,cutofreq,cutofwav,e[0],g[0],freq,eo,uo);
      waveimpi := TEImpedI(tempfreq,cutofreq,cutofwav,e[0],g[0],freq,eo,uo);
      Mwavelen := Wavelen(e[0],uo,freq);
      Gwavelen := GuidWavL(cutofwav,e[0],g[0],freq,eo,cutofreq);
         beta := RectBeta(cutofreq,cutofwav,e[0],g[0],freq,eo);
      alphadi := DielAlph(cutofreq,cutofwav,e[0],g[0],freq,eo);
      alphagi := RecAlphE(mode[1],mode[2],g[1],cutofreq,rectw,recth,e[0],beta,freq);
      alphaco := CutAlpha(e[0],cutofwav,eo,freq,cutofreq);
         alpha := alphadi + alphagi;
   end;   {with}
end;   {for} start := nummodeE + 1;
stop := nummodeE + nummodeM;
   for i := start to stop do
   begin
      with modemsmb[i] do
      begin
         mode[1] := valumode[2*i-1];
         mode[2] := valumode[2*i];
         cutofreq := RectCutF(mode[1],mode[2],e[0],rectw,recth,uo);
         cutofwav := RectCutW(mode[1],mode[2],rectw,recth);
         charimpd := charimpr(e[0],g[0],freq,uo);
         charimpe := charimpi(e[0],g[0],freq,uo);
            tempfreq := RectCutF(mode[1],mode[2],eo,rectw,recth,uo);
         waveimpd := TMImpedR(tempfreq,cutofreq,cutofwav,e[0],g[0],freq,eo,uo);
         waveimpi := TMImpedI(tempfreq,cutofreq,cutofwav,e[0],g[0],freq,eo,uo);
         Mwavelen := Wavelen(e[0],uo,freq);
         Gwavelen := GuidWavL(cutofwav,e[0],g[0],freq,eo,cutofreq);
            beta := RectBeta(cutofreq,cutofwav,e[0],g[0],freq,eo);
         alphadi := DielAlph(cutofreq,cutofwav,e[0],g[0],freq,eo);
         alphagi := 0;
         alphaco := CutAlpha(e[0],cutofwav,eo,freq,cutofreq);
            alpha := alphadi + alphagi;
      end;   {with}
   end;   {for}
end;   {RecValRc} procedure RecValCr;

var start,stop,i: integer;
       tempfreq: real;

begin
      start := 1;
      stop := nummodeE;
```

```
      for i := start to stop do
      begin
         besnumbr := besselnm[i];
         with modemem b[i] do
         begin
            mode[1] := valumode[2*i-1];
            mode[2] := valumode[2*i];
            cutofreq := CircCutF(e[0],rad,besnumbr,uo);
            cutofwav := CircCutW(rad,besnumbr);
            charimpd := charimpr(e[0],g[0],freq,uo);
            charimpe := charimpi(e[0],g[0],freq,uo);
                tempfreq := CircCutF(eo,rad,besnumbr,uo);
            waveimpd := TEImpedR(tempfreq,cutofreq,cutofwav,e[0],g[0],freq,eo,uo);
            waveimpi := TEImpedI(tempfreq,cutofreq,cutofwav,e[0],g[0],freq,eo,uo);
            Mwavelen := Wavelen(e[0],uo,freq);
            Gwavelen := GuidWavL(cutofwav,e[0],g[0],freq,eo,cutofreq);
                beta := RectBeta(cutofreq,cutofwav,e[0],g[0],freq,eo);
            alphadi := DielAlph(cutofreq,cutofwav,e[0],g[0],freq,eo);
            alphagi := 0;
            alphaco := CutAlpha(e[0],cutofwav,eo,freq,cutofreq);
                alpha := alphadi + alphagi;
         end;   {with}
      end;   {for} start := nummodeE + 1;
      stop := nummodeE + nummodeM;

for i := start to stop do
      begin
         besnumbr := besselnm[i];
         with modemem b[i] do
         begin
            mode[1] := valumode[2*i-1];
            mode[2] := valumode[2*i];
            cutofreq := CircCutF(e[0],rad,besnumbr,uo);
            cutofwav := CircCutW(rad,besnumbr);
            charimpd := charimpr(e[0],g[0],freq,uo);
            charimpe := charimpi(e[0],g[0],freq,uo);
                tempfreq := CircCutF(eo,rad,besnumbr,uo);
            waveimpd := TMImpedR(tempfreq,cutofreq,cutofwav,e[0],g[0],freq,eo,uo);
            waveimpi := TMImpedI(tempfreq,cutofreq,cutofwav,e[0],g[0],freq,eo,uo);
            Mwavelen := Wavelen(e[0],uo,freq);
            Gwavelen := GuidWavL(cutofwav,e[0],g[0],freq,eo,cutofreq);
                beta := RectBeta(cutofreq,cutofwav,e[0],g[0],freq,eo);
            alphadi := DielAlph(cutofreq,cutofwav,e[0],g[0],freq,eo);
            alphagi := 0;
            alphaco := CutAlpha(e[0],cutofwav,eo,freq,cutofreq);
                alpha := alphadi + alphagi;
         end;   {with}
      end;   {for}
end;   {RecValCr} procedure RecValPl;

var start,stop,i: integer;
       tempfreq: real;
```

```
begin
   start := 1;
   stop := nummodeE;

for i := start to stop do
   begin
      with modesmemb[i] do
      begin
         mode[1] := valumode[i];
         mode[2] := 0;
         cutofreq := PlanCutF(mode[1],e[0],platw,uo);
         cutofwav := PlanCutW(mode[1],platw);
         charimpd := charimpr(e[0],g[0],freq,uo);
         charimpe := charimpi(e[0],g[0],freq,uo);
             tempfreq := PlanCutF(mode[1],eo,platw,uo);
         waveimpd := TEImpedR(tempfreq,cutofreq,cutofwav,e[0],g[0],freq,eo,uo);
         waveimpi := TEImpedI(tempfreq,cutofreq,cutofwav,e[0],g[0],freq,eo,uo);
         Mwavelen := Wavelen(e[0],uo,freq);
         Gwavelen := GuidWavL(cutofwav,e[0],g[0],freq,eo,cutofreq);
             beta := RectBeta(cutofreq,cutofwav,e[0],g[0],freq,eo);
         alphadi := DielAlph(cutofreq,cutofwav,e[0],g[0],freq,eo);
         alphagi := PlnAlphE(mode[1],uo,e[0],cutofreq,freq,g[1]);
         alphaco := CutAlpha(e[0],cutofwav,eo,freq,cutofreq);
            alpha := alphadi + alphagi;
      end; {with}
   end; {for} start := nummodeE + 1;
   stop := nummodeE + nummodeM;

for i := start to stop do
   begin
      with modesmemb[i] do
      begin
         mode[1] := valumode[i];
         mode[2] := valumode[2*i];
         cutofreq := PlanCutF(mode[1],e[0],platw,uo);
         cutofwav := PlanCutW(mode[1],platw);
         charimpd := charimpr(e[0],g[0],freq,uo);
         charimpe := charimpi(e[0],g[0],freq,uo);
             tempfreq := PlanCutF(mode[1],eo,platw,uo);
         waveimpd := TMImpedR(tempfreq,cutofreq,cutofwav,e[0],g[0],freq,eo,uo);
         waveimpi := TMImpedI(tempfreq,cutofreq,cutofwav,e[0],g[0],freq,eo,uo);
         Mwavelen := Wavelen(e[0],uo,freq);
         Gwavelen := GuidWavL(cutofwav,e[0],g[0],freq,eo,cutofreq);
             beta := RectBeta(cutofreq,cutofwav,e[0],g[0],freq,eo);
         alphadi := DielAlph(cutofreq,cutofwav,e[0],g[0],freq,eo);
         alphagi := PlnAlphM(mode[1],uo,e[0],cutofreq,freq,g[1]);;
         alphaco := CutAlpha(e[0],cutofwav,eo,freq,cutofreq);
            alpha := alphadi + alphagi;
      end; {with}
   end; {for}
end; {RecValPl} procedure findresl;
```

```
begin
   case typeguid of
   'a' : begin
         nummodeE := 15;
         nummodeM := 9;
         genmode1;
         RecValRc;
         end;
   'b' : begin
         nummodeE := 12;
         nummodeM := 12;
         genmode2;
         genbesel;
         RecValCr;
         end;
   'c' : begin
         nummodeE := 4;
         nummodeM := 4;
         genmode3;
         RecValPl;
         end;
   end;    {case}
end;    {findresl} procedure FaceMode;

var i: integer;

begin
   GoToXY(20,3);
   write(char(4));
   TextColor(red);
   write(' Order of Dominance of Waveguide Modes ');
   normvideo;
   write(char(4));
      for i := 20 to 60 do
      begin
      GoToXY(i,2);
      write(char(4));
      end;
      for i := 20 to 60 do
      begin
      GoToXY(i,4);
      write(char(4));
      end;
   GoToXY(15,7);
   write('Transverse Electric');
   GoToXY(49,7);
   write('Transverse Magnetic');
   if typeguid = 'c' then
   begin
   GoToXY(25,8);
   write('a');
   GoToXY(59,8);
   write('a');
   end
   else
```

```
begin
if nummodeE < 7 then
begin
GoToXY(23,8);
write('a,n');
end;
if nummodeM < 7 then
begin
GoToXY(57,8);
write('a,n');
end;
if (nummodeE > 6) and (nummodeE < 13) then
begin
GoToXY(19,8);
write('a,n');
GoToXY(26,9);
write('a,n');
end;
if (nummodeE > 12) then
begin
GoToXY(16,8);
write('a,n');
GoToXY(23,9);
write('a,n');
GoToXY(30,10);
write('a,n');
end;
if (nummodeM > 6) and (nummodeM < 13) then
begin
GoToXY(53,8);
write('a,n');
GoToXY(60,9);
write('a,n');
end;
if (nummodeM > 12) then
begin
GoToXY(50,8);
write('a,n');
GoToXY(57,9);
write('a,n');
GoToXY(64,10);
write('a,n');
end;
end;
GoToXY(5,22);
TextColor(red + blink);
write(char(174),' ',char(175));
TextColor(yellow);
GoToXY(9,22);
write('-- cutoff modes');
GoToXY(5,24);
TextColor(green);
write('Hit "enter" to continue:');
end;     {FaceMode}
```

```
procedure Eleoutfc;

var i: integer;
      a: real;

begin
GoToXY(25,2);
write(char(4));
TextColor(red);
write(' Transverse Electric Modes ');
normvideo;
write(char(4));
   for i := 25 to 53 do
   begin
   GoToXY(i,1);
   write(char(4));
   end;
      for i := 25 to 53 do
      begin
      GoToXY(i,3);
      write(char(4));
      end;
GoToXY(2,5);
write('Mode Number (n,m) ::');
GoToXY(35,5);
write('Cutoff frequency :: ',char(159),'c = ');
GoToXY(33,6);
write('Operating frequency :: ',char(159),' = ');
GoToXY(60,6);
lowvideo;
  if freq < 1000 then
  write(freq:6:3,' Hz');
  a := freq/1000;
  if (a >= 1) and (a < 1000) then
  write(a:6:3,' KHz');
  a := a/1000;
  if (a >= 1) and (a < 1000) then
  write(a:6:3,' MHz');
  a := a/1000;
  if (a >= 1) and (a < 1000) then
  write(a:6:3,' GHz');
normvideo;
GoToXY(2,8);
write('Characteristic Impedance (',char(234),') ::');
GoToXY(2,10);
write('n = ');
GoToXY(41,8);
write('Waveguide Impedance (',char(234),') ::');
GoToXY(41,10);
write('nw = ');
GoToXY(2,12);
write('Media Wave Length (meters) ::');
GoToXY(2,14);
write('W = ');
GoToXY(41,12);
```

```
    write('Guide Wave Length (meters) ::');
    GoToXY(41,14);
    write('Wg = ');
    GoToXY(2,16);
    write('Attenuation Constants (Np/m) ::');
    GoToXY(2,18);
    write(char(224),'d = ');
    GoToXY(20,18);
    write(char(224),'g = ');
    GoToXY(38,18);
    write(char(224),'c = ');
    GoToXY(2,20);
    write('Propagation Constant (Np/m and rd/m):');
    GoToXY(2,22);
    write(char(224),' +j ',char(225),' = ');
    GoToXY(10,25);
    write(chr(174),chr(175));
    TextColor(green);
    write(' Hit "c" to continue, "q" to quit ');
    Normvideo;
    write(chr(174),chr(175));
end;    {Eleoutfc} procedure Magoutfc;

var i: integer;
      a: real;

begin
  GoToXY(25,2);
  write(char(4));
  TextColor(red);
  write(' Transverse Magnetic Modes ');
  normvideo;
  write(char(4));
     for i := 25 to 53 do
     begin
     GoToXY(i,1);
     write(char(4));
     end;
     for i := 25 to 53 do
     begin
     GoToXY(i,3);
     write(char(4));
     end;
  GoToXY(2,5);
  write('Mode Number (n,m) ::');
  GoToXY(35,5);
  write('Cutoff frequency :: ',char(159),'c = ');
  GoToXY(33,6);
  write('Operating frequency :: ',char(159),' = ');
  GoToXY(60,6);
  lowvideo;
     if freq < 1000 then
```

```
    write(freq:6:3,' Hz');
    a := freq/1000;
    if (a )= 1) and (a < 1000) then
    write(a:6:3,' KHz');
    a := a/1000;
    if (a )= 1) and (a < 1000) then
    write(a:6:3,' MHz');
    a := a/1000;
    if (a )= 1) and (a < 1000) then
    write(a:6:3,' GHz');
  noravideo;
  GoToXY(2,8);
  write('Characteristic Impedance (',char(234),') ::');
  GoToXY(2,10);
  write('n = ');
  GoToXY(41,8);
  write('Waveguide Impedance (',char(234),') ::');
  GoToXY(41,10);
  write('nw = ');
  GoToXY(2,12);
  write('Media Wave Length (meters) ::');
  GoToXY(2,14);
  write('W = ');
  GoToXY(41,12);
  write('Guide Wave Length (meters) ::');
  GoToXY(41,14);
  write('Wg = ');
  GoToXY(2,16);
  write('Attenuation Constants (Np/m) ::');
  GoToXY(2,18);
  write(char(224),'d = ');
  GoToXY(20,18);
  write(char(224),'g = ');
  GoToXY(38,18);
  write(char(224),'c = ');
  GoToXY(2,20);
  write('Propagation Constant (Np/m and rd/m):');
  GoToXY(2,22);
  write(char(224),' +j ',char(225),' = ');
  GoToXY(10,25);
  write(chr(174),chr(175));
  TextColor(green);
  write(' Hit "c" to continue, "q" to quit ');
  Noravideo;
  write(chr(174),chr(175));
end;    {Magoutfc} procedure Switchvt;

var i: integer;

begin
  for i := 1 to (nummodeE + nummodeM) do
  begin
```

```
      Bintr[i] := i;
      with modememb[i] do
      begin
        Areal[i] := cutofreq;
      end;   (with)
    end;   (for)
end;   (Switchvt)

procedure SortMode;

var itdoneab: boolean;
       i,j,N,jumpit: integer;

procedure Quikswap(var p,q: real);

var hold: real;

begin
          hold := p;
              p:= q;
              q := hold;
       end;     (Quikswap)

procedure Kuicswap(var p,q: integer);

var hold: integer;

begin
          hold := p;
              p:= q;
              q := hold;
       end;     (Kuicswap)

begin
   N := nummodeE;
   jumpit := N;
   while jumpit > 1 do
   begin
     jumpit := jumpit div 2;
     repeat
       itdoneab := true;
       for j := 1 to (N - jumpit) do
       begin
         i := j + jumpit;
         if Areal[j] > Areal[i] then
         begin
           Kuicswap(Bintr[j],Bintr[i]);
           Quikswap(Areal[j],Areal[i]);
           itdoneab := false;
         end;   (if)
       end;   (for)
       until itdoneab;
   end; (while)
   N := nummodeM;
```

```
    jumpit := N;
    while jumpit > 1 do
    begin
      jumpit := jumpit div 2;
      repeat
        itdoneab := true;
        for j := 1 to (N - jumpit) do
        begin
          i := j + jumpit;
          if Areal[j+nummodeE] > Areal[i+nummodeE] then
          begin
            Kuicswap(Bintr[j+nummodeE],Bintr[i+nummodeE]);
            Quikswap(Areal[j+nummodeE],Areal[i+nummodeE]);
            itdoneab := false;
          end;   {if}
        end;   {for}
      until itdoneab;
    end; {while} end;   {SortMode} procedure OutordMN;

var i,k,p,q,r: integer;

procedure outregan(a,b,c,d,e,f: integer);

var l,m: integer;

begin
      if c > nummodeE
      then l := e + c - nummodeE
      else l := e + c;
      if typeguid = 'c'
      then m := f
      else m := d;
      GoToXY(m,l);
      lowvideo;
      if typeguid = 'c'
      then write(a)
      else write(a,' ',b);
      normvideo;
    end;   {outregan} procedure outspcan(a,b,c,d,e,f: integer);

var l,m: integer;

begin
      if c > nummodeE
      then l := e + c - nummodeE
      else l := e + c;
      if typeguid = 'c'
```

```
      then a := f - 1
      else a := d - 1;
      GoToXY(a,1);
      TextColor(red + blink);
      write(char(174));
      TextColor(yellow);
      lowvideo;
      if typeguid = 'c'
      then write(a)
      else write(a,' ',b);
      normvideo;
      TextColor(red + blink);
      write(char(175));
      TextColor(yellow);
    end;    {outspcan} procedure searchvl;

begin
    k := Bintr[i];
    with modememb[k] do
    begin
      if freq > cutofreq
      then outregan(mode[1],mode[2],i,p,q,r)
      else outspcan(mode[1],mode[2],i,p,q,r);
    end;    {with}
  end;    {searchvl} begin
{TE modes}
r := 25;
if nummodeE < 7 then
begin
p := 23;
q := 8;
for i := 1 to nummodeE do
begin
  searchvl;
end;  {for}
end;
if (nummodeE > 6) and (nummodeE < 13) then
begin
p := 19;
q := 8;
for i := 1 to 6 do
begin
  searchvl;
end;  {for}
p := 26;
q := 3;
for i := 7 to nummodeE do
begin
  searchvl;
end;  {for}
```

```
end;
if (nummodeE > 12) then
begin
p := 16;
q := 8;
for i := 1 to 6 do
begin
   searchvl;
end;   {for}
p := 23;
q := 3;
for i := 7 to 12 do
begin
   searchvl;
end;   {for}
p := 30;
q := -2;
for i := 13 to nummodeE do
begin
   searchvl;
end;   {for}
end;
{TM modes}
r := 59;
if nummodeM < 7 then
begin
p := 57;
q := 8;
for i := (nummodeE + 1) to (nummodeE + nummodeM) do
begin
   searchvl;
end;   {for}
end;
if (nummodeM > 6) and (nummodeM < 13) then
begin
p := 53;
q := 8;
for i := (nummodeE + 1) to (nummodeE + 6) do
begin
   searchvl;
end;   {for}
p := 60;
q := 3;
for i := (nummodeE + 7) to (nummodeE + nummodeM) do
begin
   searchvl;
end;   {for}
end;
if nummodeM > 12 then
begin
p := 50;
q := 8;
for i := (nummodeE + 1) to (nummodeE + 6) do
begin
   searchvl;
```

```
    end;    {for}
    p := 57;
    q := 3;
    for i := (nummodeE + 7) to (nummodeE + 12) do
    begin
      searchvl;
    end;    {for}
    p := 64;
    q := -2;
    for i := (nummodeE + 13) to (nummodeE + nummodeM) do
    begin
      searchvl;
    end;    {for}
    end;
    GoToXY(5,24);
end;    {OutordMN} procedure putoutab;

var i,stop: integer;
      a: real;

begin
  Eleoutfc;
  i := 1;
  stop := nummodeE + 1;
  while i < stop do
  begin
    with modememb[i] do
    begin
      lowvideo;
      GoToXY(24,5);
      if typeguid = 'c'
      then write(mode[1])
      else write(mode[1],mode[2]);
      GoToXY(60,5);
      if cutofreq < 1000 then
      write(cutofreq:6:3,' Hz');
      a := cutofreq/1000;
      if (a >= 1) and (a < 1000) then
      write(a:6:3,' KHz');
      a := a/1000;
      if (a >= 1) and (a < 1000) then
      write(a:6:3,' MHz');
      a := a/1000;
      if (a >= 1) and (a < 1000) then
      write(a:6:3,' GHz');
      GoToXY(6,10);
      if charimpe < 0.0
      then write(charimpd:6:2,' -j',abs(charimpe):6:2)
      else write(charimpd:6:2,' +j',charimpe:6:2);
      GoToXY(46,10);
      if waveimpd = 123321.0
```

```
     then write('j',char(236));
     if waveimpd < 0.0
     then write('j',abs(waveimpd):7:3);
     if waveimpd > 0.0
     then begin
          if waveimpi < 0.0
          then write(waveimpd:7:3,' -j',abs(waveimpi):7:3)
          else write(waveimpd:7:3,' +j',waveimpi:7:3);
          end;   {if}
GoToXY(6,14);
write(Mwavelen:6:4);
GoToXY(46,14);
write(Gwavelen:6:4);
GoToXY(6,18);
write(alphadi:7:3);
GoToXY(25,18);
write(alphagi:7:5);
GoToXY(43,18);
write(alphaco:7:3);
GoToXY(9,22);
write(alpha:6:3,'+j',beta:6:3);
normvideo;
GoToXY(2,5);
if freq <= cutofreq then
 begin
   GoToXY(8,6);
   TextColor(red + blink);
   write('Operating Below Cutoff');
   TextColor(yellow);
   GoToXY(2,5);
 end;   {if}
 repeat;
 read(Kbd,again);
 until (again = 'c') or (again = 'q');
 i := i + 1;
 if again = 'q' then
 i := stop;
GoToXY(24,5);
write('    ');
GoToXY(60,5);
write('                ');
GoToXY(6,10);
write('                ');
GoToXY(46,10);
write('                ');
GoToXY(6,14);
write('           ');
GoToXY(46,14);
write('           ');
GoToXY(6,18);
write('           ');
GoToXY(25,18);
write('           ');
GoToXY(42,18);
write('           ');
```

```
      GoToXY(9,22);
      write('                    ');
      if freq <= cutofreq then
      begin
        GoToXY(6,6);
        write('                    ');
      end;
    end;    {modemesb}
  end;    {while}

ClrScr;
GoToXY(23,12);
write(char(4));
TextColor(red);
write(' End Transverse Electric Modes ');
normvideo;
write(char(4));
for i := 23 to 55 do
begin
GoToXY(i,11);
write(char(4));
end;
for i := 23 to 55 do
begin
GoToXY(i,13);
write(char(4));
end;
GoToXY(10,25);
Normvideo;
write(chr(174),chr(175));
TextColor(green);
write(' Hit "c" to continue, "q" to quit ');
normvideo;
write(chr(174),chr(175));
repeat;
      stop := nummodeE + nummodeM + 1;
      read(Kbd,again);
      until (again = 'c') or (again = 'q');
      if again = 'q'
      then i := stop + 1
      else i := nummodeE + 1;
ClrScr;
   if i = nummodeE + 1 then
   Magoutfc;
   while i < stop do
   begin
     with modemesb[i] do
     begin
     lowvideo;
     GoToXY(24,5);
     if typeguid = 'c'
     then write(mode[1])
     else write(mode[1],mode[2]);
     GoToXY(60,5);
      if cutofreq < 1000 then
```

```
write(cutofreq:6:3,' Hz');
a := cutofreq/1000;
if (a >= 1) and (a < 1000) then
write(a:6:3,' KHz');
a := a/1000;
if (a >= 1) and (a < 1000) then
write(a:6:3,' MHz');
a := a/1000;
if (a >= 1) and (a < 1000) then
write(a:6:3,' GHz');
GoToXY(6,10);
if charimpe < 0.0
then write(charimpd:6:2,' -j',abs(charimpe):6:2)
else write(charimpd:6:2,' +j',charimpe:6:2);
GoToXY(46,10);
  if waveimpd = 123321.0
  then write('j',char(236));
  if waveimpd < 0.0
  then write('j',abs(waveimpd):7:3);
  if waveimpd > 0.0
  then begin
       if waveimpi < 0.0
       then write(waveimpd:7:3,' -j',abs(waveimpi):7:3)
       else write(waveimpd:7:3,' +j',waveimpi:7:3);
       end;   {if}
GoToXY(6,14);
write(Mwavelen:6:4);
GoToXY(46,14);
write(Gwavelen:6:4);
GoToXY(6,18);
write(alphadi:7:3);
GoToXY(25,18);
write(alphagi:7:5);
GoToXY(43,18);
write(alphaco:7:3);
GoToXY(9,22);
write(alpha:6:3,'+j',beta:6:3);
normvideo;
GoToXY(2,5);
if freq <= cutofreq then
 begin
   GoToXY(8,6);
   TextColor(red + blink);
   write('Operating Below Cutoff');
   TextColor(yellow);
   GoToXY(2,5);
 end;   {if}
 repeat;
 read(Kbd,again);
 until (again = 'c') or (again = 'q');
 i := i + 1;
 if again = 'q' then
 i := stop;
 GoToXY(24,5);
 write('   ');
```

```
      GoToXY(60,5);
      write('            ');
   GoToXY(6,10);
      write('                ');
      GoToXY(46,10);
      write('              ');
      GoToXY(6,14);
      write('           ');
      GoToXY(46,14);
      write('          ');
      GoToXY(6,18);
      write('        ');
      GoToXY(25,18);
      write('         ');
      GoToXY(42,18);
      write('         ');
      GoToXY(9,22);
      write('                 ');
      if freq <= cutofreq then
      begin
        GoToXY(8,6);
        write('                ');
      end;
    end;    {modeme=b}
  end;    {while}
ClrScr;
if i < stop + 1 then
begin
GoToXY(23,12);
write(char(4));
TextColor(red);
write(' End Transverse Magnetic Modes ');
normvideo;
write(char(4));
for i := 23 to 55 do
begin
GoToXY(i,11);
write(char(4));
end;
for i := 23 to 55 do
begin
GoToXY(i,13);
write(char(4));
end;
GoToXY(10,25);
write(chr(174),chr(175));
TextColor(green);
write(' Hit "c" to continue ');
normvideo;
write(chr(174),chr(175));
again := 'a';
repeat;
read(Kbd,again);
until (again = 'c') or (again = 'q');
end;    {begin}
```

```
end;    {putoutab} procedure main;
begin
initial;
guidselc;
ClrScr;
indatsel;
again := 'a';
repeat;
read(Kbd,again);
until again = char(13);
ClrScr;
findresl;
Switchvt;
SortMode;
FaceMode;
OutordMN;
again := 'a';
repeat;
read(Kbd,again);
until again = char(13);
ClrScr;
putoutab;
ClrScr;
end;

begin
repeat
ClrScr;
main;
GoToXY(11,6);
write(char(4));
TextColor(green);
write(' Enter "r" to repeat Waveguide Workstation ');
TextColor(yellow);
write(char(4));
GoToXY(11,8);
write(char(4));
TextColor(green);
write(' Enter "e" to exit Waveguide Workstation ');
TextColor(yellow);
write(char(4));
repeat
again := 'a';
read(Kbd,again);
until (again = 'r') or (again = 'e');
until again = 'e';

assign( chainfile, 'OPENMENU.CHN' );
chain( chainfile );
end.
```

```
program transanl(input,ouput);

const cprtchk = 1.1324e-10;

type index1 = 1..10;
        index2 = 1..11;
        param = array[index1] of real;
        param1 = array[index2] of real;
        string1 = string[2];
        string2 = string[9];

var alpha,beta,loadzr,loadzi,charzr,charzi,l,
       inputzrl,inputzim,VoltLdrl,VoltLdim,powr: param;
       powerin: param1;
       h: integer;
       Pgen,Zrl,Zim,Zorl,Zoim,Zgenrl,Zgenim,Vinrl,Vinim,Vgenrl,Vgenim: real;
       Ch,typecalc: char;
       chainfile: file;
       strlngth: integer;

procedure InputInt(var inintgr: integer; inX,inY: integer);

var invalu: string1;
       error: integer;

begin
     repeat
       GoToXY(inX,inY);
       BufLen := 9;
       read(invalu);
       strlngth := length(invalu);
       ClrEol;
       Val(invalu,inintgr,error);
       if error <> 0 then
       begin
         GoToXY(40,23);
         TextColor(red + blink);
         write('Data entry error -- reenter!');
         Lowvideo;
       end;  {if}
     until error = 0;
     GoToXY(40,23);
     ClrEol;
   end;   {InputInt} procedure InputRel(var inreal: real; inX,inY: integer);

var invalu: string2;
       error: integer;

begin
     repeat
       GoToXY(inX,inY);
```

```
      BufLen := 9;
      read(invalu);
      strlngth := length(invalu);
      ClrEol;
      Val(invalu,inreal,error);
      if error <> 0 then
      begin
        GoToXY(40,23);
        TextColor(red + blink);
        write('Data entry error -- reenter!');
        Lowvideo;
      end;  {if}
    until error = 0;
    GoToXY(40,23);
    ClrEol;
  end;   {InputRel} procedure InputRl2(var inreal: real; inX,inY: integer);

var invalu: string2;
      error: integer;

begin
    repeat
      GoToXY(inX,inY);
      TextColor(green);
      BufLen := 9;
      read(invalu);
      strlngth := length(invalu);
      ClrEol;
      Val(invalu,inreal,error);
      if error <> 0 then
      begin
        GoToXY(40,23);
        TextColor(red + blink);
        write('Data entry error -- reenter!');
        Lowvideo;
      end;  {if}
    until error = 0;
    GoToXY(40,23);
    ClrEol;
  end;   {InputRel} function Cosh(x:real): real;
  begin
  Cosh := 0.5*(exp(x) + exp(-x));
  end;  {Cosh} function Sinh(x:real): real;
  begin
  Sinh := 0.5*(exp(x) - exp(-x));
  end;  {Sinh}
```

```pascal
function Powers(w,x,y,z:real): real;
    {w+jx is the voltage, and y+jz is the current.}
  begin
  Powers := 0.5*((w*y) + (x*z));
  end;   {Powers} function PowerGen(u,v,w,x,y,z:real): real;
        {u+jv = Vgenrl + j Vgenim, w+jx = Zlrl +j Zlim}
        {y+jz = Zgenrl +j Zgenim}
    var a: real;
    begin
      a := sqr(u) + sqr(v);
      PowerGen := 0.5*((a*(w + y))/(sqr(w + y) + sqr(x + z)));
    end;   {PowerGen} function Powrtest(u,v,w,x,y,z:real): real;
        {u+jv = Vgenrl + j Vgenim, w+jx = Zorl +j Zoim}
        {y+jz = Zgenrl +j Zgenim}
    var a,b,c,d,e,f: real;
    begin
      a := w + y;
      b := x + z;
      c := (u*w) - (v*x);
      d := (u*x) + (v*w);
      e := ((a*c) + (b*d))/(sqr(a) + sqr(b));
      f := ((a*d) - (b*c))/(sqr(a) + sqr(b));
      a := ((w*e) + (x*f))/(sqr(w) + sqr(x));
      b := ((w*f) - (x*e))/(sqr(w) + sqr(x));
      Powrtest := 0.5*((a*e) + (b*f));
    end;   {Powrtest} function lengthgd(t,u,v,w,x,y,z:real): real;
    {t is the propagation constant, beta, u+jv is Zo, w+jx is Zi,}
    {and y+jz is Zl. lengthgd is returned in units of meters}
  var a,b,c,d,e,f: real;
      situaton: char;

begin
  if ((y = 0.0) and (z = 0.0) and ((w > 100000.0) or (x > 100000.0))) or
     ((w = 0.0) and (x = 0.0) and ((y > 100000.0) or (z > 100000.0)))
  then situaton := 'a'
  else begin
       if (w = y) and (x = z)
       then situaton := 'b'
       else situaton := 'c';
    end;

case situaton of

'a' : lengthgd := pi/(2.0*t);
    'b' : lengthgd := pi/t;
    'c' : begin
          a := (u*y) - (x*z);
          b := (u*z) + (x*y);
```

```
                c := sqr(u) - sqr(v);
                d := 2.0*u*v;
                a := c - a;
                b := d - b;
                c := w - y;
                d := x - z;
                e := (u*c) - (v*d);
                f := (u*d) + (v*c);
                c := ((a*e) + (b*f))/(sqr(a) + sqr(b));
                d := ((a*f) - (b*e))/(sqr(a) + sqr(b));
                a := (2.0*d)/(1 - sqr(c) - sqr(d));
                b := cprtchk/(sqr(c) + sqr(d));
                if a < 0
                then lengthgd := -(1.0/(2*t))*arctan(abs(a))
                else lengthgd := (1.0/(2*t))*arctan(a);
             end;    {c}
      end   {case}
      end;     {lengthgd} procedure initial;

var i: integer;
   begin
   for i := 1 to 10 do
   begin
      alpha[i] := 0.0;
      beta[i] := 0.0;
      loadzr[i] := 0.0;
      loadzi[i] := 0.0;
      charzr[i] := 0.0;
      charzi[i] := 0.0;
      l[i] := 0.0;
      inputzr[i] := 0.0;
      inputzia[i] := 0.0;
      VoltLdrl[i] := 0.0;
      VoltLdia[i] := 0.0;
      powr[i] := 0.0;
   end;  {for}
   for i := 1 to 11 do
   begin
      powerin[i] := 0.0;
   end;  {for}
   end;   {initial} procedure position(k:integer);

begin
   case k of
   0 : begin
       GoToXY(23,8);
       TextColor(red);
       write(char(174),'II');
       TextColor(yellow);
       GoToXY(5,24);
       typecalc := 'a';
       end;
```

```
    1 : begin
        GoToXY(22,10);
        TextColor(red);
        write(char(174),'LI');
        TextColor(yellow);
        GoToXY(5,24);
        typecalc := 'b';
        end;
    2 : begin
        GoToXY(19,12);
        TextColor(red);
        write(char(174),'LL');
        TextColor(yellow);
        GoToXY(5,24);
        typecalc := 'c';
        end;
    3 : begin
        GoToXY(18,14);
        TextColor(red);
        write(char(174),'LP');
        TextColor(yellow);
        GoToXY(5,24);
        typecalc := 'd';
        end;
    end;
end;    {position} procedure erasepos(k:integer);

begin
    case k of
    0 : begin
        GoToXY(23,8);
        write('      ');
        end;
    1 : begin
        GoToXY(22,10);
        write('      ');
        end;
    2 : begin
        GoToXY(19,12);
        write('      ');
        end;
    3 : begin
        GoToXY(18,14);
        write('      ');
        end;
        end;
    end;    {erasepos} procedure calcsalc;

var j: integer;
            Cha: char;
```

```
begin
  GoToXY(26,2);
  write(char(4));
  TextColor(red);
  write(' TRANSMISSION LINE ANALYZER ');
  TextColor(yellow);
  write(char(4));
  GoToXY(26,3);
  write(char(4));
  TextColor(red);
  write('              MENU            ');
  TextColor(yellow);
  write(char(4));
  for j := 26 to 55 do
  begin
  GoToXY(j,1);
  write(char(4));
  end;
  for j := 26 to 55 do
  begin
  GoToXY(j,4);
  write(char(4));
  end;
  GoToXY(5,6);
  write(char(174),char(175),' ENTER the TYPE of CALCULATOR ',char(174),char(175));
  GoToXY(5,8);
  write('Input Impedance::');
  GoToXY(5,10);
  write('Load Impedance::');
  GoToXY(5,12);
  write('Line Length::');
  GoToXY(5,14);
  write('Load Power::');
  GoToXY(5,23);
  write('Use ',char(24),' ',char(25),' arrow keys to select calculator type:');
  GoToXY(5,24);
  write('Hit "enter" to continue:');
  j := 0;
  position(j);
    Repeat
    read(Kbd,Cha);
    case ord(Cha) of
80 : begin
    if j <> 3 then
    begin
    erasepos(j);
    j := j + 1;
    position(j);
    end;
    end;
72 : begin
    if j <> 0 then
    begin
    erasepos(j);
    j := j - 1;
    position(j);
    end;
    end;
```

```
        end;
        until Cha = chr(13);
end;    {calcselc} procedure InputImp(t,u,v,w,x,y,z:real);
        {procedure InputImp calculates the input impedance of a section}
        {of transmission line plus load from the line propagation constant}
        {(t+ju), the load impedance (v+jw), the characteristic line imped-}
        {ance (x+jy), and the line length in meters (z).} var vr1,vi1,vr2,vi2,a,b,c,d,e,f: real;
   begin
   vr1 := Cosh(t*z)*cos(u*z);
   vi1 := Sinh(t*z)*sin(u*z);
   vr2 := Sinh(t*z)*cos(u*z);
   vi2 := Cosh(t*z)*sin(u*z);
     a := (v*vr1) - (w*vi1);
     b := (v*vi1) + (w*vr1);
     c := (x*vr2) - (y*vi2);
     d := (x*vi2) + (y*vr2);
     a := a + c;
     b := b + d;
     c := (v*vr2) - (w*vi2);
     d := (v*vi2) + (w*vr2);
     e := (x*vr1) - (y*vi1);
     f := (x*vi1) + (y*vr1);
     c := c + e;
     d := d + f;
     e := ((a*c) + (b*d))/(sqr(c) + sqr(d));
     f := ((b*c) - (a*d))/(sqr(c) + sqr(d));
   Zrl := (x*e) - (y*f);
   Zim := (x*f) + (y*e);
   end;    {InputImp} procedure LoadImp(t,u,v,w,x,y,z:real);
        {procedure LoadImp calculates the load impedance of a section of}
        {transmission line plus input impedance from the line propagation}
        {constant (t+ju), the input impedance (v+jw), the characteristic}
        {line impedance (x+jy), and the line length in meters (z).} var vr1,vi1,vr2,vi2,a,b,c,d,e,f: real;
   begin
   vr1 := Cosh(t*z)*cos(u*z);
   vi1 := Sinh(t*z)*sin(u*z);
   vr2 := Sinh(t*z)*cos(u*z);
   vi2 := Cosh(t*z)*sin(u*z);
     a := (v*vr1) - (w*vi1);
     b := (v*vi1) + (w*vr1);
     c := (x*vr2) - (y*vi2);
     d := (x*vi2) + (y*vr2);
     a := a - c;
     b := b - d;
     c := (x*vr1) - (y*vi1);
     d := (x*vi1) + (y*vr1);
```

```
    e := (v*vr2) - (w*vi2);
    f := (v*vi2) + (w*vr2);
    c := c - e;
    d := d - f;
    e := ((a*c) + (b*d))/(sqr(c) + sqr(d));
    f := ((b*c) - (a*d))/(sqr(c) + sqr(d));
  Zorl := (x*e) - (y*f);
  Zoim := (x*f) + (y*e);
   end;   {LoadImp} procedure IndataT1;

var i,j: integer;

begin for i := 33 to 48 do
    begin
      GoToXY(i,3);
      write(char(4));
    end;
    GoToXY(33,4);
    write(char(4));
    TextColor(red);
    write(' TRANSMISSION ');
    TextColor(yellow);
    write(char(4));
    GoToXY(33,5);
    write(char(4));
    TextColor(red);
    write('  LINE  DATA  ');
    TextColor(yellow);
    write(char(4));
    for i := 33 to 48 do
    begin
      GoToXY(i,6);
      write(char(4));
    end;
    GoToXY(6,9);
    write('Enter the number of sections:');
    lowvideo;
    InputInt(h,36,9);
    normvideo;
    GoToXY(45,9);
    TextColor(green);
    write('Section ');
    TextColor(yellow);
    i := 1;
    GoToXY(53,9);
    lowvideo;
    write(i);
    normvideo;
    GoToXY(6,11);
    write('Enter the propagation constant:');
    GoToXY(6,12);
    write(char(224),' = ');
```

```
lowvideo;
InputRel(alpha[i],10,12);
normvideo;
GoToXY(18,12);
write(char(225),' = ');
lowvideo;
InputRel(beta[i],22,12);
normvideo;
GoToXY(6,11);
write('                              ');
GoToXY(6,12);
write('                              ');
GoToXY(6,11);
write('::Propagation constant::');
GoToXY(8,12);
write(char(225),' = ');
GoToXY(12,12);
lowvideo;
write(alpha[i]:6:3);
normvideo;
write(' +j ');
lowvideo;
write(beta[i]:6:3);
normvideo;
GoToXY(40,11);
write('Enter the load impedance:');
GoToXY(40,12);
write('Zl = ');
lowvideo;
InputRel(loadzr[i],45,12);
normvideo;
GoToXY(45+strlngth,12);
write(' ',char(241),'j ');
lowvideo;
InputRel(loadzi[i],49+strlngth,12);
normvideo;
GoToXY(40,11);
write('                              ');
GoToXY(40,12);
write('                              ');
GoToXY(40,11);
write('::Load impedance::');
GoToXY(41,12);
write('Zl = ');
if loadzi[i] < 0.0
then begin
      lowvideo;
      write(loadzr[i]:6:3);
      normvideo;
      write(' -j ');
      lowvideo;
      write(abs(loadzi[i]):6:3);
      normvideo;
    end
else begin
      lowvideo;
      write(loadzr[i]:6:3);
```

```
              noravideo;
              write(' +j ');
              lowvideo;
              write(loadzi[i]:6:3);
              noravideo;
          end;
GoToXY(6,14);
write('Enter the line characteristic impedance:');
GoToXY(6,15);
write('Zo = ');
lowvideo;
InputRel(charzr[i],11,15);
noravideo;
GoToXY(11+strIngth,15);
write(' ',char(241),'j ');
lowvideo;
InputRel(charzi[i],15+strIngth,15);
noravideo;
GoToXY(6,14);
write('                              ');
GoToXY(6,15);
write('                              ');
GoToXY(6,14);
write('::Characteristic impedance::');
GoToXY(8,15);
write('Zo = ');
if charzi[i] < 0.0
then begin
        lowvideo;
        write(charzr[i]:6:3);
        noravideo;
        write(' -j ');
        lowvideo;
        write(abs(charzi[i]):6:3);
        noravideo;
     end
else begin
        lowvideo;
        write(charzr[i]:6:3);
        noravideo;
        write(' +j ');
        lowvideo;
        write(charzi[i]:6:3);
        noravideo;
     end;
GoToXY(40,14);
write('Enter the line length in centimeters:');
GoToXY(40,15);
write('l = ');
lowvideo;
InputRel(l[i],44,15);
noravideo;
GoToXY(40,14);
write('                              ');
GoToXY(40,15);
write('                              ');
GoToXY(40,14);
```

```
    write('::Line length (cm)::');
    GoToXY(42,15);
    write('l = ');
    lowvideo;
    write(l[i]:4:2);
    noravideo;
    l[i] := l[i]/100;
    GoToXY(6,17);
    TextColor(green);
    write('End section ');
    TextColor(yellow);
    lowvideo;
    write(i:1);
    noravideo;
    GoToXY(10,25);
    write(char(174),char(175),' Hit "c" to continue, "q" to quit ',char(174),char(175));
    GoToXY(13,25);
    repeat
    Ch := 'a';
    read(Kbd,Ch);
    until (Ch = 'c') or (Ch = 'q');
    if Ch = 'q'
    then Exit
    else i := i + 1;
    if i < h + 1
    then begin
       for j := 11 to 18 do
       begin
         GoToXY(5,j);
       write('
    end; {for}
    GoToXY(40,19);
    write('::Load impedance::');
    GoToXY(41,20);
    write('Zl = ');
    if loadzi[1] < 0.0
    then begin
          lowvideo;
          write(loadzr[1]:6:3);
          noravideo;
          write(' -j ');
          lowvideo;
          write(abs(loadzi[1]):6:3);
          noravideo;
        end
    else begin
          lowvideo;
          write(loadzr[1]:6:3);
          noravideo;
          write(' +j ');
          lowvideo;
          write(loadzi[1]:6:3);
          noravideo;
        end;
  end;    {if}
while i < h + 1 do
```

```
begin
  GoToXY(53,9);
  lowvideo;
  write(i);
  normvideo;
  GoToXY(6,11);
  write('Enter the propagation constant:');
  GoToXY(6,12);
  write(char(224),' = ');
  lowvideo;
  InputRel(alpha[i],10,12);
  normvideo;
  GoToXY(18,12);
  write(char(225),' = ');
  lowvideo;
  InputRel(beta[i],22,12);
  normvideo;
  GoToXY(6,11);
  write('                              ');
  GoToXY(6,12);
  write('                              ');
  GoToXY(6,11);
  write('::Propagation constant::');
  GoToXY(8,12);
  write(char(226),' = ');
  GoToXY(12,12);
  lowvideo;
  write(alpha[i]:6:3);
  normvideo;
  write(' +j ');
  lowvideo;
  write(beta[i]:6:3);
  normvideo;
  GoToXY(6,14);
  write('Enter the line characteristic impedance:');
  GoToXY(6,15);
  write('Zo = ');
  lowvideo;
  InputRel(charzr[i],11,15);
  normvideo;
  GoToXY(11+strlngth,15);
  write(' ',char(241),' j ');
  lowvideo;
  InputRel(charzi[i],15+strlngth,15);
  normvideo;
  GoToXY(6,14);
  write('                              ');
  GoToXY(6,15);
  write('                              ');
  GoToXY(6,14);
  write('::Characteristic impedance::');
  GoToXY(8,15);
  write('Zo = ');
  if charzi[i] < 0.0
  then begin
        lowvideo;
        write(charzr[i]:6:3);
```

```
              noravideo;
              write(' -j ');
              lowvideo;
              write(abs(charzi[i]):6:3);
              noravideo;
          end
      else begin
              lowvideo;
              write(charzr[i]:6:3);
              noravideo;
              write(' +j ');
              lowvideo;
              write(charzi[i]:6:3);
              noravideo;
          end;
   GoToXY(40,14);
   write('Enter the line length in centimeters:');
   GoToXY(40,15);
   write('l = ');
   lowvideo;
   InputRel(l[i],44,15);
   noravideo;
   GoToXY(40,14);
   write('                              ');
   GoToXY(40,15);
   write('                              ');
   GoToXY(40,14);
   write('::Line length (cm)::');
   GoToXY(42,15);
   write('l = ');
   lowvideo;
   write(l[i]:4:2);
   noravideo;
   l[i] := l[i]/100;
   GoToXY(6,17);
   TextColor(green);
   write('End section ');
   TextColor(yellow);
   lowvideo;
   write(i:1);
   noravideo;
   GoToXY(10,25);
   write(char(174),char(175),' Hit "c" to continue, "q" to quit ',char(174),char(175));
   GoToXY(13,25);
   repeat
   Ch := 'a';
   read(Kbd,Ch);
   until (Ch = 'c') or (Ch = 'q');
   if Ch = 'q'
   then i := h + 1
   else i := i + 1;
   if i < h + 1
   then begin
       for j := 11 to 19 do
       begin
          GoToXY(5,j);
```

```
            write('                                                            ');
          end;  {for}
        end;  {if}
     end;  {while}
end;  {IndataT1} procedure IndataT2;

var i,j: integer;

begin for i := 33 to 48 do
    begin
      GoToXY(i,3);
      write(char(4));
    end;
    GoToXY(33,4);
    write(char(4));
    TextColor(red);
    write(' TRANSMISSION ');
    TextColor(yellow);
    write(char(4));
    GoToXY(33,5);
    write(char(4));
    TextColor(red);
    write(' LINE  DATA ');
    TextColor(yellow);
    write(char(4));
    for i := 33 to 48 do
    begin
      GoToXY(i,6);
      write(char(4));
    end;
    GoToXY(6,9);
    write('Enter the number of sections:');
    lowvideo;
    InputInt(h,36,9);
    noravideo;
    GoToXY(45,9);
    TextColor(green);
    write('Section ');
    TextColor(yellow);
    i := 1;
      GoToXY(53,9);
      lowvideo;
      write(i);
      noravideo;
      GoToXY(6,11);
      write('Enter the propagation constant:');
      GoToXY(6,12);
      write(char(224),' = ');
      lowvideo;
      InputRel(alpha[i],10,12);
      noravideo;
```

```
GoToXY(18,12);
write(char(225),' = ');
lowvideo;
InputRel(beta[i],22,12);
normvideo;
GoToXY(6,11);
write('                              ');
GoToXY(6,12);
write('                              ');
GoToXY(6,11);
write('::Propagation constant::');
GoToXY(8,12);
write(char(226),' = ');
GoToXY(12,12);
lowvideo;
write(alpha[i]:6:3);
normvideo;
write(' +j ');
lowvideo;
write(beta[i]:6:3);
normvideo;
GoToXY(40,11);
write('Enter the input impedance:');
GoToXY(40,12);
write('Zi = ');
lowvideo;
InputRel(inputzrl[i],45,12);
normvideo;
GoToXY(45+strlngth,12);
write(' ',char(241),'j ');
lowvideo;
InputRel(inputzia[i],49+strlngth,12);
normvideo;
GoToXY(40,11);
write('                              ');
GoToXY(40,12);
write('                              ');
GoToXY(40,11);
write('::Input impedance::');
GoToXY(41,12);
write('Zi = ');
if inputzia[i] < 0.0
then begin
      lowvideo;
      write(inputzrl[i]:6:3);
      normvideo;
      write(' -j ');
      lowvideo;
      write(abs(inputzia[i]):6:3);
      normvideo;
    end
else begin
      lowvideo;
      write(inputzrl[i]:6:3);
      normvideo;
      write(' +j ');
      lowvideo;
```

```
            write(inputzim[i]:6:3);
         norsvideo;
      end;
GoToXY(6,14);
write('Enter the line characteristic impedance:');
GoToXY(6,15);
write('Zo = ');
lowvideo;
InputRel(charzr[i],11,15);
norsvideo;
GoToXY(11+strlngth,15);
write(' ',char(241),'j ');
lowvideo;
InputRel(charzi[i],15+strlngth,15);
norsvideo;
GoToXY(6,14);
write('                              ');
GoToXY(6,15);
write('                              ');
GoToXY(6,14);
write('::Characteristic impedance::');
GoToXY(8,15);
write('Zo = ');
if charzi[i] < 0.0
then begin
      lowvideo;
      write(charzr[i]:6:3);
      norsvideo;
      write(' -j ');
      lowvideo;
      write(abs(charzi[i]):6:3);
      norsvideo;
    end
else begin
      lowvideo;
      write(charzr[i]:6:3);
      norsvideo;
      write(' +j ');
      lowvideo;
      write(charzi[i]:6:3);
      norsvideo;
    end;
GoToXY(40,14);
write('Enter the line length in centimeters:');
GoToXY(40,15);
write('l = ');
lowvideo;
InputRel(l[i],44,15);
norsvideo;
GoToXY(40,14);
write('                              ');
GoToXY(40,15);
write('                              ');
GoToXY(40,14);
write('::Line length (cm)::');
GoToXY(42,15);
write('l = ');
```

```
lowvideo;
write(l[i]:4:2);
noravideo;
l[i] := l[i]/100;
GoToXY(6,17);
TextColor(green);
write('End section ');
TextColor(yellow);
lowvideo;
write(i:1);
noravideo;
GoToXY(10,25);
write(char(174),char(175),' Hit "c" to continue, "q" to quit ',char(174),char(175));
GoToXY(13,25);
repeat
Ch := 'a';
read(Kbd,Ch);
until (Ch = 'c') or (Ch = 'q');
if Ch = 'q'
then Exit
else i := i + 1;
if i < h + 1
then begin
    for j := 11 to 18 do
    begin
      GoToXY(5,j);
      write('
    end; {for}
    GoToXY(40,19);
    write('::Input impedance::');
    GoToXY(41,20);
    write('Zi = ');
    if inputzim[1] < 0.0
    then begin
         lowvideo;
         write(inputzrl[1]:6:3);
         noravideo;
         write(' -j ');
         lowvideo;
         write(abs(inputzim[1]):6:3);
         noravideo;
       end
    else begin
         lowvideo;
         write(inputzrl[1]:6:3);
         noravideo;
         write(' +j ');
         lowvideo;
         write(inputzim[1]:6:3);
         noravideo;
       end;
end; {if}
while i < h + 1 do
begin
  GoToXY(53,9);
  lowvideo;
  write(i);
```

```
noravideo;
GoToXY(6,11);
write('Enter the propagation constant:');
GoToXY(6,12);
write(char(224),' = ');
lowvideo;
InputRel(alpha[i],10,12);
noravideo;
GoToXY(18,12);
write(char(225),' = ');
GoToXY(22,12);
lowvideo;
InputRel(beta[i],22,12);
noravideo;
GoToXY(6,11);
write('                              ');
GoToXY(6,12);
write('                              ');
GoToXY(6,11);
write('::Propagation constant::');
GoToXY(8,12);
write(char(226),' = ');
GoToXY(12,12);
lowvideo;
write(alpha[i]:6:3);
noravideo;
write(' +j ');
lowvideo;
write(beta[i]:6:3);
noravideo;
GoToXY(6,14);
write('Enter the line characteristic impedance:');
GoToXY(6,15);
write('Zo = ');
lowvideo;
InputRel(charzr[i],11,15);
noravideo;
GoToXY(11+strlngth,15);
write(' ',char(241),'j ');
lowvideo;
InputRel(charzi[i],15+strlngth,15);
noravideo;
GoToXY(6,14);
write('                              ');
GoToXY(6,15);
write('                              ');
GoToXY(6,14);
write('::Characteristic impedance::');
GoToXY(8,15);
write('Zo = ');
if charzi[i] < 0.0
then begin
     lowvideo;
     write(charzr[i]:6:3);
     noravideo;
     write(' -j ');
     lowvideo;
```

```
            write(abs(charzi[i]):6:3);
            noravideo;
         end
    else begin
            lowvideo;
            write(charzr[i]:6:3);
            noravideo;
            write(' +j ');
            lowvideo;
            write(charzi[i]:6:3);
            noravideo;
         end;
GoToXY(40,14);
write('Enter the line length in centimeters:');
GoToXY(40,15);
write('l = ');
lowvideo;
InputRel(l[i],44,15);
noravideo;
GoToXY(40,14);
write('                                    ');
GoToXY(40,15);
write('                                    ');
GoToXY(40,14);
write('::Line length (cm)::');
GoToXY(42,15);
write('l = ');
lowvideo;
write(l[i]:4:2);
noravideo;
l[i] := l[i]/100;
GoToXY(6,17);
TextColor(green);
write('End section ');
TextColor(yellow);
lowvideo;
write(i:1);
noravideo;
GoToXY(10,25);
write(char(174),char(175),' Hit "c" to continue, "q" to quit ',char(174),char(175));
GoToXY(13,25);
repeat
Ch := 'a';
read(Kbd,Ch);
until (Ch = 'c') or (Ch = 'q');
if Ch = 'q'
then i := h + 1
else i := i + 1;
if i < h + 1
then begin
   for j := 11 to 18 do
   begin
     GoToXY(5,j);
     write('                                                      ');
   end; {for}
end;   {if}
```

```
      end;  {while}
end;    {IndataT2} procedure IndataT3;

var i,j: integer;

begin
  for i := 31 to 47 do
  begin
    GoToXY(i,2);
    write(char(4));
  end;
  GoToXY(31,3);
  write(char(4));
  TextColor(red);
  write('    POWER    ');
  TextColor(yellow);
  write(char(4));
  GoToXY(31,4);
  write(char(4));
  TextColor(red);
  write(' DISTRIBUTIONS ');
  TextColor(yellow);
  write(char(4));
  for i := 31 to 47 do
  begin
    GoToXY(i,5);
    write(char(4));
  end;
  GoToXY(6,7);
  write('Enter the generator voltage:');
  InputR12(Vgenrl,35,7);
  TextColor(yellow);
  GoToXY(35+strlngth,7);
  write(' ',char(241),'j ');
  InputR12(Vgenia,39+strlngth,7);
  TextColor(yellow);
  GoToXY(6,8);
  write('Enter the generator impedance:');
  InputR12(Zgenrl,37,8);
  TextColor(yellow);
  GoToXY(37+strlngth,8);
  write(' ',char(241),'j ');
  InputR12(Zgenia,41+strlngth,8);
  TextColor(yellow);
  GoToXY(6,7);
  write('                                                                ');
  GoToXY(6,8);
  write('                                                                ');
  GoToXY(6,7);
  write('Vg = ');
  TextColor(green);
  write(Vgenrl:6:2);
  TextColor(yellow);
```

```
if Vgenia < 0.0
then begin
    write(' -j ');
    TextColor(green);
    write(abs(Vgenia):6:3);
    TextColor(yellow);
    end
else begin
    TextColor(yellow);
    write(' +j ');
    TextColor(green);
    write(Vgenia:6:3);
    TextColor(yellow);
    end;
GoToXY(31,7);
write('Zg = ');
if Zgenia < 0.0
then begin
    TextColor(green);
    write(Zgenrl:6:3);
    TextColor(yellow);
    write(' -j ');
    TextColor(green);
    write(abs(Zgenia):6:3);
    TextColor(yellow);
    end
else begin
    TextColor(green);
    write(Zgenrl:6:3);
    TextColor(yellow);
    write(' +j ');
    TextColor(green);
    write(Zgenia:6:3);
    TextColor(yellow);
    end;
GoToXY(56,7);
write('Vin = ');
GoToXY(31,8);
write('Pg = ');
GoToXY(47,8);
TextColor(magenta);
write('all powers in watts');
TextColor(yellow);
 if h < 6
 then begin
    GoToXY(36,10);
    write('INPUT      INPUT');
    GoToXY(25,11);
    write('Sec:    VOLTAGE     POWER');
    end
 else begin
    GoToXY(16,10);
    write('INPUT       INPUT');
    GoToXY(5,11);
    write('Sec:    VOLTAGE     POWER');
    GoToXY(58,10);
    write('INPUT       INPUT');
```

```
            GoToXY(47,11);
            write('Sec:      VOLTAGE        POWER');
            end;
     if h < 6
     then begin
            GoToXY(26,19);
            write('Sec:   Absorbed POWER     %');
            end
     else begin
            GoToXY(12,19);
            write('Sec:   Absorbed POWER     %');
            GoToXY(46,19);
            write('Sec:   Absorbed POWER     %');
            end;
     GoToXY(10,25);
     write(char(174),char(175),' Hit "c" to continue ',char(174),char(175));
     GoToXY(13,25);
end;    {IndataT3} procedure IndataT4;

var i,j: integer;

begin for i := 33 to 48 do
    begin
      GoToXY(i,3);
      write(char(4));
    end;
    GoToXY(33,4);
    write(char(4));
    TextColor(red);
    write(' TRANSMISSION ');
    TextColor(yellow);
    write(char(4));
    GoToXY(33,5);
    write(char(4));
    TextColor(red);
    write(' LINE DATA ');
    TextColor(yellow);
    write(char(4));
    for i := 33 to 48 do
    begin
      GoToXY(i,6);
      write(char(4));
    end;
    GoToXY(6,11);
    write('Enter the propagation constant:');
    GoToXY(6,12);
    write(char(224),' = ');
    lowvideo;
    InputRel(alpha[1],10,12);
    normvideo;
    GoToXY(18,12);
```

```
write(char(225),' = ');
lowvideo;
InputRel(beta[1],22,12);
normvideo;
GoToXY(6,11);
write('                                   ');
GoToXY(6,12);
write('                                   ');
GoToXY(6,11);
write('::Propagation constant::');
GoToXY(8,12);
write(char(226),' = ');
GoToXY(12,12);
lowvideo;
write(alpha[1]:6:3);
normvideo;
write(' +j ');
lowvideo;
write(beta[1]:6:3);
normvideo;
GoToXY(40,11);
write('Enter the load impedance:');
GoToXY(40,12);
write('Zl = ');
lowvideo;
InputRel(loadzr[1],45,12);
normvideo;
GoToXY(45+strlngth,12);
write(' ',char(241),' j ');
lowvideo;
InputRel(loadzi[1],49+strlngth,12);
normvideo;
GoToXY(40,11);
write('                                   ');
GoToXY(40,12);
write('                                   ');
GoToXY(40,11);
write('::Load impedance::');
GoToXY(41,12);
write('Zl = ');
if loadzi[1] < 0.0
then begin
      lowvideo;
      write(loadzr[1]:6:3);
      normvideo;
      write(' -j ');
      lowvideo;
      write(abs(loadzi[1]):6:3);
      normvideo;
    end
else begin
      lowvideo;
      write(loadzr[1]:6:3);
      normvideo;
      write(' +j ');
      lowvideo;
      write(loadzi[1]:6:3);
      normvideo;
```

```
      end;
GoToXY(6,14);
write('Enter the line characteristic impedance:');
GoToXY(6,15);
write('Zo = ');
lowvideo;
InputRel(charzr[1],11,15);
normvideo;
GoToXY(11+strlngth,15);
write(' ',char(241),'j ');
lowvideo;
InputRel(charzi[1],15+strlngth,15);
normvideo;
GoToXY(6,14);
write('                                        ');
GoToXY(6,15);
write('                                        ');
GoToXY(6,14);
write('::Characteristic impedance::');
GoToXY(8,15);
write('Zo = ');
if charzi[1] < 0.0
then begin
      lowvideo;
      write(charzr[1]:6:3);
      normvideo;
      write(' -j ');
      lowvideo;
      write(abs(charzi[1]):6:3);
      normvideo;
     end
else begin
      lowvideo;
      write(charzr[1]:6:3);
      normvideo;
      write(' +j ');
      lowvideo;
      write(charzi[1]:6:3);
      normvideo;
     end;
GoToXY(40,14);
write('Enter the input impedance:');
GoToXY(40,15);
write('Zi = ');
lowvideo;
InputRel(inputzrl[1],45,15);
normvideo;
GoToXY(45+strlngth,15);
write(' ',char(241),'j ');
lowvideo;
InputRel(inputzia[1],49+strlngth,15);
normvideo;
GoToXY(40,14);
write('                        ');
GoToXY(40,15);
write('                        ');
GoToXY(40,14);
```

```
        write('::Input impedance::');
        GoToXY(41,15);
        write('Zi = ');
        if inputzi[1] < 0.0
        then begin
              lowvideo;
              write(inputzrl[1]:6:3);
              normvideo;
              write(' -j ');
              lowvideo;
              write(abs(inputzi[1]):6:3);
              normvideo;
            end
        else begin
              lowvideo;
              write(inputzrl[1]:6:3);
              normvideo;
              write(' +j ');
              lowvideo;
              write(inputzi[1]:6:3);
              normvideo;
            end;
        if (charzr[1] = loadzr[1]) and (charzi[1] = loadzi[1]) and
           ((charzr[1] <> inputzrl[1]) or (charzi[1] <> inputzi[1]))
        then begin
              GoToXY(6,20);
              TextColor(red);
              write('Error in impedance entry. Case cannot exist.');
              TextColor(yellow);
              GoToXY(10,25);
              write(char(174),char(175),' Hit "q" to quit ',char(174),char(175));
              GoToXY(13,25);
              repeat
              Ch := 'a';
              read(Kbd,Ch);
              until Ch = 'q';
              Ch := 'S';
            end
        else begin
        GoToXY(10,25);
        write(char(174),char(175),' Hit "c" to continue, "q" to quit ',char(174),char(175));
        GoToXY(13,25);
        repeat
        Ch := 'a';
        read(Kbd,Ch);
        until (Ch = 'c') or (Ch = 'q');
        if Ch = 'q'
        then Ch := 'S';
        end;   {if}
end;    {IndataT4} procedure Indatsel;

begin
  case typecalc of
```

```
    'a' : begin
          IndataT1;
          end;
    'b' : begin
          IndataT2;
          end;
    'c' : begin
          IndataT4;
          end;
    end;
end;    {Indatsel} procedure OutputT3;

var i,k: integer;

begin
      TextColor(green);
      GoToXY(61,7);
      write(Vinr1:6:2);
      TextColor(yellow);
      if Vinim < 0.0
      then begin
            write(' -j ');
            TextColor(green);
            write(abs(Vinim):6:2);
            TextColor(yellow);
            end
      else begin
            write(' +j ');
            TextColor(green);
            write(Vinim:6:2);
            TextColor(yellow);
            end;
      GoToXY(36,8);
      TextColor(green);
      write(Pgen:6:2);
      TextColor(yellow);
      GoToXY(25,12);
      write('load');
      GoToXY(31,12);
      write(VoltLdr1[1]:6:2);
      if VoltLdim[1] < 0.0
      then begin
            write(' -j ');
            write(abs(VoltLdim[1]):6:2);
            end
      else begin
            write(' +j ');
            write(VoltLdim[1]:6:2);
            end;
      GoToXY(50,12);
      write(powerin[1]:6:2);
      if h < 6
      then begin
            lowvideo;
```

```
        for i := 1 to h do
        begin
        GoToXY(27,i+12);
        write(i);
        GoToXY(31,i+12);
        write(VoltLdrl[i+1]:6:2);
        if VoltLdia[i+1] < 0.0
        then begin
             write(' -j ');
             write(abs(VoltLdia[i+1]):6:2);
             end
        else begin
             write(' +j ');
             write(VoltLdia[i+1]:6:2);
             end;
        GoToXY(50,i+12);
        write(powerin[i+1]:6:2);
        end;
end
else begin
    for i := 1 to 5 do
    begin
    GoToXY(7,i+12);
    write(i);
    GoToXY(11,i+12);
    write(VoltLdrl[i+1]:6:2);
    if VoltLdia[i+1] < 0.0
    then begin
         write(' -j ');
         write(abs(VoltLdia[i+1]):6:2);
         end
    else begin
         write(' +j ');
         write(VoltLdia[i+1]:6:2);
         end;
    GoToXY(30,i+12);
    write(powerin[i+1]:6:2);
    end;
    for i := 6 to h do
    begin
    GoToXY(49,i+12);
    write(i);
    GoToXY(53,i+12);
    write(VoltLdrl[i+1]:6:2);
    if VoltLdia[i+1] < 0.0
    then begin
         write(' -j ');
         write(abs(VoltLdia[i+1]):6:2);
         end
    else begin
         write(' +j ');
         write(VoltLdia[i+1]:6:2);
         end;
    GoToXY(72,i+12);
    write(powerin[i+1]:6:2);
    end;
```

```
        end;
        if h < 5
        then begin
            lowvideo;
            for i := 1 to h do
            begin
            GoToXY(28,i+19);
            write(i);
            GoToXY(37,i+19);
            write(powr[i]:6:2);
            GoToXY(50,i+19);
            if typecalc = 'a'
            then k := h + 1
            else k := 1;
            write((powr[i]*100.0/powerin[k]):4:1);
            end;
        end
        else begin
            for i := 1 to 4 do
            begin
            GoToXY(31,i+19);
            write(i);
            end;
            for i := 5 to 8 do
            begin
            GoToXY(31,i+18);
            write(i);
            end;
        end;
end;    {OutputT3} procedure Inptcalc;
        {Procedure Inptcalc calculates all the values of the input impedances}
        {for both single and composite transmission line sections.} var i: integer;

begin
    for i := 1 to h do
    begin
      InputImp(alpha[i],beta[i],loadzr[i],loadzi[i],charzr[i],charzi[i],l[i]);
      inputzr1[i] := Zrl;
      inputzim[i] := Zim;
      if i < h then
      begin
        loadzr[i+1] := Zrl;
        loadzi[i+1] := Zim;
      end;    {if}
    end; {for}
end;    {Inptcalc} procedure Loadcalc;
        {Procedure Loadcalc calculates all the values of the load impedances}
        {for both single and composite transmission line sections.}
```

```
    var i: integer;

begin
  for i := 1 to h do
  begin
    LoadImp(alpha[i],beta[i],inputzrl[i],inputzim[i],charzr[i],charzi[i],l[i]);
    loadzr[i] := Zorl;
    loadzi[i] := Zoim;
    if i < h then
    begin
      inputzrl[i+1] := Zorl;
      inputzim[i+1] := Zoim;
    end;  {if}
  end;  {for}
end;  {Loadcalc} procedure PowrCalc;
      {procedure PowrCalc calculates the input and load powers of a section}
      {of transmission line plus load impedances.}
  var MultV1Rl,MultV1Im,MultV2Rl,MultV2Im,MultV3Rl,MultV3Im,MultV4Rl,
      MultV4Im,VoltDivR,VoltDivI,CurntDvR,CurntDvI,inVoltRl,inVoltIm,
      inCrntRl,inCrntIm,ldVoltRl,ldVoltIm,ldCrntRl,ldCrntIm,currentR,
      currentI,GamaGenR,GamaGenI,GamaR,GamaI: real;
      i: integer;

procedure MultV1(t,u,v,w,x,y,z:real);
        {t = length, u+jv = alpha + j beta, w+jx = GamaR + j GamaI}
        {y+jz = GamaGenR + j GamaGenI}
    var a,b,c,d: real;
    begin
        a := cos(v*t)*exp(-2*u*t);
        b := -sin(v*t)*exp(-2*u*t);
        c := (a*w) - (b*x);
        d := (a*x) + (b*w);
        a := c + 1;
        b := d;
        c := 1 - (a*y) + (b*z);
        d := -((a*z) + (b*y));
      MultV1Rl := ((a*c) + (b*d))/(sqr(c) + sqr(d));
      MultV1Im := ((b*c) - (a*d))/(sqr(c) + sqr(d));
    end;  {MultV1} procedure MultV2(t,u,v,w,x,y,z:real);
        {t = length, u+jv = alpha + j beta, w+jx = GamaR + j GamaI}
        {y+jz = GamaGenR + j GamaGenI}
    var a,b,c,d: real;
    begin
        a := cos(v*t)*exp(-2*u*t);
        b := -sin(v*t)*exp(-2*u*t);
        c := (a*w) - (b*x);
        d := (a*x) + (b*w);
        a := 1 - c;
        b := -d;
        c := 1 + (a*y) - (b*z);
        d := (a*z) + (b*y);
```

```
    MultV2RI := ((a*c) + (b*d))/(sqr(c) + sqr(d));
    MultV2Ia := ((b*c) - (a*d))/(sqr(c) + sqr(d));
  end;   {MultV2} procedure MultV3(v,w,x,y,z:real);
      {v = length, w+jx = alpha + j beta}
      {y+jz = MultV1RI + j MultV1Ia}
  var a,b: real;
  begin
     a := cos(x*v)*exp(-w*v);
     b := -sin(x*v)*exp(-w*v);
    MultV3RI := (a*y) - (b*z);
    MultV3Ia := (a*z) + (b*y);
  end;   {MultV3} procedure MultV4(v,w,x,y,z:real);
      {v = length, w+jx = alpha + j beta}
      {y+jz = MultV2RI + j MoltV2Ia}
  var a,b: real;
  begin
     a := cos(x*v)*exp(-w*v);
     b := -sin(x*v)*exp(-w*v);
    MultV4RI := (a*y) - (b*z);
    MultV4Ia := (a*z) + (b*y);
  end;   {MultV4} procedure VoltDiv(u,v,w,x,y,z:real);
      {u+jv = Vgenrl + j Vgenia, w+jx = Zorl +j Zoia}
      {y+jz = Zgenrl +j Zgenia}
  var a,b,c,d: real;
  begin
    a := w + y;
    b := x + z;
    c := (u*w) - (v*x);
    d := (u*x) + (v*w);
    VoltDivR := ((a*c) + (b*d))/(sqr(a) + sqr(b));
    VoltDivI := ((a*d) - (b*c))/(sqr(a) + sqr(b));
  end;   {VoltDiv} procedure CurntDiv(u,v,w,x,y,z:real);
      {u+jv = VgenRl + j VgenIa, w+jx = Zorl +j Zoia}
      {y+jz = ZgenRl +j ZgenIa}
  var a,b,c,d: real;
  begin
    a := w + y;
    b := x + z;
    CurntDvR := ((a*u) + (b*v))/(sqr(a) + sqr(b));
    CurntDvI := ((a*v) - (b*u))/(sqr(a) + sqr(b));
  end;   {CurntDiv} procedure AllGama(u,v,w,x,y,z:real);
      {Zo = w+jx, Zgen = y+jz, ZI = u+jv}
```

```
      var a,b,c,d: real;
      begin
        a := y - w;
        b := z - x;
        c := y + w;
        d := z + x;
        GamaGenR := ((a*c) + (b*d))/(sqr(c) + sqr(d));
        GamaGenI := ((b*c) - (a*d))/(sqr(c) + sqr(d));
        a := u - w;
        b := v - x;
        c := u + w;
        d := v + x;
        GamaR := ((a*c) + (b*d))/(sqr(c) + sqr(d));
        GamaI := ((b*c) - (a*d))/(sqr(c) + sqr(d));
      end;   {AllGama} procedure Current(r,s,t,u,v,w,x,y,z:real);
        {r = 1, s+jt = alpha + j beta, u+jv = ZIR + j ZII}
        {w+jx = Zorl +j Zoim, y+jz = ViRl +j ViIm}
      var a,b,c,d,e,f: real;
      begin
        a := (exp(s*r) + exp(-s*r))*cos(t*r);
        b := (exp(s*r) - exp(-s*r))*sin(t*r);
        c := (exp(s*r) - exp(-s*r))*cos(t*r);
        d := (exp(s*r) + exp(-s*r))*sin(t*r);
        e := (a*u) - (b*v);
        f := (a*v) + (b*u);
        a := (c*w) - (d*x);
        b := (c*x) + (d*w);
        a := a + e;
        b := b + f;
        CurrentR := ((a*y) + (b*z))/(sqr(a) + sqr(b));
        CurrentI := ((a*z) - (b*y))/(sqr(a) + sqr(b));
      end;   {Current} begin
IndataT3;

if typecalc = 'a' then begin
AllGama(loadzr[h],loadzi[h],charzr[h],charzi[h],Zgenrl,Zgenim);
MultV1(I[h],alpha[h],beta[h],GamaR,GamaI,GamaGenr,GamaGenI);
MultV2(I[h],alpha[h],beta[h],GamaR,GamaI,GamaGenr,GamaGenI);
MultV3(I[h],alpha[h],beta[h],MultV1R1,MultV1Im);
MultV4(I[h],alpha[h],beta[h],MultV2R1,MultV2Im);
VoltDiv(Vgenrl,Vgenim,charzr[h],charzi[h],Zgenrl,Zgenim);
CurntDiv(Vgenrl,Vgenim,charzr[h],charzi[h],Zgenrl,Zgenim);

inVoltRl := (VoltDivR*MultV1R1) - (VoltDivI*MultV1Im);
inVoltIm := (VoltDivR*MultV1Im) + (VoltDivI*MultV1R1);
inCrntRl := (CurntDvR*MultV2R1) - (CurntDvI*MultV2Im);
inCrntIm := (CurntDvR*MultV2Im) + (CurntDvI*MultV2R1);

Vinrl := inVoltRl;
Vinim := inVoltIm;
```

```
ldVoltRl := (VoltDivR*MultV3Rl) - (VoltDivI*MultV3Im);
ldVoltIm := (VoltDivR*MultV3Im) + (VoltDivI*MultV3Rl);
ldCrntRl := (CurntDvR*MultV4Rl) - (CurntDvI*MultV4Im);
ldCrntIm := (CurntDvR*MultV4Im) + (CurntDvI*MultV4Rl);

Pgen := PowerGen(Vgenrl,Vgenim,inputzrl[h],inputzim[h],Zgenrl,Zgenim);

powerin[h+1] := Powers(inVoltRl,inVoltIm,inCrntRl,inCrntIm);
powerin[h]   := Powers(ldVoltRl,ldVoltIm,ldCrntRl,ldCrntIm);

for i := h-1 downto 1 do
begin
  current(l[i],alpha[i],beta[i],loadzr[i],loadzi[i],
  charzr[i],charzi[i],ldVoltRl,ldVoltIm);
  ldVoltRl := (currentR*loadzr[i]) - (currentI*loadzi[i]);
  ldVoltIm := (currentR*loadzi[i]) + (currentI*loadzr[i]);
powerin[i] := Powers(ldVoltRl,ldVoltIm,currentR,currentI);
end;  {for} for i := h downto 1 do
begin
  powr[i] := powerin[i+1] - powerin[i];
end;  {for}
end;  {if} if typecalc = 'b' then
begin
AllGama(loadzr[1],loadzi[1],charzr[1],charzi[1],Zgenrl,Zgenim);
MultV1(l[1],alpha[1],beta[1],GamaR,GamaI,GamaGenr,GamaGenI);
MultV2(l[1],alpha[1],beta[1],GamaR,GamaI,GamaGenr,GamaGenI);
MultV3(l[1],alpha[1],beta[1],MultV1Rl,MultV1Im);
MultV4(l[1],alpha[1],beta[1],MultV2Rl,MultV2Im);
VoltDiv(Vgenrl,Vgenim,charzr[1],charzi[1],Zgenrl,Zgenim);
CurntDiv(Vgenrl,Vgenim,charzr[1],charzi[1],Zgenrl,Zgenim);

inVoltRl := (VoltDivR*MultV1Rl) - (VoltDivI*MultV1Im);
inVoltIm := (VoltDivR*MultV1Im) + (VoltDivI*MultV1Rl);
inCrntRl := (CurntDvR*MultV2Rl) - (CurntDvI*MultV2Im);
inCrntIm := (CurntDvR*MultV2Im) + (CurntDvI*MultV2Rl);

Vinrl := inVoltRl;
Vinim := inVoltIm;

ldVoltRl := (VoltDivR*MultV3Rl) - (VoltDivI*MultV3Im);
ldVoltIm := (VoltDivR*MultV3Im) + (VoltDivI*MultV3Rl);
ldCrntRl := (CurntDvR*MultV4Rl) - (CurntDvI*MultV4Im);
ldCrntIm := (CurntDvR*MultV4Im) + (CurntDvI*MultV4Rl);

Pgen := PowerGen(Vgenrl,Vgenim,inputzrl[1],inputzim[1],Zgenrl,Zgenim);

powerin[1] := Powers(inVoltRl,inVoltIm,inCrntRl,inCrntIm);
powerin[2] := Powers(ldVoltRl,ldVoltIm,ldCrntRl,ldCrntIm);

for i := 2 to h do
begin
  current(l[i],alpha[i],beta[i],loadzr[i],loadzi[i],
```

```
     charzr[i],charzi[i],ldVoltRl,ldVoltIm);
     ldVoltRl := (currentR*loadzr[i]) - (currentI*loadzi[i]);
     ldVoltIm := (currentR*loadzi[i]) + (currentI*loadzr[i]);
  powerin[i] := Powers(ldVoltRl,ldVoltIm,currentR,currentI);
  end;  {for} for i := 1 to h do
  begin
    powr[i] := powerin[i+1] - powerin[i];
  end;  {for}
  end;  {if}

OutputT3;
  end;

procedure lengcalc;

var situaton: char;

begin
    l[1] := lengthgd(beta[1],charzr[1],charzi[1],inputzrl[1],inputzim[1],
                    loadzr[1],loadzi[1]);
    GoToXY(6,17);
    TextColor(red + blink);
    write(char(174),char(175));
    TextColor(red);
    write(' Line length = ');
    TextColor(yellow);
    lowvideo;
    if alpha[1] = 0.0
    then begin
         if (((inputzrl[1] > 100000.0) or (inputzim[1] > 100000.0))
             and (loadzr[1] = 0.0) and (loadzi[1] = 0.0)) or
             (((inputzrl[1] = 0.0) and (inputzim[1] = 0.0))
             and (loadzr[1] > 100000.0) or (loadzi[1] > 100000.0))
         then situaton := 'a'
         else begin
         if (loadzr[1] = inputzrl[1]) and (loadzi[1] = inputzim[1])
         then situaton := 'b'
         else situaton := 'c';
         end;

case situaton of

'a' : begin
          write((100.0*l[1]):6:2,'*k');
          TextColor(red);
          write(' ca    k = 1,3,5,7,...');
          end;
    'b' : begin
          write((100.0*l[1]):6:2,'*k');
          TextColor(red);
          write(' ca    k = 0,1,2,3,...');
          end;
```

```pascal
    'c' : begin
        write((100.0*l[1]):6:2,'*k');
        TextColor(red);
        write(' + ');
        lowvideo;
        write(100*pi/beta[1]:6:2);
        TextColor(red);
        write('*k cm    k = 0,1,2,3,...');
        end;
    end;
end
else begin
      write((100.0*l[1]):6:2);
      TextColor(red);
      write(' cm ');
    end;
  end;
TextColor(red + blink);
write(char(174),char(175));
normvideo;
GoToXY(10,25);
ClrEol;
GoToXY(10,25);
write(char(174),char(175),' Hit "c" to continue ',char(174),char(175));
GoToXY(13,25);
Ch := 'a';
repeat
read(Kbd,Ch);
until Ch = 'c';
end;    {lengcalc} procedure PowrValu;

var i: integer;
      LoadPowr: real;

begin for i := 31 to 47 do
    begin
      GoToXY(i,2);
      write(char(4));
    end;
    GoToXY(31,3);
    write(char(4));
    TextColor(red);
    write('      POWER      ');
    TextColor(yellow);
    write(char(4));
    GoToXY(31,4);
    write(char(4));
    TextColor(red);
    write(' CALCULATIONS ');
    TextColor(yellow);
    write(char(4));
    for i := 31 to 47 do
```

```
begin
  GoToXY(i,5);
  write(char(4));
end;
GoToXY(6,7);
write('Enter the generator voltage:');
InputR12(Vgenrl,35,7);
TextColor(yellow);
GoToXY(35+stringth,7);
write(' ',char(241),'j ');
InputR12(Vgenim,39+stringth,7);
TextColor(yellow);
GoToXY(6,9);
write('Enter the generator impedance:');
InputR12(Zgenrl,37,9);
TextColor(yellow);
GoToXY(37+stringth,9);
write(' ',char(241),'j ');
InputR12(Zgenim,41+stringth,9);
TextColor(yellow);
GoToXY(6,11);
write('Enter the load impedance:');
InputR12(Zorl,32,11);
TextColor(yellow);
GoToXY(32+stringth,11);
write(' ',char(241),'j ');
InputR12(Zoim,36+stringth,11);
TextColor(yellow);
GoToXY(6,7);
ClrEol;
GoToXY(6,9);
ClrEol;
GoToXY(6,11);
ClrEol;
GoToXY(6,7);
write('Vg = ');
TextColor(green);
write(Vgenrl:6:2);
TextColor(yellow);
if Vgenim < 0.0
then begin
     write(' -j ');
     TextColor(green);
     write(abs(Vgenim):6:3);
     TextColor(yellow);
     end
else begin
     TextColor(yellow);
     write(' +j ');
     TextColor(green);
     write(Vgenim:6:3);
     TextColor(yellow);
     end;
GoToXY(6,9);
write('Zg = ');
if Zgenim < 0.0
```

```
        then begin
            TextColor(green);
            write(Zgenrl:6:3);
            TextColor(yellow);
            write(' -j ');
            TextColor(green);
            write(abs(Zgenim):6:3);
            TextColor(yellow);
            end
      else begin
            TextColor(green);
            write(Zgenrl:6:3);
            TextColor(yellow);
            write(' +j ');
            TextColor(green);
            write(Zgenim:6:3);
            TextColor(yellow);
            end;
      GoToXY(6,11);
      write('Zl = ');
      if Zoim < 0.0
      then begin
            TextColor(green);
            write(Zorl:6:3);
            TextColor(yellow);
            write(' -j ');
            TextColor(green);
            write(abs(Zoim):6:3);
            TextColor(yellow);
            end
      else begin
            TextColor(green);
            write(Zorl:6:3);
            TextColor(yellow);
            write(' +j ');
            TextColor(green);
            write(Zoim:6:3);
            TextColor(yellow);
            end;
LoadPowr := Powrtest(Vgenrl,Vgenim,Zorl,Zoim,Zgenrl,Zgenim);
GoToXY(6,14);
write('Pl = ');
if (LoadPowr < 1000.0) and (LoadPowr >= 1.0) then
begin
  TextColor(magenta);
  write(LoadPowr:5:2,' ');
  TextColor(yellow);
  write('watts');
end;
if (LoadPowr < 1.0) then
begin
  TextColor(magenta);
  write((LoadPowr*1000):5:2,' ');
  TextColor(yellow);
  write('milliwatts');
end;
```

```
   if (LoadPowr < 1000000.0) and (LoadPowr >= 1000.0) then
   begin
     TextColor(magenta);
     write((LoadPowr/1000):5:2,' ');
     TextColor(yellow);
     write('kilowatts');
   end;
   if (LoadPowr >= 1000000.0) then
   begin
     TextColor(magenta);
     write((LoadPowr/1000000.0):5:2,' ');
     TextColor(yellow);
     write('megawatts');
   end;

GoToXY(10,25);
     write(char(174),char(175),' Hit "r" to repeat, "q" to quit ',char(174),char(175));
     GoToXY(13,25);
end;   {IndataT3} procedure OutputT1;

var i,j,stop: integer;

begin
     for i := 30 to 49 do
     begin
       GoToXY(i,4);
       write(char(4));
     end;
     GoToXY(30,5);
     write(char(4));
     TextColor(red);
     write(' INPUT IMPEDANCES ');
     TextColor(yellow);
     write(char(4));
     for i := 30 to 49 do
     begin
       GoToXY(i,6);
       write(char(4));
     end;
     if h > 5
     then stop := 5
     else stop := h;
     if h < 6 then
     begin
     for i := 1 to stop do
     begin
       j := (2*i) + 7;
       GoToXY(26,j);
       write('Zi(',i,') = ');
       lowvideo;
       write(inputzr![i]:6:3);
       normvideo;
       if inputzia[i] < 0.0
       then write(' -j ')
```

```
    else write(' +j ');
    lowvideo;
    write(abs(inputzim[i]):6:3);
    normvideo;
end;    {for}
end;    {if}
if h > 5 then
begin
   for i := 1 to stop do
   begin
      j := (2*i) + 7;
      GoToXY(14,j);
      write('Zi(',i,') = ');
      lowvideo;
      write(inputzrl[i]:6:3);
      normvideo;
      if inputzim[i] < 0.0
      then write(' -j ')
      else write(' +j ');
      lowvideo;
      write(abs(inputzim[i]):6:3);
      normvideo;
   end;    {for}
   for i := 6 to h do
   begin
      j := (2*i) - 3;
      GoToXY(43,j);
      write('Zi(',i,') = ');
      lowvideo;
      write(inputzrl[i]:6:3);
         normvideo;
         if inputzim[i] < 0.0
         then write(' -j ')
         else write(' +j ');
         lowvideo;
         write(abs(inputzim[i]):6:3);
         normvideo;
      end;    {for}
   end;    {if}
   GoToXY(10,23);
   write(char(174),char(175),' Hit "c" to continue to power calculations ',char(174),char(175));
   GoToXY(10,25);
   write(char(174),char(175),' Hit "q" to quit ',char(174),char(175));
   GoToXY(13,25);
   repeat
   Ch := 'a';
   read(Kbd,Ch);
   until (Ch = 'c') or (Ch = 'q');
   if Ch = 'c'
   then begin
        ClrScr;
        PowrCalc;
        Ch := 'a';
        repeat
        read(Kbd,Ch);
        until Ch = 'c';
        end; {if}
```

```
    end;    (OutputT1)

procedure OutputT2;

var i,j,stop: integer;

begin
        for i := 30 to 48 do
        begin
            GoToXY(i,4);
            write(char(4));
        end;
        GoToXY(30,5);
        write(char(4));
        TextColor(red);
        write(' LOAD IMPEDANCES ');
        TextColor(yellow);
        write(char(4));
        for i := 30 to 48 do
        begin
            GoToXY(i,6);
            write(char(4));
        end;
        if h > 5
        then stop := 5
        else stop := h;
        if h < 6 then
        begin
        for i := 1 to stop do
        begin
            j := (2*i) + 7;
            GoToXY(26,j);
            write('Zl(',i,') = ');
            lowvideo;
            write(loadzr[i]:6:3);
            normvideo;
            if loadzi[i] < 0.0
            then write(' -j ')
            else write(' +j ');
            lowvideo;
            write(abs(loadzi[i]):6:3);
            normvideo;
        end;    {for}
        end;    {if}
        if h > 5 then
        begin
            for i := 1 to stop do
            begin
                j := (2*i) + 7;
                GoToXY(14,j);
                write('Zl(',i,') = ');
                lowvideo;
                write(loadzr[i]:6:3);
                normvideo;
                if loadzi[i] < 0.0
```

```
        then write(' -j ')
        else write(' +j ');
        lowvideo;
        write(abs(loadzi[i]):6:3);
        noravideo;
      end;    {for}
      for i := 6 to h do
      begin
        j := (2*i) - 3;
        GoToXY(43,j);
        write('Zl(',i,') = ');
        lowvideo;
        write(loadzr[i]:6:3);
        noravideo;
        if loadzi[i] < 0.0
        then write(' -j ')
        else write(' +j ');
        lowvideo;
        write(abs(loadzi[i]):6:3);
        noravideo;
      end;    {for}
    end;    {if}
    GoToXY(10,23);
    write(char(174),char(175),' Hit "c" to continue to power calculations ',char(174),char(175));
    GoToXY(10,25);
        write(char(174),char(175),' Hit "q" to quit ',char(174),char(175));
        GoToXY(13,25);
        repeat
        Ch := 'a';
        read(Kbd,Ch);
        until (Ch = 'c') or (Ch = 'q');
        if Ch = 'c'
        then begin
             ClrScr;
             PowrCalc;
             Ch := 'a';
             repeat
             read(Kbd,Ch);
             until Ch = 'c';
             end; {if}
    end;    {OutputT2} procedure main;
begin
initial;
calcselc;
ClrScr;
Indatsel;
if typecalc <> 'c'
then ClrScr;
case typecalc of 'a' : begin
        if (h = 0) or (h > 10) then Exit;
        if Ch = 'q' then Exit;
        Inptcalc;
        OutputT1;
        end;
```

```
    'b' : begin
            if (h = 0) or (h > 10) then Exit;
            if Ch = 'q' then Exit;
            Loadcalc;
            OutputT2;
          end;
    'c' : begin
            if Ch = 'S' then Exit;
            lengcalc;
          end;
    'd' : begin
            repeat
            Ch := 'a';
            ClrScr;
            PowrValu;
            repeat
            read(Kbd,Ch);
            until (Ch = 'r') or (Ch = 'q');
            until Ch = 'q';
          end;
end;
begin
repeat
ClrScr;
main;
ClrScr;
GoToXY(11,6);
TextColor(yellow);
write(char(4));
TextColor(green);
write(' Enter "r" to repeat Transmission Line Analyzer ');
TextColor(yellow);
write(char(4));
GoToXY(11,8);
write(char(4));
TextColor(green);
write(' Enter "e" to exit Transmission Line Analyzer ');
TextColor(yellow);
write(char(4));
GoToXY(13,6);
repeat
Ch := 'a';
read(Kbd,Ch);
until (Ch = 'r') or (Ch = 'e');
until Ch = 'e';

assign(chainfile, 'OPENMENU.CHN' );
chain( chainfile );
end.
```

What is claimed is:

1. A method of making a food product for use in a microwave oven, said method including:
   (a) positioning at least one edible product in a container having at least one conductive member associated therewith forming a waveguide, said container having at least a portion thereof sufficiently transparent to microwave radiation to permit microwave radiation to enter said container and expose said at least one edible product therein to microwave radiation; and
   (b) adjusting the impedance sufficiently of said at least one edible product such that upon exposure to microwave radiation said at least one edible product heats within a preselected temperature relationship range and after a time period of exposure to microwave radiation reaches a preselected temperature within a preselected temperature range.

2. A method as set forth in claim 1 wherein:
(a) said waveguide having cross sectional dimension and said impedance was at least partially adjusted by adjusting at least one cross sectional dimension of at least a portion of said waveguide.

3. A method as set forth in claim 1 wherein:
(a) said at least one edible product having dielectric properties and said impedance was at least partially adjusted by adjusting the dielectric properties of said at least one edible product in said container.

4. A method as set forth in claim 1 wherein:
(a) said at least one edible product having thickness and said impedance was at least partially adjusted by adjusting the thickness of said at least one edible product in said container.

5. A method as set forth in claim 1 wherein:
(a) there are a plurality of layers of said at least one edible product and said impedance was at least partially adjusted by adjusting the number of layers of said at least one edible product in said container.

6. A method as set forth in claim 1 wherein:
(a) said conductive member having height and said impedance was at least partially adjusted by adjusting the height of the conductive member.

7. A method as set forth in claim 1 wherein:
(a) said conductive sidewall having electrical conductivity and said impedance was at least partially adjusted by adjusting the electrical conductivity of the conductive member.

8. A method as set forth in claim 1 wherein:
(a) said container has headspace adjacent at said least one edible product said headspace has thickness and said impedance was at least partially adjusted by adjusting the thickness of said headspace.

9. A method as set forth in claim 1 wherein:
(a) said at least one edible product has position in said waveguide and said impedance was at least partially adjusted by adjusting the position of said at least one edible component in said waveguide.

10. A method of making a food product for use in a microwave oven, said method including:
(a) positioning a plurality of edible products each in a layer in a container having at least one conductive member, said container having at least a portion thereof sufficiently transmissive to microwave radiation to permit microwave radiation to enter said container and expose at least one of said edible products to microwave energy; and
(b) each said edible product having a respective preselected impedance just prior to exposure to microwave radiation in said container whereby the disposition of microwave power within said container is such that each edible product will heat within a preselected predetermined time/temperature relationship range and after a predetermined time period reaches a respective temperature within a respective predetermined temperature range.

11. A plurality of similar microwave food products each said food product comprising:
(a) a container having at least one conductive member, said container having a portion thereof sufficiently transparent to microwave radiation to permit microwave radiation to enter said container; and
(b) at least one edible product positioned in said container such that microwave radiation entering said container will impinge on said at least one edible product, said at least one edible product having impedance in said container at a temperature just prior to exposure to microwave radiation and wherein variation in said impedance for a substantial number of each of said at least one edible product of each of said food products is maintained within about ±20% of at least one of a selected and an average value of the impedance.

12. A plurality of similar microwave food products as set forth in claim 11 wherein:
(a) said impedance is maintained within about ±10%.

13. A plurality of similar microwave food products as set forth in claim 11 wherein:
(a) said impedance is maintained within about ±5%.

14. A plurality of similar microwave food products as set forth in claim 11, 12 or 13 wherein said food product includes a plurality of edible components in a respective said container wherein edible products are each in a layer positioned adjacent to one another and wherein said plurality of edible products in the respective container has a composite impedance value just prior to exposure to microwave radiation and wherein variation in said composite impedance value for a substantial number of food products is maintained within about ±20% of at least one of a selected and an average value of said composite impedance.

15. A plurality of similar microwave food products as set forth in claim 14 wherein:
(a) said composite impedance is maintained within about ±10%.

16. A plurality of similar microwave food products set forth in claim 15 wherein said composite impedance is maintained within about ±5%.

17. A plurality of similar microwave food products each said food product comprising:
(a) a container having at least one conductive member, said container having a portion thereof sufficiently transparent to microwave radiation to permit microwave radiation to enter said container; and
(b) at least one edible product positioned in said container such that microwave radiation entering said container will impinge on said at least one edible product, said at least one edible product having thickness wherein variation in said thickness for a substantial number of food products of said edible component is maintained within about ±20% of at least one of a selected and an average value of the wavelength of the dominant mode in that edible component just prior to exposure to microwave radiation.

18. A plurality of similar microwave food products as set forth in claim 17 wherein said thickness variation is maintained within about ±10%.

19. A plurality of similar food products as set forth in claim 18 wherein said thickness variation is maintained within about ±5%.

20. A plurality of similar microwave food products each said food product comprising:
(a) a container having at least one conductive sidewall, said container having a portion thereof sufficiently transparent to microwave radiation to permit microwave radiation to enter said container; and (b) at least one edible product positioned in said container such that microwave radiation entering said container will impinge on said at least one edible product, said at least one edible product having a complex dielectric constant, with a real part and an imaginary part, at a temperature just prior to exposure to microwave radiation wherein the variation in real and imaginary part of the complex dielectric constant of said at least one edible product for a substantial number of food products is maintained within about ±45% of at least one of a selected and an average value of the real and imaginary parts of the complex dielectric constant.

21. A plurality of similar microwave food products as set forth in claim 20 wherein:
   (a) the real and imaginary parts of the complex dielectric constant of the edible component is maintained within about ±30%.

22. A plurality of similar microwave food products as set forth in claim 21 wherein:
   (a) the real and imaginary parts of the complex dielectric constant of the edible component is maintained within about ±20%.

23. A method of making a food product system for use in a microwave oven, said method including:
   (a) selecting at least one food product for positioning in a container having at least one conductive sidewall which will be located proximate to said at least one food product;
   (b) determining a time/temperature relationship range for said food product to follow during heating in a microwave oven;
   (c) determining a temperature range for said at least one food product to be heated to within during exposure to microwave radiation; and
   (d) analyzing the performance characteristics of said at least one food product using transmission line analysis techniques and use results of said analysis to make an adjustment in said food product system whereby said at least one food product will generally heat within said time/temperature relationship range and reach a temperature generally within said temperature range.

24. A method as set forth in claim 23 including:
   (a) selecting an approximate container geometry for said container and using transmission line analysis techniques to determine a desired conductive sidewall geometry such that said at least one food product will generally heat within said time/temperature relationship range and reach a temperature generally within said temperature range after exposure to microwave radiation.

25. A method as set forth in claim 24 wherein:
   (a) said at least one food product is a plurality of food products.

26. A method as set forth in claim 25 wherein:
   (a) said plurality of food products are positioned in layers in said container, at least some of said plurality of food products being in superposed layers.

27. A method of making a food product system for heating in a microwave oven, said system including at least one edible component in a container with at least one conductive member proximate said at least one edible component, said method including:
   (a) selecting at least one edible component having geometry, microwave properties and a quantity selected within a quantity range, said at least one edible component to be placed proximate a conductive member for exposure to microwave radiation for heating said conductive member having geometry and electrical conductivity; and
   (b) adjusting at least one of geometry, microwave properties and quantity of the at least one edible component relative to at least one of geometry and conductivity of the conductive member for the purpose that said at least one edible component will heat within a preselected time/temperature relationship range to a temperature within a preselected temperature range when exposed to microwave radiation.

28. A method as set forth in claim 27 including:
   (a) using transmission line analysis techniques to analyze at least one of said at least one edible component geometry, microwave properties or quantity and said container geometry and conductivity of the conductive member and doing said adjusting by applying results of said analysis.

29. A method as set forth in claim 27 including:
   (a) testing said food product system for performance and thereafter further balancing at least one edible component properties relative to said conductive member property such that said at least one edible component will heat within a preselected time/temperature relationship range to a temperature within a preselected temperature range when exposed to microwave radiation.

30. A method of making a food product system for heating in a microwave oven, said system including at least one edible component and a container with at least one conductive member proximate said at least one edible component said method including:
   (a) selecting at least one edible component to have properties including geometry, microwave properties and quantity, said at least one edible component to be placed proximate a conductive member having properties including geometry and electrical conductivity for exposure to microwave radiation for heating;
   (b) analyzing said at least one edible component geometry, microwave properties and quantity and said conductive member geometry and electrical conductivity using transmission line analysis techniques and applying results of said analysis to balance the properties of at least one edible component against the properties of the conductive member for the purpose of estimating at least one of power and energy distribution within said food product system; and
   (c) making a food product system incorporating said balanced properties.

31. A method of making a food product system for use in a microwave oven, said system including at least one edible component in a container with at least one conductive member proximate said at least one edible component, said method including:
   (a) selecting at least one edible component having properties including geometry, microwave properties and quantity, said at least one edible component to be placed proximate a conductive member for exposure to microwave radiation said conductive member having properties including geometry and electrical conductivity;
   (b) determining at least one of power and energy distribution in the food product system that will provide a preselected time/temperature relationship range and preselected temperature within a preselected temperature range upon exposure of said food product system to microwave radiation; and (c) positioning said at least one edible component proximate said conductive member with said at least one edible component properties and said conductive member properties being selected to achieve said at least one of power and energy distribution.

32. A method of making a food product system as set forth in claim 31 wherein:

(a) said at least one of power and energy distribution determination is made using transmission line analysis techniques.

33. A plurality of similar microwave food products each said food product comprising:

(a) a container having a portion thereof sufficiently transparent to microwave radiation to permit microwave radiation to enter said container; and (b) at least one edible product positioned in said container such that microwave radiation entering said container will impinge on said at least one edible product, said at least one edible product having impedance in said container at a temperature just prior to exposure to microwave radiation and wherein variation in said impedance for a substantial number of each of said at least one edible product of each of said food products is maintained within about ±20% of at least one of a selected and an average value of the impedance.

34. A plurality of similar microwave food products as set forth in claim 33 wherein:

(a) said impedance is maintained within about ±10%.

35. A plurality of similar microwave food products as set forth in claim 33 wherein:

(a) said impedance is maintained within about ±5%.

36. A plurality of similar microwave food products as set forth in claim 33, 34 or 35 wherein said food product includes a plurality of edible components in a respective said container wherein edible products are each in a layer positioned adjacent to one another and wherein said plurality of edible products in the respective container has a composite impedance value just prior to exposure to microwave radiation and wherein variation in said composite impedance value for a substantial number of food products is maintained within about ±20% of at least one of a selected and an average value of said composite impedance.

37. A plurality of similar microwave food products as set forth in claim 36 wherein:

(a) said composite impedance is maintained within about ±10%.

38. A plurality of similar microwave food products as set forth in claim 37 wherein:

(a) said composite impedance is maintained within about ±5%.

39. A method of making a food product system for use in a microwave oven, said method including:

(a) selecting at least one food product for positioning in a container;

(b) determining a time/temperature relationship range for said food product to follow during heating in a microwave oven;

(c) determining a temperature range for said at least one food product to be heated to within during exposure to microwave radiation; and (d) analyzing the performance characteristics of said at least one food product using transmission line analysis techniques and use results of said analysis to make an adjustment in said food product system whereby said at least one food product will generally heat within said time/temperature relationship range and reach a temperature generally within said temperature range.

40. A method as set forth in claim 39 wherein:

(a) said at least one food product is a plurality of food products.

41. A method as set forth in claim 40 wherein:

(a) said plurality of food products are positioned in layers in said container, at least some of said plurality of food products being in superposed layers.

42. A method of making a food product system for use in a microwave oven, said system including at least one edible component in a container, said method including:

(a) selecting at least one edible component having properties including geometry, microwave properties and quantity;

(b) determining at least one of power and energy distribution in the food product system that will provide a preselected time/temperature relationship range and preselected temperature within a preselected temperature range upon exposure of said food product system to microwave radiation; and (c) said at least one of power and energy distribution determination is made using transmission line analysis techniques.

* * * * *

UNITED STATES PATENT AND TRADEMARK OFFICE
CERTIFICATE OF CORRECTION

PATENT NO. : 4,874,917
DATED : October 17, 1989
INVENTOR(S) : John R. WEIMER

It is certified that error appears in the above-identified patent and that said Letters Patent is hereby corrected as shown below:

ON THE TITLE PAGE:

[75] Inventor:  After "John R. Weimer, Stacy, Minn.",
Insert -- Peter S. Pesheck, Brooklyn Center, Minn. --

Signed and Sealed this

Thirtieth Day of November, 1993

Attest:

BRUCE LEHMAN

Attesting Officer

Commissioner of Patents and Trademarks